United States Patent
Star-Lack et al.

(10) Patent No.: US 8,649,587 B2
(45) Date of Patent: *Feb. 11, 2014

(54) METHODS, SYSTEMS, AND COMPUTER-PROGRAM PRODUCTS FOR ESTIMATING SCATTERED RADIATION IN RADIOGRAPHIC PROJECTIONS

(71) Applicant: Varian Medical Systems, Inc., Palo Alto, CA (US)

(72) Inventors: Josh Star-Lack, Palo Alto, CA (US); Mingshan Sun, Sunnyvale, CA (US); John Milan Pavkovich, Palo Alto, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,339

(22) Filed: Nov. 19, 2012

(65) Prior Publication Data

US 2013/0170722 A1    Jul. 4, 2013

Related U.S. Application Data

(63) Continuation of application No. 12/125,053, filed on May 21, 2008, now Pat. No. 8,326,011.

(51) Int. Cl.
*G06K 9/00*     (2006.01)
*G01N 23/00*    (2006.01)
*G01N 23/201*   (2006.01)
*G01B 15/02*    (2006.01)

(52) U.S. Cl.
USPC ............... 382/131; 382/128; 382/132; 378/7; 378/86; 378/89

(58) Field of Classification Search
None
See application file for complete search history.

(56) References Cited

U.S. PATENT DOCUMENTS

| | | | |
|---|---|---|---|
| 5,666,391 A | 9/1997 | Ohnesorge et al. | |
| 6,233,364 B1 * | 5/2001 | Krainiouk et al. | 382/275 |
| 7,336,760 B2 | 2/2008 | Virshup et al. | |
| 8,326,011 B2 * | 12/2012 | Star-Lack et al. | 382/131 |
| 2003/0147491 A1 * | 8/2003 | Gonzalez Trotter et al. | 378/22 |
| 2003/0215057 A1 * | 11/2003 | Trotter et al. | 378/89 |
| 2004/0190679 A1 | 9/2004 | Waggener et al. | |
| 2007/0189440 A1 | 8/2007 | Rinkel et al. | |

(Continued)

OTHER PUBLICATIONS

Kruger et al, "Algorithm for scatter correction in dual energy Images," 1994, Med. Phys. 21 (2), pp. 175-184.*

(Continued)

*Primary Examiner* — Bhavesh Mehta
*Assistant Examiner* — David F Dunphy
(74) *Attorney, Agent, or Firm* — Kilpatrick Townsend & Stockton LLP

(57) ABSTRACT

Several related inventions for estimating scattered radiation in radiographic projections are disclosed. Several of the inventions use scatter kernels of various forms, including symmetric and asymmetric forms. The inventions may be used alone or in various combinations with one another. The resulting estimates of scattered radiation may be used to correct the projections, which can improve the results of tomographic reconstructions. Still other inventions of the present application generate estimates of scattered radiation from shaded or partially shaded regions of a radiographic projection, which may be used to correct the projections or used to adjust the estimates of scattered radiation generated according to inventions of the present application that employ kernels.

29 Claims, 16 Drawing Sheets

(56) References Cited

U.S. PATENT DOCUMENTS

2007/0242794 A1* 10/2007 Stanton et al. .................. 378/5
2008/0304620 A1 12/2008 Karellas
2009/0202127 A1* 8/2009 Bertram et al. ............... 382/131

OTHER PUBLICATIONS

Ersahin, A Digital Filtration Technique for Scatter-Glare Correction Based on Thickness Estimation, IEEE Transactions on Medical Imaging, vol. 14, No. 3, 1995, p. 587-95.
Love, L. Alan et al.; "Scatter estimation for a digital radiographic system using convolution filtering"; 1987, *Med. Phys.*, vol. 14, No. 2, pp. 178-185.
Maltz, J. et al.; "Unified Algorithm for KV and MV Scatter and Beam-Hardening Correction Using the Convolution-Superposition Method"; 2006, *AAPM Meeting Program*, pp. 2280.
Ohnesorge, B. et al.; "Efficient object scatter correction algorithm for third and fourth generation CT scanners"; 1999, *Eur. Radiol.*, vol. 9, pp. 563-569.
Siewerdsen Jeffrey H. et al.; "Cone-beam computed tomography with a flat-panel imager: Magnitude and effects of x-ray scatter"; 2001, *Med. Phys.* vol. 28, No. 2, pp. 220-231
Siewerdsen Jeffrey H. et al.; "A simple, direct method for x-ray scatter estimation and correction in digital radiography and cone-beam CT"; 2006, *Med. Phys.* vol. 33, No. 1, pp. 187-197.
Suri, Roland E. et al.; "Comparison of Scatter Correction Methods for CBCT"; 2006, *Proceedings of SPIE,* vol. 6142, 10 pages.
Virshup, G. et al.; "Scatter Characterization in Cone-Beam CT Systems with Offset Flat Panel Imagers"; 2006, *Medical Physics,* vol. 33, No. 6, pp. 2288.
Zellerhoff, M. et al.; "Low contrast 3D-reconstruction from C-arm data"; 2005, *Proceedings of SPIE,* vol. 5745, pp. 646-655.
Zhu, Lei ; "Scatter Correction Method X-Ray CT Using Primary Modulation: Theory and Preliminary Results"; 2006, *IEEE Transactions on Medical Imaging,* vol. 25, No. 12, pp. 1573-1587.

\* cited by examiner

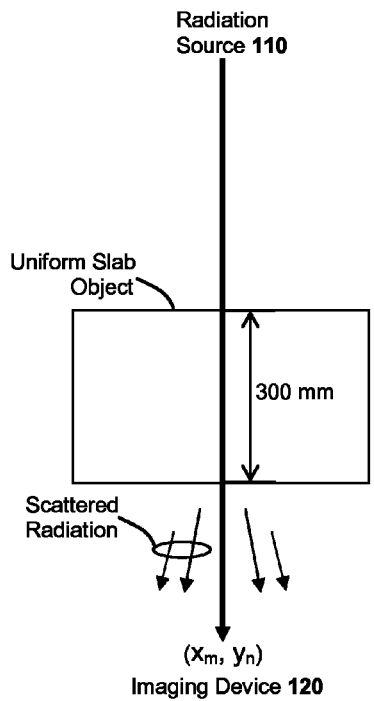
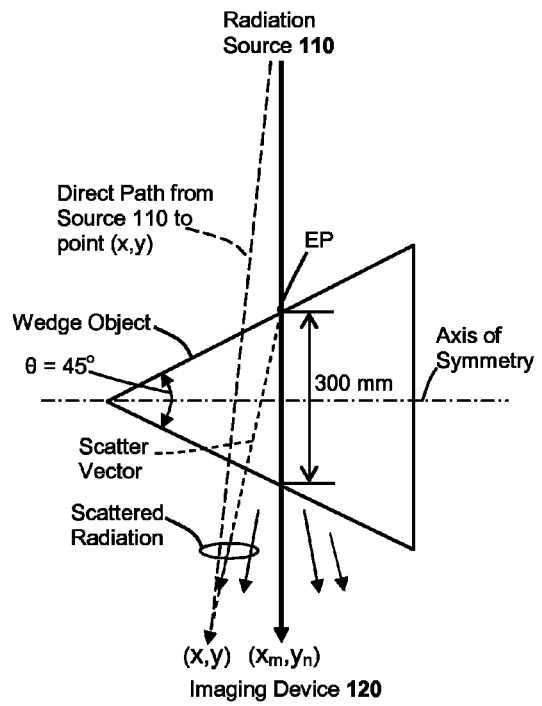
FIG. 13
FIG. 14
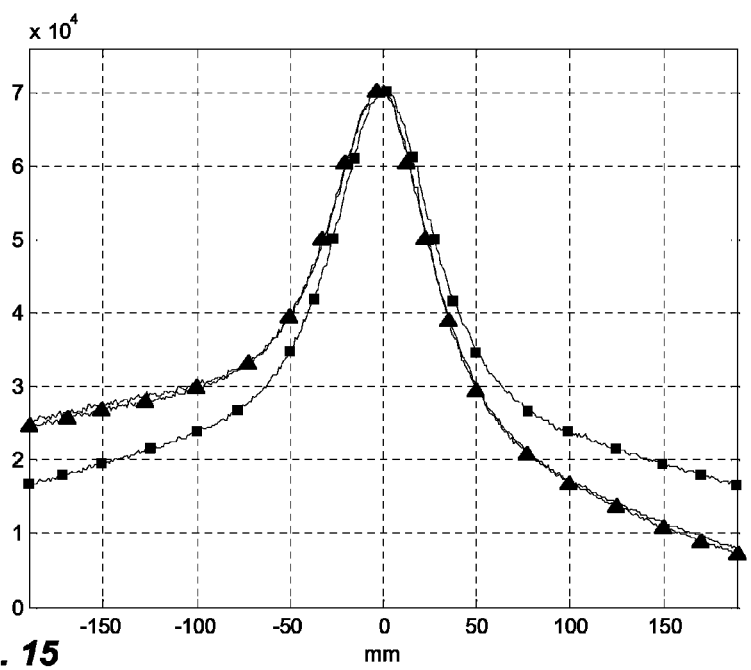
FIG. 15

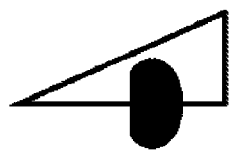
FIG. 25A
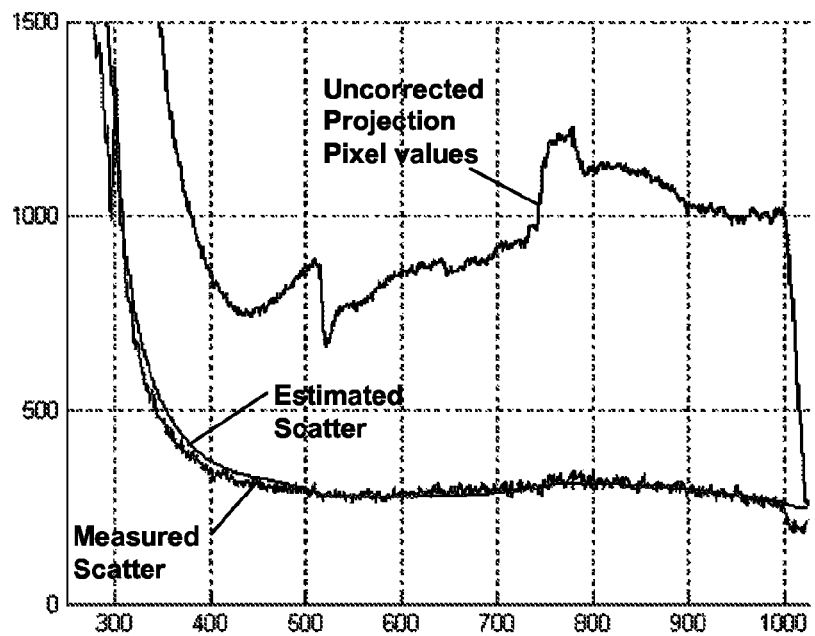
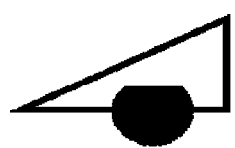
FIG. 25B
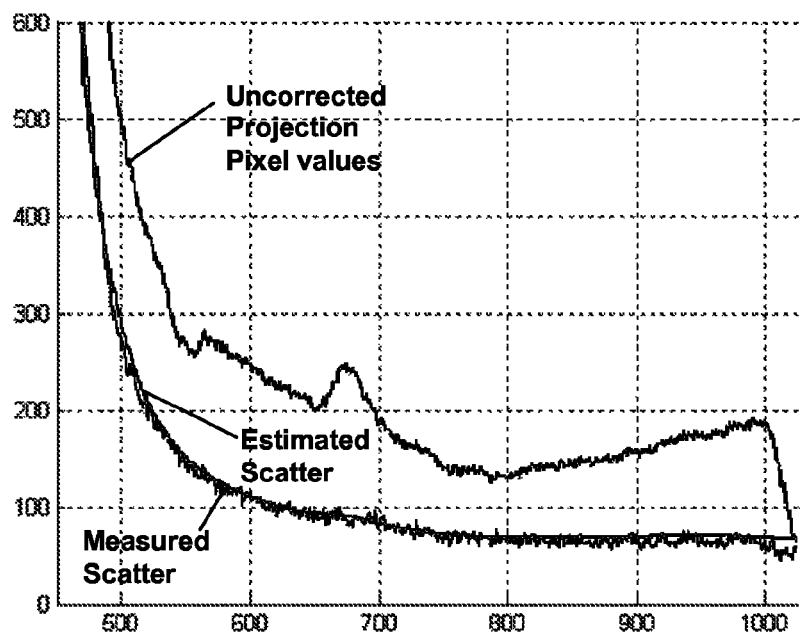

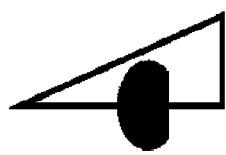
FIG. 25C
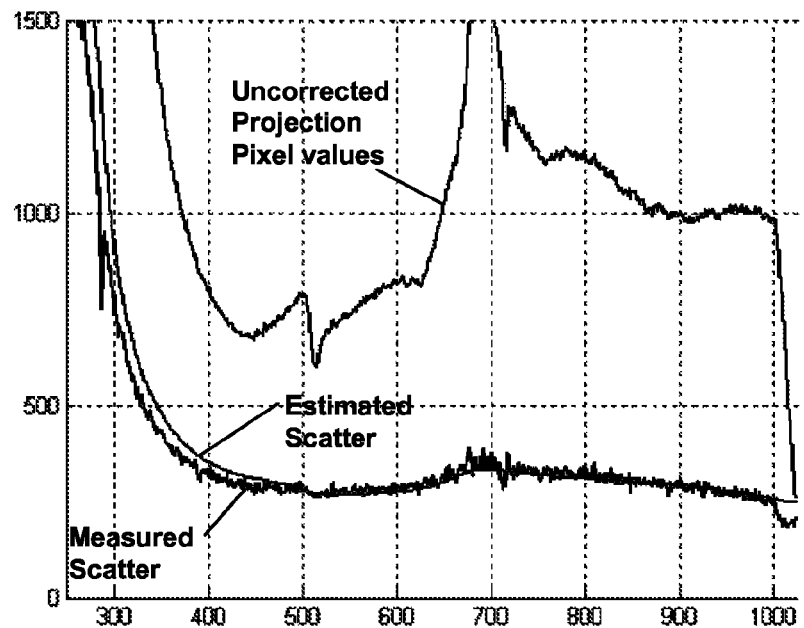
FIG. 25D
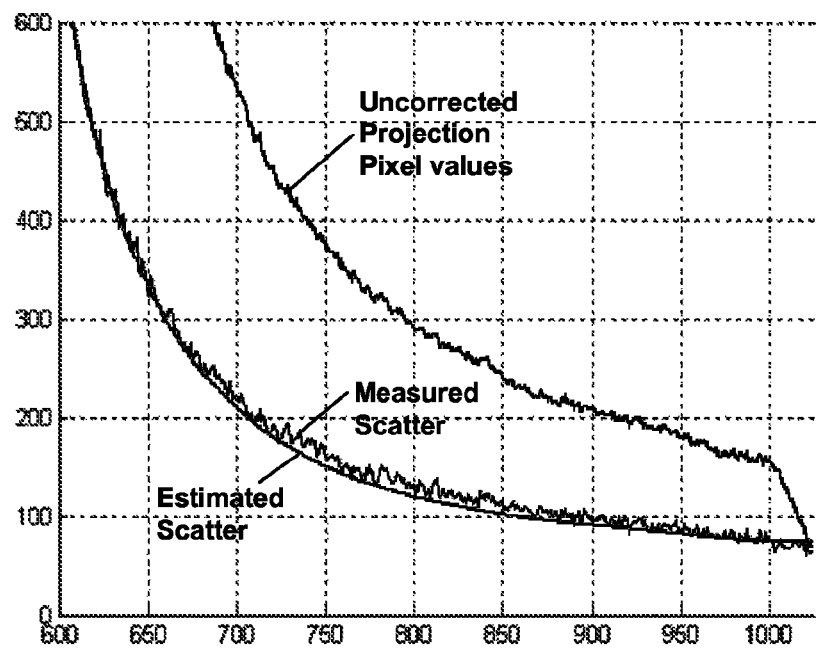

METHODS, SYSTEMS, AND COMPUTER-PROGRAM PRODUCTS FOR ESTIMATING SCATTERED RADIATION IN RADIOGRAPHIC PROJECTIONS

This application is a Continuation of U.S. patent application Ser. No. 12/125,053, filed May 21, 2008, now allowed, entitled "METHODS, SYSTEMS, AND COMPUTER-PROGRAM PRODUCTS FOR ESTIMATING SCATTERED RADIATION IN RADIOGRAPHIC PROJECTIONS," the content of which is incorporated herein by reference in its entirety for any and all purposes.

BACKGROUND OF THE INVENTION

Computerized tomography (CT) involves the imaging of the internal structure of an object by collecting several projection images ("radiographic projections") in a single scan operation ("scan"), and is widely used in the medical field to view the internal structure of selected portions of the human body. Typically, several two-dimensional projections are made of the object, and a three-dimensional representation of the object is constructed from the projections using various tomographic reconstruction methods. From the three-dimensional image, conventional CT slices through the object can be generated. The two-dimensional projections are typically created by transmitting radiation from a "point source" through the object, which will absorb some of the radiation based on its size, density, and atomic composition, and collecting the non-absorbed radiation onto a two-dimensional imaging device, or imager, which comprises an array of pixel detectors (simply called "pixels"). Such a system is shown in FIG. 1. Typically, the point source and the center of the two-dimensional imager lie on a common axis, which may be called the projection axis. The source's radiation emanates toward the imaging device in a volume of space defined by a right-circular, elliptical, or rectangular cone having its vertex at the point source and its base at the imaging device. For this reason, the radiation is often called cone-beam (CB) radiation. Generally, when no object is present within the cone, the distribution of radiation is substantially uniform on any circular area on the imager that is centered about the projection axis, and that is within the cone. However, the distribution of the radiation may be slightly non-uniform, while having rotational symmetry about the projection axis. In any event, any non-uniformity in the distribution can be measured in a calibration step and accounted for. The projection axis may not be at the center of the imager or the center of the object. It may pass through them at arbitrary locations including very near the edge.

In an ideal imaging system, rays of radiation travel along respective straight-line transmission paths from the source, through the object, and then to respective pixel detectors without generating scattered rays. However, in real systems, when a quantum of radiation is absorbed by a portion of the object, one or more scattered rays are often generated that deviate from the transmission path of the incident radiation. These scattered rays are often received by "surrounding" pixel detectors that are not located on the transmission path that the initial quantum of radiation was transmitted on, thereby creating errors in the electrical signals of the surrounding pixel detectors. Furthermore, in typical two-dimensional imagers, the radiation meant to be received by a pixel is often distributed by various components of the imager (e.g., scintillation plate), and received by surrounding pixels. Also, there is typically some electrical cross-talk in the electrical signals of the pixel detectors caused by the electrical circuitry that reads the array of pixel detectors. These two effects are often characterized by a point-spread function (PSF), which is a two-dimensional mapping of the amount of error caused in surrounding pixels by a given amount of radiation received by a central pixel. The surface of the PSF is similar to the flared shape of a trumpet output, with the greatest amount of error occurring in pixels adjacent to the central pixel. Each of these non-ideal effects creates spatial errors in the pixel data generated by the two-dimensional imager.

The scattered radiation causes artifacts (e.g., phantom images) and loss of resolution and contrast in the CT image slices produced by the radiation imaging system. The scattered radiation can also cause numerical errors in the image reconstruction algorithms (generally referred to as "CT number problems" in the art). All of the foregoing lead to image degradation. Accordingly, there is a need in the computerized tomography field to reduce the impacts of these spatial and temporal errors.

BRIEF SUMMARY OF THE INVENTIONS

Several related inventions are disclosed by the present invention. The inventions may be used alone or in various combinations with one another. As used herein and in the claims, the action of obtaining an item, such as an estimate of a quantity, encompasses the action of receiving the item from an outside process, computer-program product, and/or system, and the action of generating the item by the claimed process, computer-program product, or system.

A first set of inventions relates to methods, computer-program products, and systems for estimating scattered radiation in a radiographic projection of an object using a symmetric kernel. The radiographic projection is generated by a two-dimensional imaging device irradiated by a radiation source spaced therefrom to provide a space for the object. The imaging device measures incident radiation at a plurality of pixels at corresponding locations on a two-dimensional surface, and the radiographic projection comprises a two-dimensional surface and a plurality of radiation values corresponding to a plurality of pixel locations of the imaging device. Each radiation value includes a primary radiation amount (e.g., component) representative of the radiation reaching the corresponding pixel along a direct path from the radiation source and a scattered radiation amount (e.g., component) representative of other radiation reaching the corresponding pixel.

An exemplary method embodiment according to the first set of inventions broadly comprises obtaining an estimate of a radiation amount associated with a first location of the radiographic projection, the radiation amount comprising one of a radiation amount emitted by the radiation source or the primary radiation amount at the first location. The exemplary method further comprises generating an estimate of scattered radiation at a plurality of locations of the radiographic projection using the estimate of the radiation amount at the first location and a kernel. The kernel generates a value representative of scattered radiation for a location of the radiographic projection in relation to the distance between that location and the first location. The kernel comprises at least two symmetric functions, each symmetric function having radial symmetry about the location of the first pixel location. The exemplary method further comprises storing the estimate of the scattered radiation in a computer-readable medium.

An exemplary computer-program product embodiment according to the first set of inventions broadly comprises instruction sets embodied on a computer-readable medium which, when executed by a processor of a computer system, cause the processor to implement the actions of the exemplary method embodiment. An exemplary system embodiment according to the first set of inventions broadly encompasses a radiation source, a two-dimensional imaging device, a processor, and a set of instructions stored on a computer-readable medium to implement actions that include the actions of the above exemplary method embodiment according to the first set of inventions.

A second set of inventions relates to methods, computer-program products, and systems for estimating scattered radiation in a radiographic projection of an object using an asymmetric kernel. The radiographic projection is generated by a two-dimensional imaging device irradiated by a radiation source spaced therefrom to provide a space for the object. The imaging device measures incident radiation at a plurality of pixels at corresponding locations on a two-dimensional surface, and the radiographic projection comprises a two-dimensional surface and a plurality of radiation values corresponding to a plurality of pixel locations of the imaging device. Each radiation value includes a primary radiation amount (e.g., component) representative of the radiation reaching the corresponding pixel along a direct path from the radiation source and a scattered radiation amount (e.g., component) representative of other radiation reaching the corresponding pixel.

An exemplary method embodiment according to the second set of inventions broadly comprises obtaining an estimate of a radiation amount associated with a first location of the radiographic projection, the radiation amount comprising one of a radiation amount emitted by the radiation source or the primary radiation amount at the first location. The exemplary method further comprises generating an estimate of scattered radiation at a plurality of locations of the radiographic projection using the estimate of the radiation amount at the first location and a kernel that generates a value representative of scattered radiation for a location of the radiographic projection in relation to the distance between that location and the first location, the kernel having a form that is asymmetric about the location of the first pixel location. The exemplary method further comprises storing the estimate of the scattered radiation in a computer-readable medium.

An exemplary computer-program product embodiment according to the second set of inventions broadly comprises instruction sets embodied on a computer-readable medium which, when executed by a processor of a computer system, cause the processor to implement the actions of the exemplary method embodiment. An exemplary system embodiment according to the second set of inventions broadly encompasses a radiation source, a two-dimensional imaging device, a processor, and a set of instructions stored on a computer-readable medium to implement actions that include the actions of the above exemplary method embodiment according to the second set of inventions.

A third set of inventions relates to methods, computer-program products, and systems for estimating scattered radiation in a radiographic projection of an object using two or more kernels having varied characteristics. Each kernel may have a symmetric form or an asymmetric form. The radiographic projection is generated by a two-dimensional imaging device irradiated by a radiation source spaced therefrom to provide a space for the object. The imaging device measures incident radiation at a plurality of pixels at corresponding locations on a two-dimensional surface, and the radiographic projection comprises a two-dimensional surface and a plurality of radiation values corresponding to a plurality of pixel locations of the imaging device. Each radiation value includes a primary radiation amount (e.g., component) representative of the radiation reaching the corresponding pixel along a direct path from the radiation source and a scattered radiation amount (e.g., component) representative of other radiation reaching the corresponding pixel.

An exemplary method embodiment according to the third set of inventions broadly comprises obtaining a plurality of estimates of a radiation amount associated at a corresponding plurality of locations of the radiographic projection, each radiation amount comprising one of a radiation amount emitted by the radiation source or the primary radiation amount at the corresponding location. The exemplary method further comprises generating an estimate of scattered radiation at a plurality of locations of the radiographic projection using an estimate of the radiation amount at a first location of the radiographic projection with a first kernel that generates a value representative of scattered radiation for a location of the radiographic projection in relation to the distance between that location and the first location, and further using an estimate of the radiation amount at a second location of the radiographic projection with a second kernel that generates a value representative of scattered radiation for a location of the radiographic projection in relation to the distance between that location and the second location. Each kernel comprises a form that relates its value to the distance, wherein the first and second kernels have different forms. The form of each kernel may be symmetric or asymmetric. The exemplary method further comprises storing the estimate of the scattered radiation in a computer-readable medium.

An exemplary computer-program product embodiment according to the third set of inventions broadly comprises instruction sets embodied on a computer-readable medium which, when executed by a processor of a computer system, cause the processor to implement the actions of the exemplary method embodiment. An exemplary system embodiment according to the third set of inventions broadly encompasses a radiation source, a two-dimensional imaging device, a processor, and a set of instructions stored on a computer-readable medium to implement actions that include the actions of the above exemplary method embodiment according to the third set of inventions.

A fourth set of inventions relates to methods, computer-program products, and systems for estimating scattered radiation in at least one shaded or partially shaded region of a radiographic projection. The estimate may be used to correct the radiographic projection or used to adjust the estimates of scattered radiation generated according to other inventions of the present application. The radiographic projection is generated by a two-dimensional imaging device irradiated by a radiation source spaced therefrom to provide a space for the object. The imaging device measures incident radiation at a plurality of pixels at corresponding locations on a two-dimensional surface, and the radiographic projection comprises a two-dimensional surface and a plurality of radiation values corresponding to a plurality of pixel locations of the imaging device. Each radiation value includes a primary radiation amount (e.g., component) representative of the radiation reaching the corresponding pixel along a direct path from the radiation source and a scattered radiation amount (e.g., component) representative of other radiation reaching the corresponding pixel. The radiographic projection has at least one region that has been at least partially shaded by a second object such that the region is irradiated by the penumbra of the source.

An exemplary method embodiment according to the fourth set of inventions broadly comprises fitting a mathematical form to a plurality of radiation values of the at least one region of the radiographic projection that has been at least partially shaded by a second object such that the region is irradiated by the penumbra of the source. The exemplary method further comprises generating an estimate of scattered radiation in the at least one region from the fitted mathematical form, and storing the estimate of the scattered radiation in a computer-readable medium.

An exemplary computer-program product embodiment according to the fourth set of inventions broadly comprises instruction sets embodied on a computer-readable medium which, when executed by a processor of a computer system, cause the processor to implement the actions of the exemplary method embodiment. An exemplary system embodiment according to the fourth set of inventions broadly encompasses a radiation source, a two-dimensional imaging device, a processor, and a set of instructions stored on a computer-readable medium to implement actions that include the actions of the above exemplary method embodiment according to the fourth set of inventions.

A fifth set of inventions relates to methods, computer-program products, and systems for estimating scattered radiation in a radiographic projection caused by the housing of an imaging device. These inventions are more fully claimed in the attached claims and described in the detailed description section.

The above inventions and other inventions of the present application, and additional embodiments thereof, are described in the Detailed Description with reference to the Figures. In the Figures, like numerals may reference like elements and descriptions of some elements may not be repeated.

BRIEF DESCRIPTION OF THE DRAWINGS

FIG. 13 shows a conventional Monte Carlo-based experiment of directing a pencil beam of radiation at a perpendicular angle through a material slab having a uniform thickness.

FIG. 14 shows an innovative Monte Carlo-based experiment by the inventors of directing a radiation pencil beam through a material slab having a wedge shape.

FIG. 15 illustrates the scatter distributions from objects having uniform and non-uniform thicknesses according to several inventions of the present application.

FIGS. 23, 24 and 25A-25D illustrates various results of applying some of the inventions of the present application.

DETAILED DESCRIPTION OF THE INVENTION

System Overview.

Figure 2A:
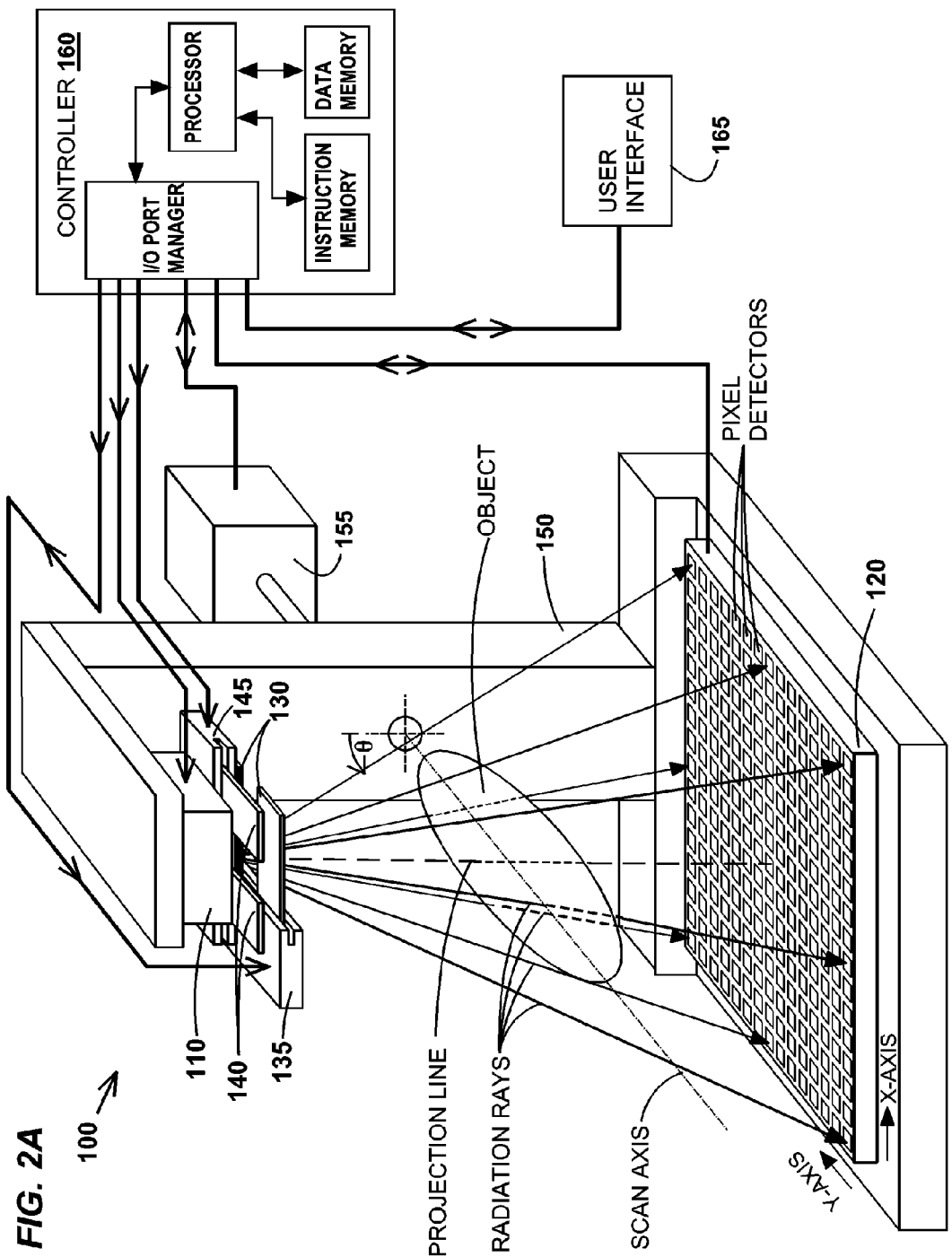
FIG. 2A is a schematic diagram of a first exemplary embodiment of a radiation imaging system according to some inventions of the present application.

FIG. 2A is a schematic diagram of a first exemplary imaging system 100 according to the system inventions of the present application. System 100 comprises a radiation source 110, a two-dimensional imaging device 120 disposed opposite to radiation source 110 along a projection line, a first set of fan blades 130 disposed between the radiation source and the two-dimensional imaging device, a first fan-blade drive 135 that holds fan blades 130 and sets their positions. The edges of fan blades 130 are oriented substantially perpendicular to the scan axis (defined below), and are substantially parallel with the trans-axial dimension (defined below) of imaging device 120. As an option, system 100 may further comprise a second set of fan blades 140 disposed between the radiation source and the two-dimensional imaging device, and a second fan-blade drive 145 that holds fan blades 140 and sets their positions. The edges of fan blades 140 are oriented substantially parallel with the scan axis (defined below), and are substantially perpendicular to the axial dimension (defined below) of imaging device 120. The fan blades are disposed closer to radiation source 110 than imaging device 120. They are normally kept wide open to enable the full extent of imaging device 120 to be exposed to radiation, but may be partially closed according to the image anchoring embodiments described near the end of this document. The dimensions of source 110, imaging device 120, and fan blades 130 and 140 (and their drives) have been enlarged in the figure relative to the size of object for the purposes of illustrating these components.

System 100 further comprises a gantry 150 that holds radiation source 110, imaging device 120, and fan-blade drives 135 and 145 in fixed or known spatial relationships to one another, a mechanical drive 155 that rotates gantry 150 about an object disposed between radiation source 110 and imaging device 120, with the object being disposed between fan blades 130 and 140 on the one hand, and imaging device 120 on the other hand. The term gantry has a broad meaning, and covers all configurations of one or more structural members that can hold the above-identified components in fixed or known (but possibly movable) spatial relationships. For the sake of visual simplicity in the figure, the gantry housing, gantry support, and fan-blade support are not shown. These components do not form part of the present inventions. Also not shown are: a "bow tie" filter for radiation source 110, and a support table for the object (i.e., an object support member), neither of which form a part of the present inventions related to system 100. Additionally, system 100 further comprises a controller 160 and a user interface 165, with controller 160 being electrically coupled to radiation source 110, mechanical drive 155, fan-blade drives 135 and 145, imaging device 120, and user interface 165. User interface 165 provides a human interface to controller 160 that enables the user to at least initiate a scan of the object, and to collect measured projection data from the imaging device. User interface 165 may be configured to present graphic representations of the measured data.

In imaging system 100, gantry 150 is rotated about the object during a scan such that radiation source 110, fan blades 130 and 140, fan-blade drives 135 and 145, and two-dimensional imaging device 120 circle around the object. More specifically, gantry 150 rotates these components about a scan axis, as shown in the figure, where the scan axis intersects the projection line, and is typically perpendicular to the projection line. The object is aligned in a substantially fixed relationship to the scan axis. The construction provides a relative rotation between the projection line on the one hand and the scan axis and an object aligned thereto on the other hand, with the relative rotation being measured by an angular displacement value $\theta$. Mechanical drive 155 is mechanically coupled to gantry 150 to provide rotation upon command by controller 160. The two-dimensional imaging device comprises a two-dimensional array of pixels that are periodically read to obtain the data of the radiographic projections. Imaging device 120 has an X-axis and a Y-axis, which are perpendicular to each other. Imaging device 120 is oriented such that its Y-axis is parallel to the scan axis. For this reason, the Y-axis is also referred to as the axial dimension of imaging device 120, and the X-axis is referred to as the trans-axial dimension, or lateral dimension, of device 120. The X-axis is perpendicular to a plane defined by the scan axis and the projection line, and the Y-axis is parallel to this same plane. Each pixel is assigned a discrete X-coordinate ("X") along the X-axis, and a discrete Y-coordinate ("Y") along the Y-axis. In typical implementations, the size of the array is 1024 pixels by 768 pixels, measuring approximately 40 cm by 30 cm, with the longer dimension of the array being oriented parallel to the X-axis. As used herein, the discrete X-coordinates start at $-Xpix/2$ and end at $Xpix/2$ (e.g., $Xpix=1024$), and the discrete Y-coordinates start at $-Ypix/2$ and end at $Ypix/2$ (e.g., $Ypix=768$). A smaller number of pixels are shown in the figure for the sake of visual clarity. The imaging device may be centered on the projection line to enable full-fan imaging of the object, may be offset from the projection line to enable half-fan imaging of the object, or may be movable with respect to the projection line to allow both full-fan and half-fan imaging of objects. As an example of a half-fan configuration, the imaging device may be offset from the center by 16 centimeters in its X-dimension when the imaging device has a span in the X dimension of 40 centimeters.

Figure 1:
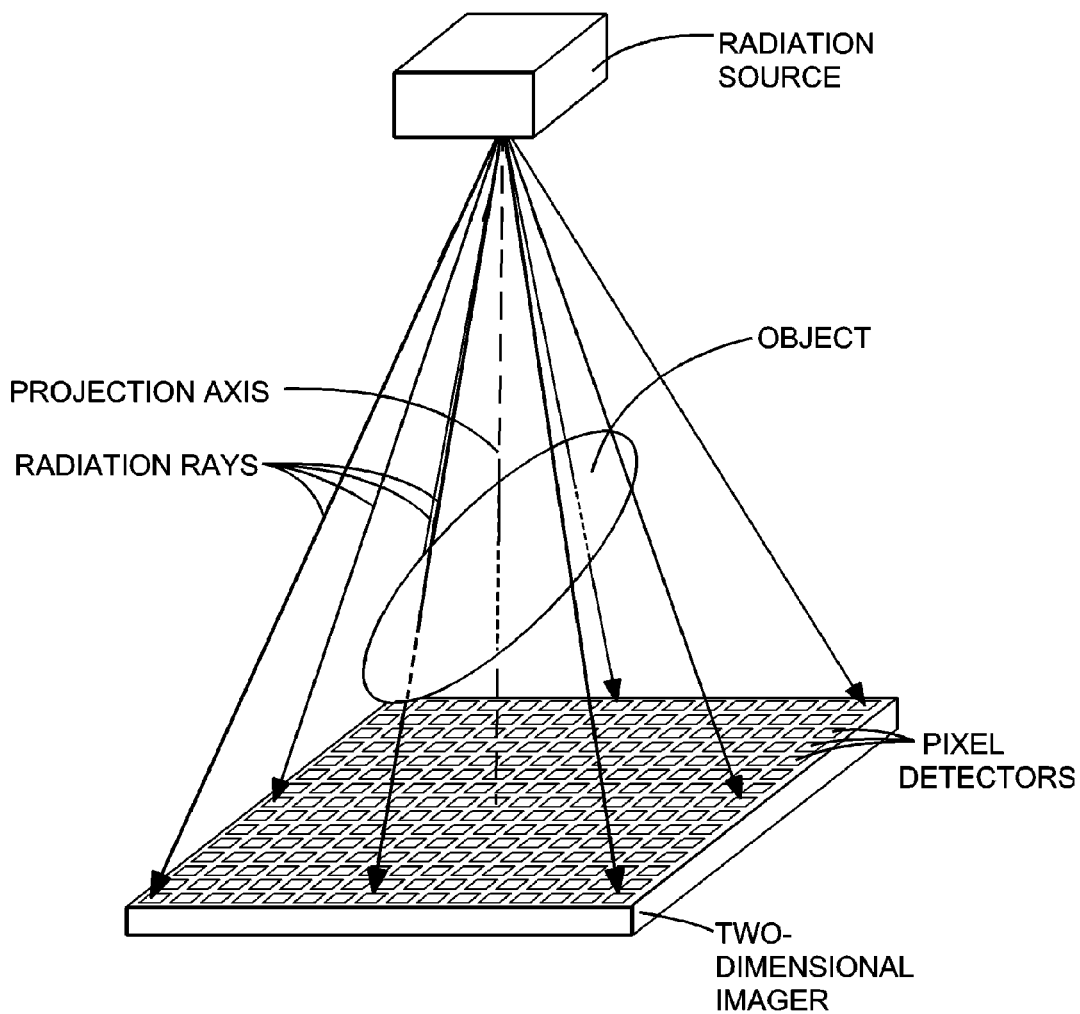
FIG. 1 is a schematic diagram of a radiation imaging system according to the prior art.
Figure 3:
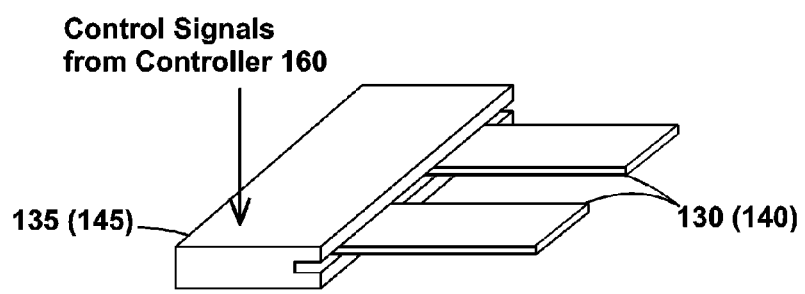
FIG. 3 is a perspective view of an exemplary implementation of a fan blade and a fan-blade drive according to some inventions of the present application.

FIG. 3 shows a perspective view of a first exemplary implementation of fan blades 130 and fan-blade drive 135. Each fan blade 130 may have a thin rectangular shape, and may comprise a material that absorbs the radiation of source 110. Such a material may comprise lead (Pb). Each fan blade 130 absorbs at least 60% of the incident radiation from radiation source 110. In preferred implementations, a fan blade absorbs at least 90 percent, and more preferably at least 99 percent, of the radiation incident upon it. Fan-blade drive 135 may comprise two mechanical positioners. In one exemplary implementation, each mechanical positioner is mechanically coupled to a respective fan blade to cause the fan blade to move in a controlled and measurable (e.g., predictable) manner. In another implementation, one of the mechanical positioners is mechanically coupled to the fan blades to cause the blades to move relative to one another so as to vary the distance of the gap between the blades in a controlled and measurable manner, and the other positioner is mechanically coupled to the blades to cause the blades to move as a group in a controlled and measurable manner. In the latter exemplary implementation, the first positioner and the fan blades may be mechanically disposed on a carriage, and the second positioner may be mechanically coupled to the carriage. Each positioner may comprise a linear motor servo, a rotating motor servo with a rotation-to-linear translation mechanism, or the like. The construction of fan blades 140 and fan blade drive 145 may be the same as that of fan blades 130 and fan-blade drive 135, respectively.

Referring back to FIG. 2A, when controller 160 receives a request from the user to begin a scan of an object, controller 160 instructs fan-blade drives 135 and 145 to set the fan blades 130 and 140, respectively, in open positions (or in partially closed positions as described in greater detail below for some embodiments), instructs mechanical drive 155 to begin a scan rotation of gantry 150, and instructs radiation source 110 to begin emitting radiation. As it rotates, mechanical drive 155 provides controller 160 with an indication of the angular displacement value $\theta$. Controller 160 uses this information to read the values of imaging device 120's pixel detectors at selected angular displacement values $\theta$ to obtain the data for the radiographic projections. Typically, there are between 250 and 1000 projections taken in the 360-degree scan rotation, with each projection being spaced from adjacent projections by a set increment $\Delta\theta$ of angular displacement. The controller stores the data from each projection in a memory storage device, along with the angular displacement value $\theta$ at which the projection was taken. The scatter correction methods disclosed by the present application may be used to correct each projection for scattered radiation caused by scattering in the object and the top cover of imaging device 120.

Controller 160 comprises a processor, an instruction memory for storing instruction sets that direct the operation of the processor, a data memory that stores pixel and other data values used by the present inventions implemented by the imaging system, and an I/O port manager that provides input/output data exchange between processor 160 and each of radiation source 110, mechanical drive 155, fan-blade drives 135 and 145, and imaging device 120. The instruction memory and data memory are coupled to the main processor through a first bidirectional bus, and may be implemented as different sections of the same memory device. Because of the large amount of data provided by the two-dimensional imaging device, the I/O port manager is preferably coupled to the main processor through a second bidirectional bus. However, the I/O port manager may be coupled to the main processor by way of the first bidirectional bus. The operation of the processor is guided by a group of instruction sets stored in the instruction memory, which is an exemplary form of computer-readable medium. Some of these instruction sets may direct the processor to generate estimates of scattered radiation in one or more of the projections. Additional instruction sets may direct the processor to correct the projections according to scatter-correction methods disclosed by the present application, or may direct the processor to store the raw projection data to a computer-readable medium, from which it may be exported to another processor that performs the correction. Some exemplary instruction sets are described below in greater detail.

Figure 2B:
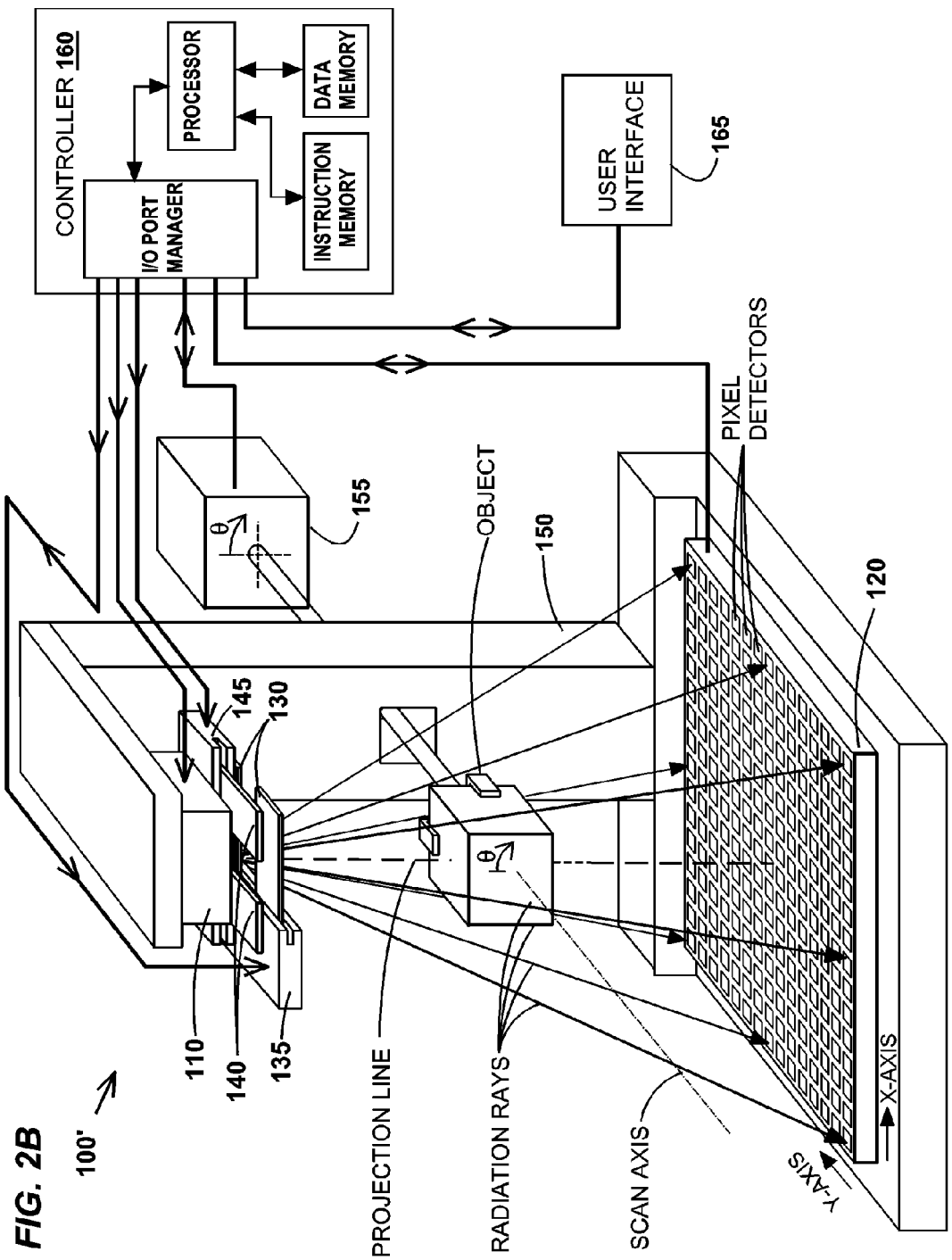
FIG. 2B is a schematic diagram of a second exemplary embodiment of a radiation imaging system according to some inventions of the present application.

In exemplary imaging system 100 shown in FIG. 2A, the gantry rotates about the object, which means that the projection line rotates about the object and the scan axis. Instead, it may be appreciated that the object and the scan axis may be rotated while the gantry and the projection line are stationary. A second exemplary imaging system which rotates the object is shown at 100' in FIG. 2B. System 100' comprises all of the components of system 100, with the components being coupled to one another in the same way, except that the mechanical drive is coupled to an object support member, which holds the object being scanned. In system 100', the gantry remains stationary while the mechanical drive rotates the object support member and the object. System 100' is suitable for industrial uses (e.g., scanning non-human objects), whereas system 100 is suitable for medical uses (e.g., scanning human objects).

Sources of Radiation Scattering.

Figure 4A:
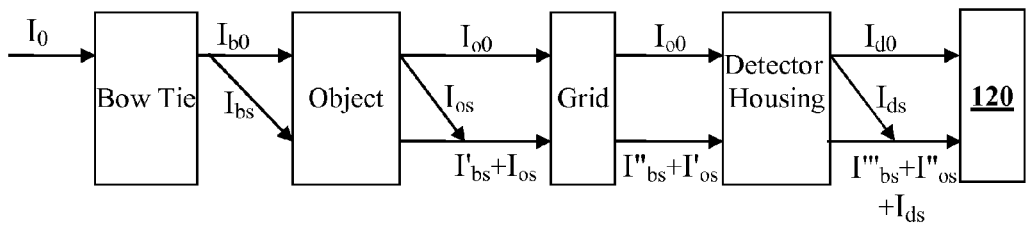
FIGS. 4A and 4B illustrate exemplary imaging chains according to some inventions of the present application.

In typical cone-beam systems, there are generally four possible components that can scatter the radiation: the bow-tie filter (if present), the object being scanned, an anti-scatter grid (if present), and the detector housing. FIG. 4A illustrates the sources of scatter through what we may call the imaging chain. Starting at the left, the source radiation has an initial intensity profile $I_0$ before reaching the bow-tie filter. After passing through the bow-tie filter, a first portion of $I_0$ is scattered in various directions as profile $I_{bs}$, while a second portion of the radiation continues toward the object as a profile $I_{b0}$, but at an attenuated level compared to profile $I_0$. The spatial distribution of the scattered radiation profile $I_{bs}$ can be simulated by various computer-based methods, and confirmed by measurements (without the object in place, and/or with a uniform slab of absorbent material in the location of the object). Several embodiments of inventions of the present application may be used to generate estimates of the $I_{bs}$ profile.

After $I_{b0}$ passes through the object, a first portion of it is scattered in various directions as a scatter profile $I_{os}$, while a second portion of it continues on toward the cover of imaging device 120 as profile $I_{oo}$, but at an attenuated level. Several embodiments of inventions of the present application are used to generate estimates of the $I_{os}$ profile, as described below in greater detail. The scattered radiation profile $I_{b0}$ also passes through the object, with a portion being absorbed, another portion being re-scattered, and the remaining portion being unaffected. The resulting scattered radiation from the bow-tie filter, as it exits the object, may be represented by the profile $I'_{bs}$. Profile $I'_{bs}$ may be estimated by various computer-based models given the $I_{bs}$ profile and an approximate phantom model of the object (e.g., a body of uniform material having approximately the same shape as the object, and having scatter and absorption characteristics near the average characteristics of the object). The scattered radiation profiles $I'_{bs}$ and $I_{os}$ are additive.

To reduce the scattered radiation before it reaches imaging device 120, a scatter-absorbing grid (so-called "anti-scatter" gird) may be disposed between the object and imaging device 120. The grid generally comprises an array of elongated passageways having generally rectangular cross sections, with wider openings at the ends facing imaging device 120. The passageways are arranged to allow unobstructed paths for radiation that follow the straight-line paths from the source 110 to imaging device 120, and to absorb substantial amounts of the scattered radiation, which does not follow the straight-line paths. The effect of the grid is to substantially pass the non-scattered radiation $I_{oo}$ from the object to imaging device 120, while absorbing substantial portions of the scatter radiation $I'_{bs}$ and $I_{os}$. As an advantage of the grid, the resulting scattered radiation that reaches the cover of imaging device 120 is substantially reduced; it may be represented by $I''_{bs}$ and $I'_{os}$. As a disadvantage, the grid generally obscures portions of the imaging device 120 due to the finite wall thickness of the grid's passageways.

After the object radiation profile $I_{oo}$ passes through the detector housing, a first portion of it is scattered in various directions as profile $I_{ds}$, while a second portion of it continues to the pixel detectors of imaging device 120, but at an attenuated level, as profile $I_{d0}$. The scattered radiation profiles $I''_{bs}$ and $I'_{os}$ also encounter some further scattering by the cover, resulting in scatter profiles $I'''_{bs}$ and $I''_{os}$. Several embodiments of inventions of the present application are used to estimate the scattering effects of the cover so that it can be removed from the measurement. The scattering from a detector housing can sometimes be negligible, and can thus be ignored.

Several embodiments of the present invention are directed to correcting for the scattering caused by the object and the detector housing. For these embodiments, the simpler imaging chain shown in FIG. 4B may be used, which does not have the bow-tie filter or the anti-scatter grid. There are many system configurations which do not use bow-tie filters and scatter grids. An initial radiation profile $I_0$ is directed toward the object. After $I_0$ passes through the object, a first portion $I_{os}$ of it is scattered in various directions, while a second portion $I_{oo}$ of it continues on toward the cover of imaging 120, but at an attenuated level. After the object radiation profile $I_{oo}$ passes through the detector housing, a first portion $I_{ds}$ of it is scattered in various directions, while a second portion $I_{d0}$ of it continues to the pixel detectors of imaging 120, but at an attenuated level. The scattered radiation profile $I_{os}$ also encounters some further scattering by the cover, resulting in scatter profile $I'_{os}$.

Correction of Scatter from the Detector Housing.

If scattering from the detector housing is not considered to be negligible, it may be corrected according to the following embodiments of the present inventions. FIG. 5 illustrates the construction of an exemplary detector housing that comprises a outer shell, followed by a thin electro-magnetic interference shield, followed by a low-density spacer layer, followed by a thin scintillator layer (which converts the radiation into visible light), followed by a glass layer that comprises the pixel photo-detectors (which convert the visible light into electrical signals), followed by a support substrate. Most of the scattering occurs in the outer shell, with little scattering in the EMI shield (because of its small thickness) or the spacer layer (because of its low density). The distance between the top of the outer shell and the scintillator layer is 15.6 mm. The embodiments related to correcting the scatter from the detector housing seek to relate the incident radiation profile to the radiation profile measured by imaging device 120, which can be represented by the profile Im. As it turns out, the scatter profiles for the imaging chains shown in FIGS. 4A and 4B, ($I''_{bs}+I'_{os}$) and $I_{os}$, respectively, are relatively slowly varying over the spatial domain compared to main radiation profile $I_{oO}$ from the object. This fact, in combination with the short distance of 15.6 mm between the top of the outer shell and the scintillator layer, allows the radiation incident on the detector housing to be modeled by a single incident profile $I_I$ for the purposes of estimating the scattering caused by the detector housing, and allows an accurate estimate of the incident profile $I_I$ to be generated from the measured radiation profile Im. Accordingly, the incident profile $I_I$ is equal to ($I_{oO}+I''_{bs}+I'_{os}$) for the imaging chain shown in FIG. 4A, and equal to ($I_{oO}+I_{os}$) for the imaging chain shown in FIG. 4B.

Figure 6:
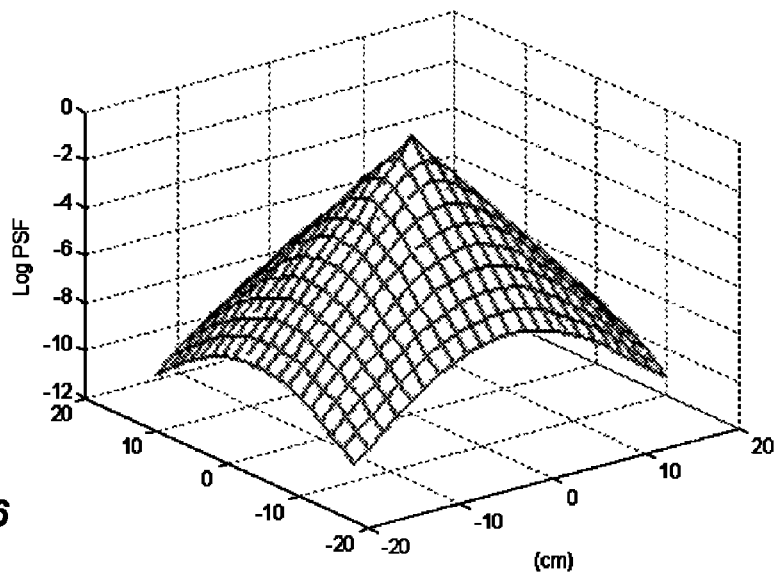
FIG. 6 illustrates a two-dimensional distribution of scattered photons resulting from a pencil beam striking the exemplary detector housing shown in FIG. 5 according to some inventions of the present application.
Figure 7:
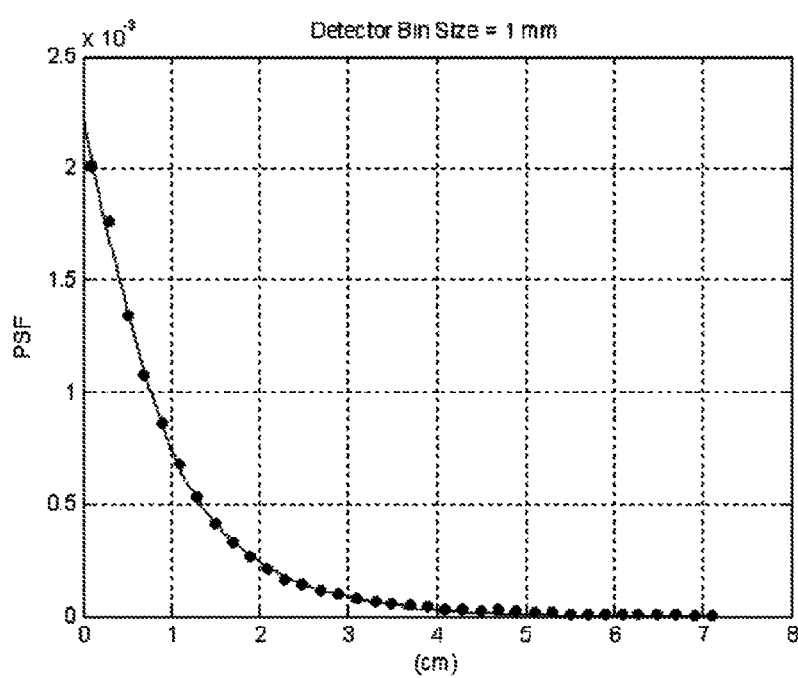
FIG. 7 illustrates a one-dimensional cross section of the distribution shown in FIG. 6 according to some inventions of the present application.

Our next task is to find a relationship between profiles Im and $I_I$ that will allow an estimate of profile $I_I$ to be generated from profile Im. For each pixel on the imaging device, we can allocate a pencil beam of radiation having incident radiation $I_I$, and a primary beam value Ip. The primary beam value Ip is the value of the pencil beam that reaches the pixel after being attenuated and scattered by the detector housing. The measured value Im at the pixel location comprises the primary value Ip and the scatter from other pencil beams. For a detector housing having uniform construction, Ip is a constant fraction of $I_I$, and can be related as $Ip(x,y)=\eta \cdot I_I(x,y)$, for $\eta$ slightly less than 1, such as $\eta=0.9$. A computer-based Monte-Carlo simulation of a pencil-beam of radiation interacting with the detector housing at a right angle was performed. The two-dimensional distribution of the scattered photons from the pencil beam is shown in FIG. 6, where the vertical axis plots the distribution on a logarithmic scale. FIG. 7 shows a one-dimensional cross section of distribution, from the center outward as dots, where the vertical axis plots the distribution on a linear scale. The distribution can be mathematically modeled by a point-scatter function PScF(r) as a function of distance r from the center of the pencil beam:

$$PScF(r)=a_1 \cdot e^{-a_2 r}+a_3 \cdot e^{-a_4(r-a_5)^3} \quad [1]$$

where $a_1$ through $a_5$ are fitting parameters. The fitting result is shown in FIG. 7 as a solid line. The PScF(r) function, as shown in FIGS. 6 and 7, is not normalized to the cross sectional area of the pencil beam. The parameters $a_1$ and $a_3$ may be adjusted so as to normalize PScF(r), or PScF(r) may be multiplied by a normalization constant. In any event, the point-scatter function should be multiplied by a calibration parameter to bring the simulation results into accordance with the measured results. The calibration parameter, which may be represented by the quantity SPR (scatter-to-primary ratio), is the ratio of the integral of the scattered-radiation component to the primary radiation. Computer-based Monte Carlo simulations suggest an SPR value of 9% for the detector construction shown in FIG. 5, meaning that 9% of the beam's radiation photons are scattered. This amount has been verified in part from shadowing experiments using opaque disks. While PScF(r) has been illustrated as a single-value function of distance r, it may be written as a function of the x–y domain, PScF(x,y), where x and y are measured from the center of the pencil beam, and where $r=(x^2+y^2)^{1/2}$.

As indicated above, the incident radiation $I_I$ can be modeled as an array of pencil beams, with the measured value Im at the pixel location comprising the primary value Ip and the scatter from other pencil beams. That is, the radiation received by the imaging device 120 at any point (x,y), which is Im(x,y), is equal to the sum of Ip(x,y) and the scatter contributions from the other pencil beams. This may be written mathematically as:

$$Im(x, y) = Ip(x,y) + \sum_{m=-M}^{+M} \sum_{n=-N}^{+N} [Ip(x_m, y_n) \cdot SPR \cdot PScF(x-x_m, y-y_n)]. \quad [2]$$

The latter quantity can be identified as the two-dimensional convolution of Ip and PScF multiplied by SPR, which can be denoted as $SPR \cdot Ip(x,y) \otimes PScF(x,y)$. Using this, we can write:

$$Im(x,y)=Ip(x,y)+SPR \cdot Ip(x,y) \otimes PScF(x,y). \quad [3]$$

As is known in the mathematics art, the Fourier transform of two convolved functions is equal to the multiplication of their Fourier transforms. Thus, taking the Fourier transform of each side of equation [3], we have:

$$\Im\{Im(x,y)\}=\Im\{Ip(x,y)\}+SPR \cdot \Im\{Ip(x,y)\} \cdot \Im\{PScF(x,y)\}$$

which may be rewritten as:

$$\Im\{Ip(x, y)\} = \Im^{-1}\left\{\frac{\Im(I_m(x, y))}{1+SPR \cdot \Im(PScF(x, y))}\right\}. \quad [4]$$

The inverse Fourier transform of equation [4] may be taken to obtain $I_I(x,y)$ as follows:

$$Ip(x, y) = \Im^{-1}\left\{\frac{\Im(I_m(x, y))}{1+SPR \cdot \Im(PScF(x, y))}\right\}. \quad [5]$$

The denominator can be readily pre-computed, and Ip(x,y) can be generated by a Fourier transform of Im(x,y), followed by a division operation with the pre-computed denominator, and then followed by an inverse Fourier transform of the resulting division operation. This is generally faster than computing the convolution. $I_I(x,y)$ may then be generated as $I_I(x,y)=Ip(x,y)/\eta$. But since the $\eta$ factor also exists in the air scan ($I_0$) and will be cancelled out during reconstruction, and does not affect object scatter estimation, we can virtually neglect it and its actual value.

A simpler approach can be taken by approximating Ip(x,y) in the convolution produce in equation [3] with Im(x,y) (or a fraction thereof) as follows:

$$Im(x,y)=Ip(x,y)+SPR \cdot Im(x,y) \otimes PScF(x,y), \quad [6]$$

which can be rewritten as:

$$Ip(x,y)=[Im(x,y)-SPR \cdot Im(x,y) \otimes PScF(x,y)]. \quad [7]$$

$I_I(x,y)$ may then be generated as $I_I(x,y)=Ip(x,y)/\eta$. The convolution product may be generated by multiplying the Fourier transfer of Im(x,y) with a precomputed Fourier transform of PScF(x,y), and thereafter taking the inverse Fourier transform of the multiplication product. As a practical matter, the calibration parameter SPR may be spatially variant. The variation may be caused by non-uniformities in the thicknesses of the housing's topmost layers, and/or variations in the thickness from the housing's top surface to the scintillator layer. In such a case, SPR can be modeled as a matrix, rather than a scalar, and the multiplication with the convolution in equation [7] becomes an inner product.

In typical implementations, an estimate of the scatter component {SPR·Ip(x,y)⊗PScF(x,y)} is generated on coarse grid of super pixels, where each super pixel represents a small group of pixels values and where SPR (in the case of it being a matrix) and Ip(x,y) are each generated as an average of values from its group. Ip(x,y) may be estimated as Im(x,y), a fraction thereof, or estimated by either of equations [5] or [7]. After the scatter component is generated on the coarse grid of super pixels, it may be interpolated/extrapolated to provide scatter values for all of the real pixels. A corrected radiographic projection may then be generated as a difference between Im(x,y) and the scatter component, divided by η, or as a truncated difference between Im(x,y) and the scatter component, divided by η. The truncated difference may comprise generating the ratio of the scatter component to Im(x,y), processing the ratio by filtering its values over the spatial domain and/or limiting its values of the ratio to a range (such 0 to 0.8), and then multiplying Im(x,y) by one minus the processed ratio. The use of super pixels and generating average values for use therewith are described below in greater detail. The full grid may also be used in generating the scatter component and Ip(x,y).

In the above ways, the radiation profile $I_f$ incident on the detector housing can be generated from the measured radiation profile Im. From there, the $I_f$ can be used in the estimation of $I''_{oo}$, $I''_{bs}$, and $I'_{os}$ in the imaging chain shown in FIG. 4A, or in the estimation of $I_{oo}$ and $I_{os}$ in the imaging chain shown in FIG. 4B.

Radiation Scattering in the Object.

Scattered radiation profiles from the object are material- and geometry-dependent, and, hence, are significantly more complicated than the scattered radiation profiles generated from the detector housing described above. Prior art methods have assumed symmetric point-scatter functions for the object, with the functions being based on responses through uniform slabs. One set of inventions of the present application relates to a new form of a symmetric point-scatter function that provides improved projection-correction results. Another set of inventions of the present application relates to constructing two or more instances of the new symmetric form for two or more respective ranges of object thickness, and applying the instances of the new symmetric form to regions of a radiographic projection according to a measure of the object thickness in the regions. Yet another set of inventions of the present application relates to a new class of asymmetric point-scatter functions that provide improved projection-correction results relative to symmetric point-scatter functions. Yet another set of inventions of the present application relates to constructing two or more instances of the new asymmetric form for two or more respective ranges of object thickness, and applying the instances of the new asymmetric form to regions of a radiographic projection according to a measure of the object thickness in the regions. Each of these invention sets is discussed below in greater detail, starting with the new form of a symmetric point-scatter function.

Symmetric Point-Scatter Functions.

In contrast to prior art approaches, one invention set of the present application encompasses symmetric point-scatter functions ("kernels") that comprise the sum of two or more symmetric functions. In preferred embodiments, the central portion of the scatter distribution (near the pencil-beam axis) is primarily modeled by one of the functions, while the tail portions are primarily modeled by the other symmetric function(s). In one embodiment, each function comprises a Gaussian function, and the kernel comprises the form:

$$Sk(x-x_m, y-y_n, I_0, I_{bp}) = \qquad [8]$$
$$A \cdot \left(\frac{I_{bp}}{I_0}\right)^\alpha \cdot \ln\left(\frac{I_0}{I_{bp}}\right)^\beta \cdot \left(\exp\left(\frac{-r^2}{2\sigma_1^2}\right) + B\exp\left(\frac{-r^2}{2\sigma_2^2}\right)\right),$$

where x and y are the location coordinates on the pixel array of the scattered radiation modeled by Sk(*), $x_m$ and $y_n$ are the coordinates of the location where the pencil beam terminates on the pixel array, $I_0$ is the initial radiation intensity of the pencil beam before striking the object, $I_{bp}$ is the scatter-free radiation intensity of the pencil beam after passing through the object and as measured at the coordinates $x_m$ and $y_n$ on the pixel array, where A, B, α, β, $\sigma_1$, and $\sigma_2$ are the fitting parameters, and where $r^2=(x-x_m)^2+(y-y_n)^2$ (r is the radial distance from point (x,y) to point $(x_m, y_n)$). $I_{bp}$ does not have scattered radiation in it, and is called the primary radiation of the object, or beam primary signal, because it represents information about the region of the object traversed by the pencil-beam, and because its value is used by the tomographic reconstruction process to construct 3-D and images of the object. Constant A and the first two factors of equation [8] primarily account for the overall amount of scattering along the pencil beam and for beam hardening effects. They also normalize kernel Sk(*) to $I_{bp}$. The last term of equation [8] primarily accounts for the spatial distribution of the scatter. It comprises two Gaussian functions, both being functions of $r^2=(x-x_m)^2+(y-y_n)^2$.

The kernel form of equation [8] is normalized to $I_{bp}$. It provides the ratio of scattered radiation received at point (x,y) to the primary radiation $I_{bp}$ received at point $(x_m, y_n)$, and is dimensionless. The actual scattered radiation caused by the pencil beam is equal to the quantity $I_{bp}$·Sk(*). The kernel form of equation [8] may instead be normalized to the incident radiation $I_0$ by multiplying it with the quantity $I_{bp}/I_0$, which may be easily done by adding 1 to the value of α. This normalized form may be called $Sk^{Io}$(*), and the actual scattered radiation caused by the pencil beam would be equal to the quantity $I_0 \cdot Sk^{Io}$(*). $Sk^{Io}$(*) has the same form of equation [8] except for a different value for α. Inventions of the present application may be practiced with each of normalized kernel forms. In addition, each of the normalized kernels $Sk^{Io}$(*) and Sk(*) may comprise one or more symmetric functions, each of which may comprise a Gaussian function and/or other function.

Parameters A, B, $\sigma_1$, and $\sigma_2$ may be chosen so that the central portion of the scatter distribution is primarily modeled by one of the Gaussian functions, while the tail portions are primarily modeled by the other Gaussian function. For exemplary uses of Sk(*), it will be convenient to group the first two terms and the constant A together as an amplitude function $S_A(I_0, I_{bp})$, which is a function of $I_0$ and $I_{bp}$, and to represent the third term as a form factor $S_{FF}(x-x_m, y-y_n)$, which is only a function of the coordinates x,y and the beam coordinates $x_m, y_n$:

$$Sk(x-x_m, y-y_n, I_0, I_{bp}) = S_A(I_0, I_{bp}) \cdot S_{FF}(x-x_m, y-y_n) \qquad [8A]$$

For this form, both $I_0$ and $I_{bp}$ are functions of $x_m$ and $y_n$, which means that $S_A(I_0, I_{bp})$ is a function of $x_m$ and $y_n$ for this form.

Figure 8A:
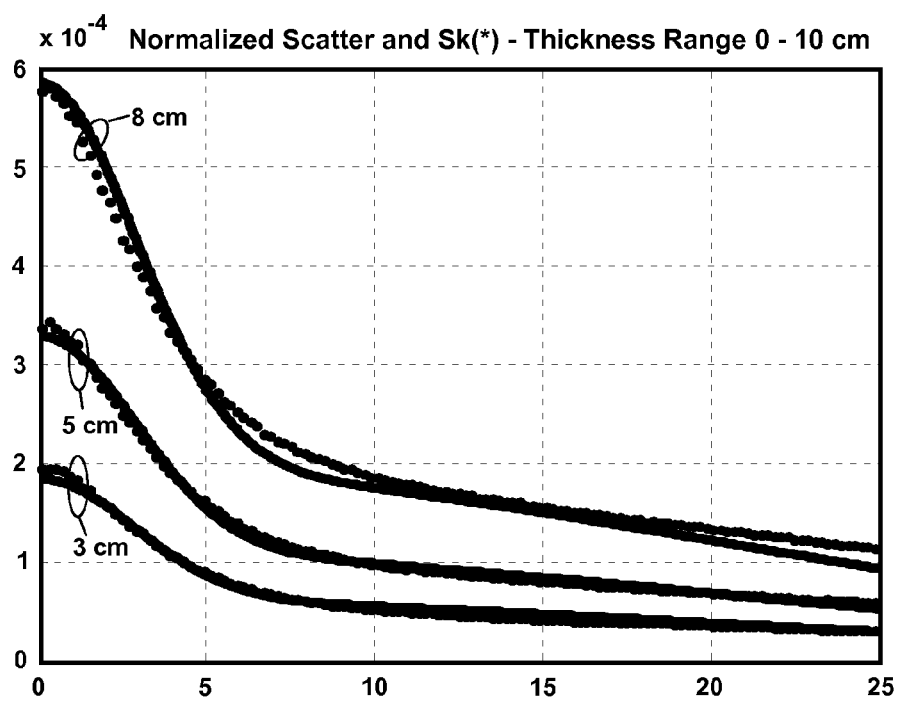
FIGS. 8A and 8B illustrate Monte Carlo simulations of a uniform rectangular slab having a thickness over a first range and the fit of a first kernel instance to the simulated results according to some inventions of the present application.
Figure 8B:
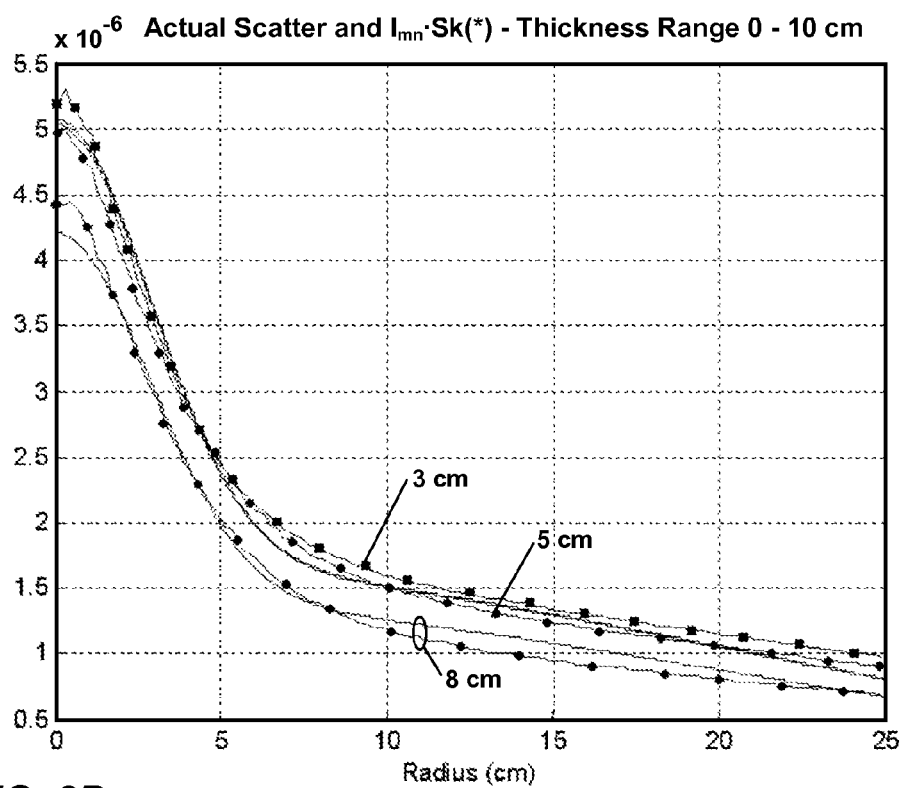

FIG. 8A shows three Monte Carlo simulations of the normalized scatter distributions (normalized to $I_{bp}$) from a perpendicular pencil beam ($x_m$=0, $y_n$=0) through three uniform rectangular slabs of water-based material (density of 1 g/cc) at three different thicknesses: 3 cm, 5 cm, and 8 cm. The distributions are normalized to $I_{bp}$, are plotted as a function of the radius $r=[(x-x_m)^2+(y-y_n)^2]^{1/2}$, and are shown by dots in the figure. The value of $I_0$ for these simulations was set to a typical value found in cone-beam CT systems. FIG. 8A also shows a first form $Sk_1$(*) of scatter kernel Sk(*) according to equation [8] fitted to the scattered distributions (solid lines) by using a suitable set of parameters $A_1$, $B_1$, $\alpha_1$, $\beta_1$, $\sigma_{1,1}$, and $\sigma_{2,1}$. One exemplary set of parameters for r, $x_m$, and $y_n$ in units of centimeters is: $A_1$=9.47×10$^{-5}$, $B_1$=2.2, $\alpha_1$=-0.131, $\beta_1$=1.024, $\sigma_{1,1}$=19.5, and $\sigma_{2,1}$=3.23. The fit is excellent over the thickness range of 0 to 10 cm. FIG. 8B shows the actual scatter distribution for the three slab thicknesses (curves with box or circle indicators), which may be obtained by multiplying the normalized scatter distribution shown in FIG. 8A by $I_{bp}$. Also shown in FIG. 8B is the quantity $I_{bp} \cdot Sk_1$(*) for the three slab thicknesses (solid-line curves). The fit is excellent over the thickness range of 0 to 10 cm. The Monte-Carlo simulations also provide the values of $I_{bp}$ for each of the thickness values, allowing an auxiliary thickness function $T_1(I_{bp})$ to be generated from the data, such as by fitting a polynomial form to the data. As described below in greater detail, auxiliary thickness function $T_1(I_{bp})$, and the auxiliary thickness functions $T_2(I_{bp})$ and $T_3(I_{bp})$ described below, can be useful in inventions of the present application that allocate different instances of the scatter kernel to different portions of the object based on thickness. Specifically, a kernel instance may be assigned to a thickness range, and the auxiliary thickness functions may be used to determine if a pixel should be assigned to the kernel instance based on its value of $I_{bp}$.

Figure 9A:
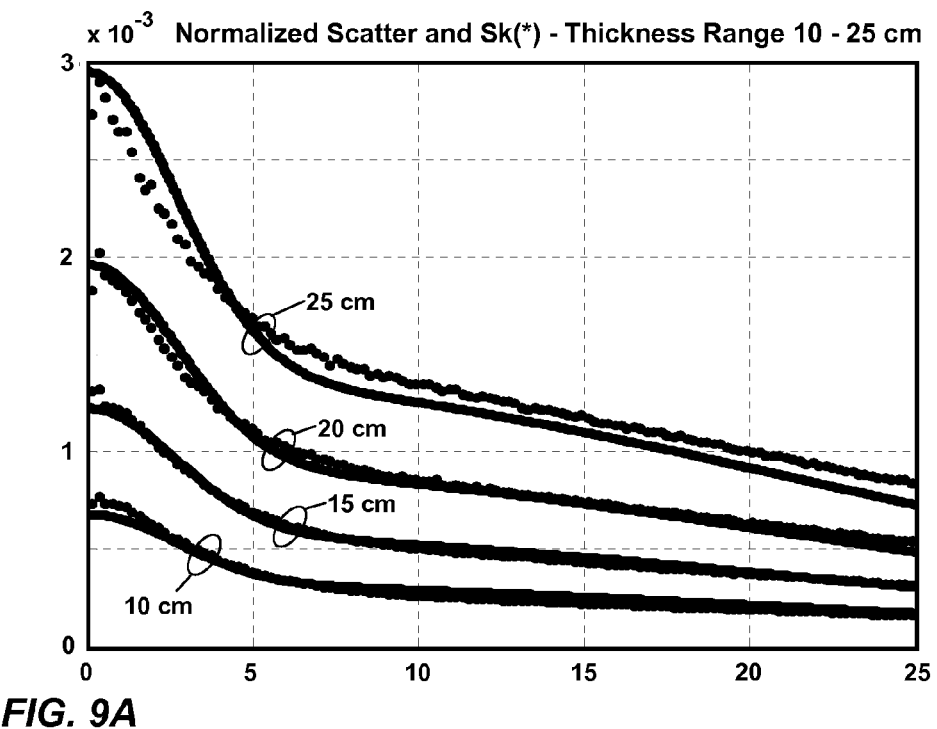
FIGS. 9A and 9B illustrate Monte Carlo simulations of a uniform rectangular slab having a thickness over a second range and the fit of a second kernel instance to the simulated results according to some inventions of the present application.
Figure 9B:
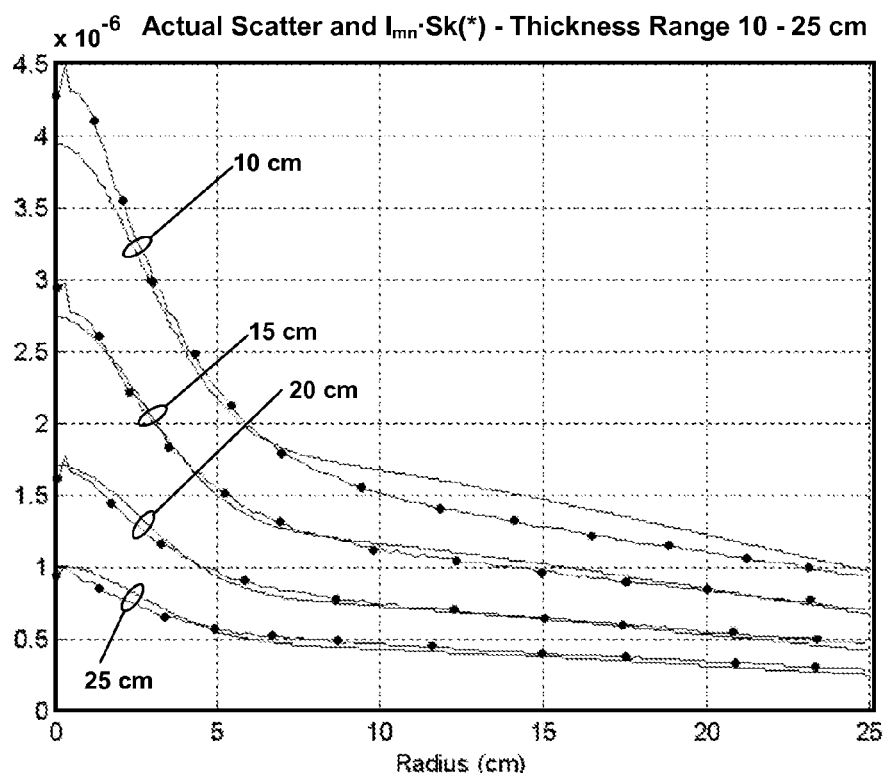

FIG. 9A shows three Monte Carlo simulations of the normalized scatter distributions from a perpendicular pencil beam ($x_m$=0, $y_n$=0) through four uniform rectangular slabs of water-based material (density of 1 g/cc) at four different thicknesses: 10 cm, 15 cm, 20 cm, and 25 cm. The distributions are normalized to $I_{bp}$, are plotted as a function of the radius $r=[(x-x_m)^2+(y-y_n)^2]^{1/2}$, and are shown by dots in the figure. The value of $I_0$ for these simulations was set to a typical value found in cone-beam CT systems. FIG. 9A also shows a second form $Sk_2$(*) of scatter kernel Sk(*) according to equation [8] fitted to the scattered distributions (solid lines) by using a suitable set of parameters $A_2$, $B_2$, $\alpha_2$, $\beta_2$, $\sigma_{1,2}$, and $\sigma_{2,2}$. One exemplary set of parameters for r, $x_m$, and $y_n$ in units of centimeters is: $A_2$=1.10×10$^{-4}$, $B_2$=1.35, $\alpha_2$=-0.173, $\beta_2$=0.978, $\sigma_{1,2}$=21.3, and $\sigma_{2,2}$=2.95. The fit is excellent over the thickness range of 10 to 25 cm. FIG. 9B shows the actual scatter distribution for the four slab thicknesses (curves with circle indicators), which may be obtained by multiplying the normalized scatter distribution shown in FIG. 9A by $I_{bp}$. Also shown in FIG. 9B is the quantity $I_{bp} \cdot Sk_2$(*) for the four slab thicknesses (solid-line curves). The fit is excellent over the thickness range of 10 to 25 cm. The Monte-Carlo simulations also provide the values of $I_{bp}$ for each of the thickness values, allowing a thickness function $T_2(I_{bp})$ to be generated from the data, such as by fitting a polynomial form to the data.

Figure 10A:
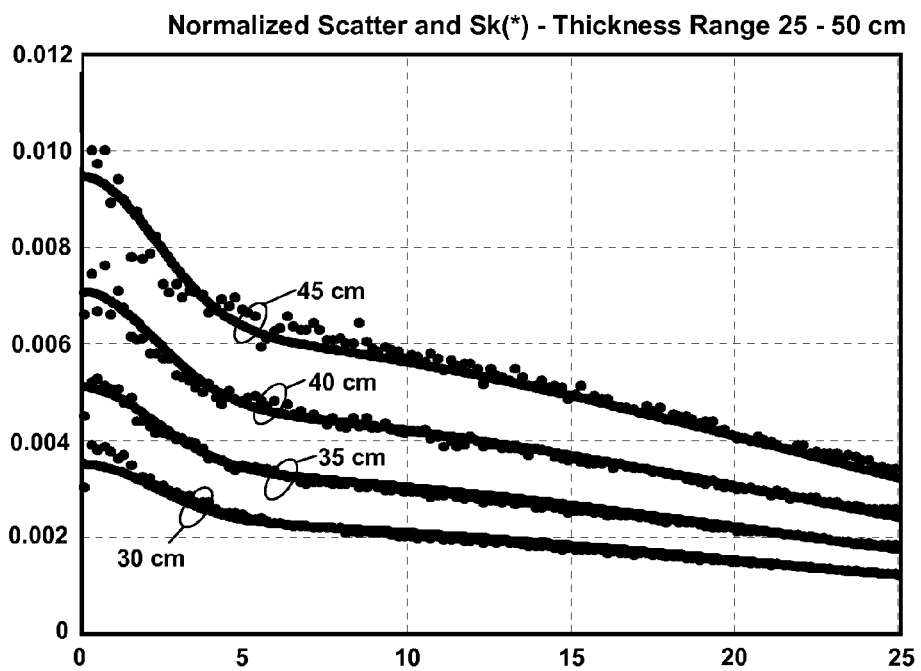
FIGS. 10A and 10B illustrate Monte Carlo simulations of a uniform rectangular slab having a thickness over a third range and the fit of a third kernel instance to the simulated results according to some inventions of the present application.
Figure 10B:
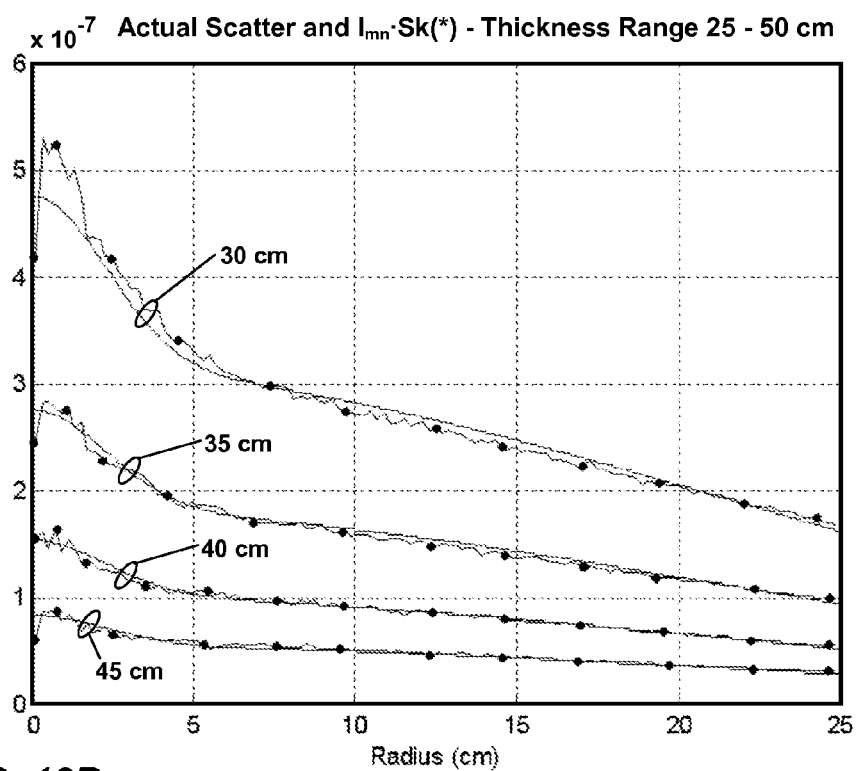

FIG. 10A shows three Monte Carlo simulations of the normalized scatter distributions from a perpendicular pencil beam ($x_m$=0, $y_n$=0) through four uniform rectangular slabs of water-based material (density of 1 g/cc) at four different thicknesses: 30 cm, 35 cm, 40 cm, and 45 cm. The distributions are normalized to $I_{bp}$, are plotted as a function of the radius $r=[(x-x_m)^2+(y-y_n)^2]^{1/2}$, and are shown by dots in the figure. The value of $I_0$ for these simulations was set to a typical value found in cone-beam CT systems. FIG. 10A also shows a second form $Sk_3$(*) of scatter kernel Sk(*) according to equation [8] fitted to the scattered distributions (solid lines) by using a suitable set of parameters $A_3$, $B_3$, $\alpha_3$, $\beta_3$, $\sigma_{1,3}$, and $\sigma_{2,3}$. One exemplary set of parameters for r, $x_m$, and $y_n$ in units of centimeters is: $A_3$=2.05×10$^{-4}$, $B_3$=0.669, $\alpha_3$=-0.270, $\beta_3$=0.421, $\sigma_{1,3}$=21.2, and $\sigma_{2,2}$=2.52. The fit is excellent over the thickness range of 30 to 50 cm. FIG. 10B shows the actual scatter distribution for the four slab thicknesses (curves with circle indicators), which may be obtained by multiplying the normalized scatter distribution shown in FIG. 10A by $I_{bp}$. Also shown in FIG. 10B is the quantity $I_{bp} \cdot Sk_3$(*) for the four slab thicknesses (solid-line curves). The fit is excellent over the thickness range of 30 to 50 cm. The Monte-Carlo simulations also provide the values of $I_{bp}$ for each of the thickness values, allowing a thickness function $T_3(I_{bp})$ to be generated from the data, such as by fitting a polynomial form to the data.

As the parameters are different for each of the forms shown in FIGS. 8-10, the forms can be denoted separately as $Sk_1$(*), $Sk_2$(*), and $Sk_3$(*), respectively. These forms will be used later to illustrate inventions of the present application.

For imaging devices 120 that have small dimensions relative to their distance to the object, the scatter profile $I_{os}$ may be generated from a scatter kernel Sk(*) as follows:

$$I_{os}(x, y) = \sum_{m=-M}^{+M} \sum_{n=-N}^{+N} I_{bp}(x_m, y_n) \cdot Sk(x - x_m, y - y_n, I_{bp}) \quad [9]$$

$$= \sum_{m=-M}^{+M} \sum_{n=-N}^{+N} I_{bp}(x_m, y_n) \cdot S_A(I_0, I_{bp}) \cdot S_{FF}(x - x_m, y - y_n).$$

As equation [9] is based from equation [8A], both $I_{bp}$ and $S_A(I_0, I_{bp})$ are functions of $x_m$ and $y_n$. The latter part of equation [9] may be recognized as the two-dimensional convolution of the product $[I_{bp} S_A(*)]$ with $S_{FF}$(*), giving:

$$I_{os}(x,y)=[I_{bp}(x,y) \cdot S_A(I_0,I_{bp})] \otimes S_{FF}(x,y), \quad [10]$$

where each of $I_{bp}$ and $S_A(I_0, I_{bp})$ are now functions of x and y for the convolution form. Since the Fourier transform of two convolved functions is equal to the multiplication of their Fourier transforms, the profile $I_{os}$ can be generated from the Fourier transforms as follows:

$$I_{os}(x,y)=\mathfrak{I}^{-1}\{\mathfrak{I}\{I_{bp}(x,y) \cdot S_A(I_0,I_{bp})\} \cdot \mathfrak{I}\{S_{FF}(x,y)\}\} \quad [11]$$

where $\mathfrak{I}\{*\}$ denotes a Fourier transform operation, and $\mathfrak{I}^{-1}\{*\}$ denotes an inverse Fourier transform. In equations [10] and [11], each of $I_0$, $I_{bp}$, and $S_A(I_0, I_{bp})$ is a function of coordinates x and y (instead of the pencil beam coordinates $x_m$ and $y_n$). In practice, the summation of equation [9] and the convolution of equation [10] are done over the finite area of the pixel array, which means that contributions from pencil beams that terminate outside of the array are not reflected in $I_{os}(x,y)$. This can affect the scatter values at the edges of the array, and ways for compensating for finite-area summation are described below. It should be said that this is not a problem if the radiation shadow of the object falls within the pixel array. In this case, there is no scattering contribution from pencil beams that terminate outside of the pixel array.

The Fourier transform of form factor $S_{FF}(x,y)$ has primarily low-frequency components because of its Gaussian form. As is known in the mathematics art, the Fourier transform of a Gaussian is another Gaussian, and Gaussian forms have primarily low-frequency components. Because of the summation in equation [9] and convolution in equation [10], the scattered radiation profile $I_{os}(x,y)$ is relatively smooth (i.e., slowly varying) over the x,y domain, and its Fourier transform has primarily low-frequency components. Accordingly, the Fourier transforms in equation [11] can be generated from a decimated set of data (e.g., $[I_{bp}(x,y) \cdot S_A(I_0, I_{bp})]$) on a coarse grid, which considerably speeds the generation of the Fourier transform. As an example, the values of $[I_{bp}(x,y) \cdot S_A(I_0, I_{bp})]$ associated with a 1024 by 768 pixel array for a human torso may be decimated (reduced down to) a 104 by 30 array of "super pixels", where the value of each super pixel represents the values of $[I_{bp}(x,y) \cdot S_A(I_0, I_{bp})]$ over a 9-by-25 block or 10-by-26 block of real pixels. Each super pixel may have its location at the center of its respective block, and may be generated from pixel values of $[I_{bp}(x,y) \cdot S_A(I_0, I_{bp})]$ within the block, such as by generating an average of all or a portion of the values. Here, the term "average" has broad meaning where the "average" can be computed as a mean, a median, a strict average, or as any other conventional central tendency value, and may include truncating the pixel values (i.e., removing pixel values at the distal ends of the data distribution). The Fourier transform of the form factor, $\Im\{S_{FF}(x, y)\}$, may be generated by using the values of the $S_{FF}(x-x_m, y-y_n)$ at the grid locations of the super pixels. The results of the inverse Fourier transform from equation [11] may be computed for the grid locations of the super pixels, and the results of the inverse Fourier transform may be interpolated/extrapolated onto the real pixel array. The Fourier transforms and inverse Fourier transform used herein may be implemented by any of the known discrete Fourier transform processes. In addition, the Fourier transform of the form factor $\Im\{S_{FF}(x, y)\}$ need only be generated once, and may be used for all of projections of the scan.

The array of super pixel blocks may be centered within the pixel array, leaving a margin of unused pixels around the array. This margin, in combination with the extrapolation of the inverse Fourier transform data at the edges of the full array, can be used to overcome loss of information caused by the fact that scatter contributions from the pencil beams that terminate outside the area of the pixel array are not reflected in the values of $I_{os}(x,y)$ near the edges of the pixel array. As another approach of overcoming the loss of information, the Fourier transforms may be generated on an expanded array of super pixels that comprises the above-described array of super pixels for the interior of the pixel array plus a band of "dummy" super pixels for the margin of unused pixels around the pixel array, and also optionally for areas outside of the pixel array surrounding the array. Values of $[I_{bp}(x,y) \cdot S_A(I_0, I_{bp})]$ at the super pixels may be extrapolated onto the dummy super pixels, the Fourier transforms and inverse Fourier transform may be generated and processed using the expanded array, and the results of the inverse Fourier transform may be interpolated to the full pixel array.

Figure 4B:
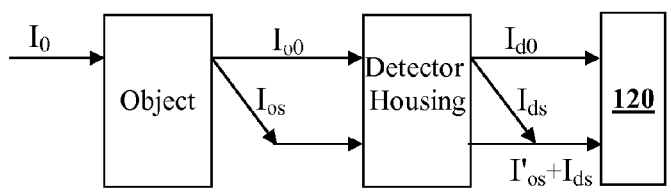
Figure 5:
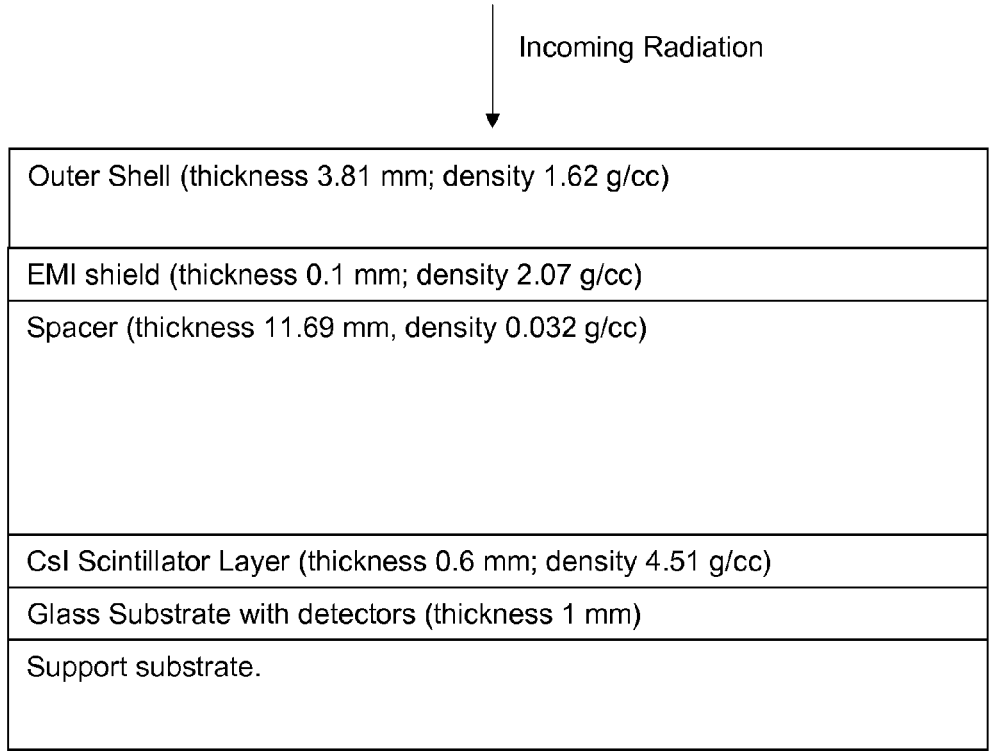
FIG. 5 illustrates the construction of an exemplary detector housing.

Referring briefly back to the imaging chain of FIG. 4B, one use of the symmetric kernel is to estimate the individual profiles $I_{oo}$ and $I_{os}$ from their sum ($I_{oo}+I_{os}$). As described above, it was possible to generate an estimate of the radiation profile $I_I$ at the front of the detector housing from the measured data from imaging device 120, where $I_I = (I_{oo}+I_{os})$. Equation [11] can be used to estimate the profile $I_{os}$, and we can write the following relationship:

$$I_I(x,y) = I_{oo}(x,y) + [I_{bp}(x,y) \cdot S_A(I_0, I_{bp})] \otimes S_{FF}(x,y). \quad [12]$$

In this use of the symmetric kernel, the coordinates x and y are known, and $I_0(x,y)$ can be measured by a calibration step. However, $I_{bp}(x,y)$ is not known; in fact, $I_{bp}(x,y)$ is the profile $I_{oo}$ that is to be estimated from the $I_I(x,y)$. An iterative approach may be used to determine $I_{oo}(x,y)$ (and $I_{bp}(x,y)$) from equation [12]. Specifically, an estimated value $I_{EST}$ for $I_{oo}(x,y)$ (and $I_{bp}(x,y)$) may be used in the convolution term of equation [12], and a more refined estimate of $I_{oo}(x,y)$ may be generated as the difference between $I_I(x,y)$ and the convolution term as follows:

$$I_{oo}(x,y) = I_I(x,y) - [I_{EST}(x,y) \cdot S_A(I_0, I_{EST})] \otimes S_{FF}(x,y). \quad [12A]$$

The iterative approach is illustrated using one instance of the scatter kernel (an iterative approach using multiple instances of the scatter kernel will be illustrated later). An initial estimate $I^0_{oo}(x,y)$ may be generated for $I_{oo}(x,y)$ and used to generate an initial value $I^1_{EST}(x,y) = I^0_{oo}(x,y)$ and an initial value $S_A^1(I_0, I^1_{EST})$ for the amplitude function $S_A(I_0, I^1_{EST})$, where the superscripts denote the iteration number k=0, 1, 2, ... K. The initial estimate $I^0_{oo}(x,y)$ may be a fraction of $I_I(x,y)$, such as $I_I(x,y)/2$, or the estimate for $I_{oo}(x,y)$ generated for a prior projection in the object scan. An initial estimate of the product $[I_{EST}(x,y) \cdot S_A(I_0, I_{EST})]$ may be generated as $[I^1_{EST}(x,y) \cdot S_A^1(I_0, I_{EST})]$. Next, a first iteration estimate $I^1_{oo}(x,y)$ may be generated for $I_{oo}(x,y)$ by applying equation [12A] as follows:

$$I^1_{oo}(x,y) = I_I(x,y) - [I^1_{EST}(x,y) \cdot S_A^1(I_0, I^1_{EST})] \otimes S_{FF}(x,y), \quad [13]$$

where the convolution may be performed using Fourier transforms as described above. More refined estimates of $I_{EST}(x,y)$ and $S_A(I_0, I_{EST})$ for the convolution term may then be generated from $I^1_{oo}(x,y)$, and equation [13] may be reiterated to further refine the estimate for $I_{oo}(x,y)$. The following iteration approach may be used for subsequent iterations k=2 to K for generating refined estimates $I^k_{oo}(x,y)$:

$$I^k_{EST}(x,y) = 0.5 * I^{k-1}_{oo}(x,y) + 0.5 * I^{k-2}_{oo}(x,y) \quad [14A]$$

$$I^k_{oo}(x,y) = I_I(x,y) - [I^k_{EST}(x,y) \cdot S_A^k(I_0, I^k_{EST})] \otimes S_{FF}(x,y) \quad [14B]$$

Equation [14A] provides some damping on the rate of change of $I^k_{EST}(x,y)$ and $S_A^k(I_0, I^k_{EST})$ between the iterations compared to the selection of $I^k_{EST}(x,y) = I^{k-1}_{oo}(x,y)$ and $S_A^k(I_0, I^k_{EST}) = S_A(I_0, I^{k-1}_{oo})$, and minimizes the chances of the values of $I^k_{EST}(x,y)$ and $S_A^k(I_0, I^k_{EST})$ oscillating during the iterations. An equal weighting factor of 0.5 has been used in equation [14A], but different weighting factors may be used (at least the first weighting factor should be non-zero and both weighting factors should sum to 1). Equations [13] and [14] may be applied to the real pixel array, or to the super pixel array. In the latter case, the super pixel values for $I^k_{oo}(x,y)$ and $I_I(x,y)$ may be generated as averages in the manner described above for the quantity $[I_{bp}(x,y) \cdot S_A(I_0, I_{bp})]$, and, if the Fourier transform process has been used to generate $[I^k_{EST}(x,y) \cdot S_A^k(I_0, I^k_{EST})] \otimes S_{FF}(x,y)$ with decimated data, the results of the inverse Fourier transform do not need to be interpolated/extrapolated. The iterations may be continued until the change between iteration values of $[I^k_{EST}(x,y) \cdot S_A^k(I_0, I^k_{EST})]$ and $[I^{k-1}_{EST}(x,y) \cdot S_A^{k-1}(I_0, I^{k-1}_{EST})]$ is below a desired (e.g., set) amount for a desired (e.g., set) number of pixels or super pixels, or until the change between iteration values of $I^k_{oo}(x,y)$ and $I^{k-1}_{oo}(x,y)$ is below a desired amount for a desired number of pixels or super pixels. Additional criteria or other criteria may be used to determine when to stop the iterations, such as monitoring an average measure of the changes over the pixels or super pixels, and setting an upper limit to the number of iterations. If the iterations have been carried out on the super pixels, then one application of equation [14B] using the real pixel array may be used to generate $I^k_{oo}(x,y)$ values over the real pixel array after the last iteration (k=K). For this, the convolution term may be generated on the super pixel array and then interpolated and extrapolated onto the real pixel array. The scattered radiation at any iteration, including the last iteration k=K, may be generated as:

$$I^k_{os}(x,y) = [I^k_{EST}(x,y) \cdot S_A^k(I_0, I^k_{EST})] \otimes S_{FF}(x,y) \quad [14C\text{-}1]$$

or as:

$$I^k_{os}(x,y) = [I^k_{oO}(x,y) \cdot S_A^k(I_0, I^k_{oO})] \otimes S_{FF}(x,y). \quad [14C\text{-}2]$$

Another exemplary iteration approach for subsequent iterations k=2 to K is as follows:

$$[I^k_{EST}(x, y) \cdot S_A^k(I_0, I^k_{EST})] = \quad [15A]$$
$$0.5 * [I^{k-1}_{oO}(x, y) \cdot S_A(I_0, I^{k-1}_{oO})] + 0.5 * [I^{k-1}_{EST}(x, y) \cdot S_A^{k-1}(I_0, I^{k-1}_{EST})]$$

$$I^k_{oO}(x, y) = I_I(x, y) - [I^k_{EST}(x, y) \cdot S_A^k(I_0, I^k_{EST}) \otimes S_{FF}(x, y), \quad [15B]$$

with $[I^1_{EST}(x,y) \cdot S_A^1(I_0 I^1_{EST})] = [I^0_{oO}(x,y) \cdot S_A(I_0, I^0_{oO})]$. Equation [15A] generates a scatter estimate for the current iteration k as a weighted average of the scatter as generated from the most recent estimate of $I_{oO}$ (which is $I^{k-1}_{oO}(x,y)$) and the scatter used in the last iteration. Like Equation [14A], equation [15A] provides some damping on the rate of change of $[I^k_{EST}(x,y) \cdot S_A^k(I_0, I^k_{EST})]$ between the iterations, and minimizes the chances of the values $[I^k_{EST}(x,y) \cdot S_A^k(I_0, I^k_{EST})]$ oscillating during the iterations. An equal weighting factor of 0.5 has been used in equation [15], but different weighting factors may be used (at least the first weighting factor should be non-zero and both weighting factors should sum to 1). Equations [13] and [15] may be applied to the real pixel array, or to the super pixel array. In the latter case, the super pixel values for $I^k_{oO}(x,y)$ and $I_I(x,y)$ may be generated as averages in the manner described above for the quantity $[I_{bp}(x,y) \cdot S_A(I_0, I_{bp})]$, and, if the Fourier transform process has been used to generate $[I^k_{EST}(x,y) \cdot S_A^k(I_0, I^k_{EST})] \otimes S_{FF}(x, y)$ with decimated data, the results of the inverse Fourier transform do not need to be interpolated/extrapolated. The above possible criteria for determining when to end the iterations of equation [14] may be used to determine when to end the iterations of equation [15]. If the iterations have been carried out on the super pixels, then one application of equation [15B] using the real pixel array may be used to generate $I^k_{oO}(x,y)$ values over the real pixel array. For this, the convolution term may be generated on the super pixel array and then interpolated and extrapolated onto the real pixel array. The scattered radiation at any iteration, including the last iteration k=K, may be generated by the above equations [14C].

In equations [14B] and [15B], the term $[I^k_{EST}(x,y) \cdot S_A^k(I_0, I^k_{EST})] \otimes S_{FF}(x, y)$ is preferably generated by the Fourier transform method, but can be generated by a full-space convolution using equation [10] or by a full-space summation using equation [9].

Skew Correction.

Figure 11:
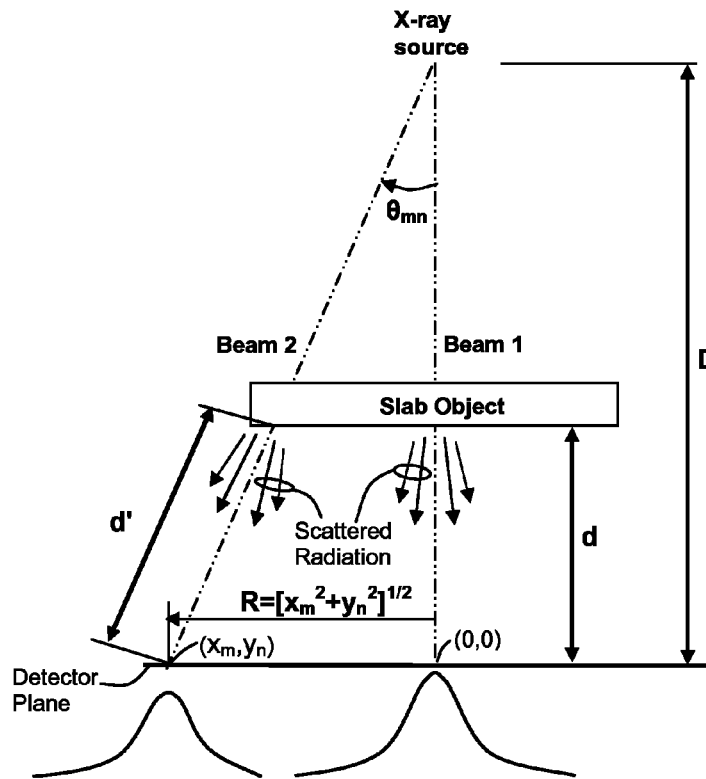
FIG. 11 illustrates the skewing effects on the scattered radiation, which are corrected according to some inventions of the present application.

The accuracy of equation [9] degrades somewhat at the edges of the imaging area in the case where the dimensions of an imaging device 120 are not small relative to distance between the imaging device and the object. This is because the radiation pencil beams at the edges make oblique angles to the surface of the imaging device 120, up to 9° in typical systems with imaging device 120 centered about the projection axis, and up to 14.5° in typical systems with device 120 offset from the projection axis for half-fan scanning. This causes the scattered radiation to strike the imaging device 120 at skewed angles, as illustrated in FIG. 11. In the figure, two pencil beams are shown. Beam 1 is perpendicular to the detector plane of imaging device 120, and is directed to pixel location (x,y)=(0,0). Beam 2 is oblique, is directed to pixel location (x,y)=($x_n, y_m$), and makes an angle $\theta_p$ with respect to the projection axis, an angle $\theta_{xm}$ as projected onto the x-z plane, and an angle $\theta_{yn}$ as projected onto the y-z plane. There is no skewing of the scattered radiation from Beam 1, but there is some skewing from the scattered radiation from Beam 2. The peak of the scatter distribution for Beam 2 is less than that for Beam 1 by a factor of $\cos^3(\theta_p)$ because of two factors. As the first factor, the distance d' between the detector and the object along Beam 2 is longer than the distance d between the detector and the object along Beam 1 by an amount $\cos(\theta_p)$, which means that the radiation intensity decreases by a factor of $\cos^2(\theta_p)$ because the inverse square law of spherical radiation propagation. As the second factor, the scatter radiation strikes the pixel at an angle of $\theta_p$ rather than perpendicular angle, which reduces the intensity by another factor of $\cos(\theta_p)$. As a further skewing effect, the right side of the scatter distribution is compressed toward the distribution's peak and increased in relative value since it strikes the detector plane before the peak does, and the left side of the scatter distribution is expanded away from the peak and decreased in relative value since it strikes the detector plane after the peak does. Mathematically modeling of the compression and expansion of the sides is difficult and only yields small corrections. However, the relative increase and decrease in the values of the sides can be readily modeled by the term:

$$d^2/[d + \tan(\theta_{xm})(x - x_m) + \tan(\theta_{yn}) \cdot (y - y_n)]^2.$$

With the above observations, the following correction factor $Z(x - x_m, y - y_n, \theta_p, \theta_{xm}, \theta_{yn})$ may be used to remove a substantial portion of the skewing effects:

$$Z(x - x_m, y - y_n, \theta_p, \theta_{xm}, \theta_{yn}) = \quad [16]$$
$$\cos^3(\theta_P) \cdot \left( \frac{d}{d + \tan(\theta_{xm}) \cdot (x - x_m) + \tan(\theta_{yn}) \cdot (y - y_n)} \right)^2,$$

where $\cos(\theta_p) = D/[D^2 + x_m^2 + y_n^2]^{1/2}$, $\tan(\theta_{xm}) = x_m/D$, $\tan(\theta_{yn}) = y_n/D$.

Correction factor $Z(x - x_m, y - y_n, \theta_p, \theta_{xm}, \theta_{yn})$ is applied by multiplying it with $Sk(x - x_m, y - y_n, I_{bp})$ in equation [9]. Unfortunately, the form of $Z(*)$ in equation [16] does not lead to a ready convolution form like equation [10]. This is because $\tan(\theta_{xm})$ and $\tan(\theta_{yn})$, which multiply the convolution differences $(x - x_m)$ and $(y - y_n)$ and change in value with $x_m$ and $y_n$, cannot be regrouped with $[I_{bp}(x,y) \cdot S_A(I_0, I_{bp})]$. One approach is to use an approximate correction factor $Z'(\theta_p) = \cos^3(\theta_p)$, which removes the mixed products and the dependence on $x - x_m$, $y - y_n$, $\theta_{xm}$, and $\theta_{yn}$. The approximate correction factor $Z'(\theta_p)$ can be grouped with $[I_{bp}(x,y) \cdot S_A(I_0, I_{bp})]$ in equation [9], and leads to the following modified form of the convolution equation:

$$I_{os}(x, y) = [Z'(\theta_{xy}) \cdot I_{bp}(x, y) \cdot S_A(I_0, I_{bp})] \otimes S_{FF}(x, y) \quad [10A]$$
$$= [I_{bp}(x, y) \cdot S'_A(I_0, I_{bp})] \otimes S_{FF}(x, y),$$

where $S_A'(I_0, I_{bp}) = Z'(\theta_{xy}) \cdot S_A(I_0, I_{bp})$, and where the argument to $Z'(*)$ is now $\theta_{xy}$ instead of $\theta_p$ because of the convolution form $(\cos(\theta_{xy}) = D/[D^2 + x^2 + y^2]^{1/2})$. The generation of $I_{os}(x,y)$ using the Fourier transforms of equation [11] then directly follows using $S_A'(I_0, I_{bp})$ in place of $S_A(I_0, I_{bp})$, as follows:

$$I_{os}(x,y) = \mathfrak{I}^{-1}\{\mathfrak{I}\{I_{bp}(x,y) \cdot S_A'(I_0, I_{bp})\} \cdot \mathfrak{I}\{S_{FF}(x,y)\}\}. \quad [11A]$$

The iteration approaches illustrated by equations [13]-[15] also directly follow using $I_{EST}$ in place of $I_{bp}$ and $S_A'(I_0, I_{EST})$ in place of $S_A(I_0, I_{EST})$.

To provide another approximate correction factor that can lead to a convolution form, $Z(x-x_m, y-y_n, \theta_p, \theta_{xm}, \theta_{yn})$ may be linearized to provide:

$$Z''(x-x_m, y-y_n, \theta_p, \theta_{xm}, \theta_{yn}) =$$
$$\cos^3(\theta_P) \cdot \left(1 - 2 \cdot \frac{\tan(\theta_{xm})}{d} \cdot (x_m - x) - 2 \cdot \frac{\tan(\theta_{yn})}{d} \cdot (y_n - y)\right).$$

This enables $I_{os}(x,y)$ to be generated from the following sum of three convolutions:

$$I_{os}(x, y) = [\cos^3(\theta_{xy}) \cdot I_{bp} \cdot S_A(I_0, I_{bp})] \otimes [S_{FF}(x, y)] - \quad [10B]$$
$$[2 \cdot \cos^3(\theta_{xy}) \cdot I_{bp} \cdot \tan(\theta_x) \cdot S_A(I_0, I_{bp})] \otimes [S_{FF}(x, y) \cdot (x/d)] -$$
$$[2 \cdot \cos^3(\theta_{xy}) \cdot I_{bp} \cdot \tan(\theta_y) \cdot S_A(I_0, I_{bp})] \otimes [S_{FF}(x, y) \cdot (y/d)],$$

where $\theta_p$, $\theta_{xm}$, $\theta_{yn}$ have been replaced by $\theta_{xy}$, $\theta_x$, $\theta_y$, respectively, because of the convolution form ($\tan(\theta_x)=x/D$, $\tan(\theta_y)=y/D$). $I_{os}(x,y)$ may be generated by Fourier transforms by taking the Fourier transforms of each of the bracketed terms (6 in total), multiplying the transforms corresponding to the convolution pairs to generate three multiplication products, summing the three multiplication products together, and taking the inverse Fourier transform of the summation. The iteration approaches illustrated by equations [13]-[15] also directly follow using $I_{EST}$ in place of $I_{bp}$, and using $S_A'(I_0, I_{EST})$ in place of $S_A(I_0, I_{EST})$ Multiple Symmetric Kernel Forms for Different Thickness Ranges.

Figure 12:
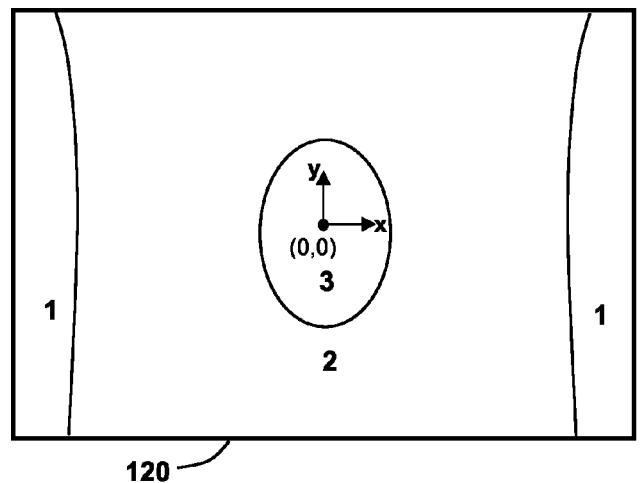
FIG. 12 is a top plan representation of the pixel array during an iteration where the pixels are divided into groups according to object thickness, according to some inventions of the present application.

As indicated above, another invention set of the present application relates to constructing two or more instances of the new symmetric form for two or more respective ranges of object thickness, and applying the instances of the new symmetric form to regions of a radiographic projection according to a measure of the object's thickness in the regions. An exemplary embodiment of the invention is illustrated with the kernel form instances $Sk_1(*)$, $Sk_2(*)$, and $Sk_3(*)$ and their corresponding thickness functions $T_1(*)$, $T_2(*)$, and $T_3(*)$ previously described with respect to FIGS. 8-10. The thickness functions can be used to determine the values of radiation intensity ($I_{bp}$) that separate the thickness regions from one another. For example, it can be found from the thickness functions that an intensity value $I_A$ separates the first thickness region (0-10 cm, modeled by kernel $Sk_1(*)$) from the second thickness region (10-25 cm, modeled by kernel $Sk_2(*)$), and that an intensity value $I_B$ separates the second thickness region from the third thickness region (25 cm and above, modeled by $Sk_3(*)$), with $I_A$ being greater than $I_B$. During each iteration of either of equations [14] or [15], estimated primary beam profile $I^k_{EST}(x,y)$ can be determined from either the initial value or the results of the previous iteration. Each pixel value of $I^k_{EST}(x,y)$ (or $I_{bp}$) may be compared with $I_A$ and $I_B$ to determine which kernel should be used to generate the scattered radiation associated with the pencil beam terminating at the pixel. FIG. 12 shows a top plan representation of the pixel array during an iteration k where the pixels are divided into four groups according to object thickness. Two groups are labeled with the notation "1" and cover pixels with primary beam intensity values $I_{bp}$ or $I^k_{EST}(x,y)$ greater than $I_A$, corresponding to an object thickness range from 0 cm up to 10 cm. These pixels are modeled with the first kernel instance $Sk_1(*)$. One group is labeled with the notation "2" and covers pixels with intensity values $I_{bp}$ or $I^k_{EST}(x,y)$ equal to or less than $I_A$ and greater than $I_B$, corresponding to an object thickness range from 10 cm up to 25 cm. These pixels are modeled with the second kernel instance $Sk_2(*)$. The last group is labeled with the notation "3" and covers pixels with intensity values $I_{bp}$ or $I^k_{EST}(x,y)$ equal to or less than $I_B$, corresponding to an object thickness range of 25 cm or more. These pixels are modeled with the third kernel instance $Sk_3(*)$.

The summation-based equation [9] for $I_{os}(x,y)$ may be expanded to include three separate double summations, one for each of the kernel instances: $Sk_1(*)$, $Sk_2(*)$, and $Sk_3(*)$. Each double summation may be only over the group of pixels covered by the kernel of the double summation. The expanded summation-based equation is as follows:

$$I_{os}(x, y) = \sum_{Group\ 1}\sum I_{bp}(x_m, y_n) \cdot Sk_1(x - x_m, y - y_n, I_{bp}) + \quad [17]$$
$$\sum_{Group\ 2}\sum I_{bp}(x_m, y_n) \cdot Sk_2(x - x_m, y - y_n, I_{bp}) +$$
$$\sum_{Group\ 3}\sum I_{bp}(x_m, y_n) \cdot Sk_3(x - x_m, y - y_n, I_{bp}).$$

As equation [17] is based from equation [8A], both $I_{bp}$ and $S_A(I_0, I_{bp})$ are functions of $x_m$ and $y_n$. Any of the skew correction factors $Z(*)$, $Z'(*)$, or $Z''(*)$ may be applied to equation [17] by multiplying it with each of the kernel instances. To obtain the corresponding convolution form for $I_{os}(x,y)$, each kernel instance may be written as the product of its amplitude function and its form factor, e.g., $Sk_1(x-x_m, y-y_n, I_{bp})=S_{A,1}(I_0, I_{bp}) \cdot S_{FF,1}(x, y)$, and each amplitude function may be set to a value of zero for pixels that are not covered by its kernel instance. For example, amplitude function $S_{A,1}(I_0, I_{bp})$ for $Sk_1(*)$ has zero values for the pixel locations in Groups 2 and 3, and non-zero values for the pixels in Group 1; amplitude function $S_{A,2}(I_0, I_{bp})$ for $Sk_2(*)$ has zero values for the pixel locations in Groups 1 and 3, and non-zero values for the pixels in Group 2, etc. With that format of the amplitude functions, the convolution form is readily identified as:

$$I_{os}(x, y) = [I_{bp}(x, y) \cdot S_{A,1}(I_0, I_{bp})] \otimes \quad [18]$$
$$S_{FF,1}(x, y) + [I_{bp}(x, y) \cdot S_{A,2}(I_0, I_{bp})] \otimes$$
$$S_{FF,2}(x, y) + [I_{bp}(x, y) \cdot S_{A,3}(I_0, I_{bp})] \otimes S_{FF,3}(x, y)$$

where each of $I_{bp}$, $S_{A,1}(I_0, I_{bp})$, $S_{A,2}(I_0, I_{bp})$, and $S_{A,3}(I_0, I_{bp})$ are now functions of x and y for the convolution form. If there are no pixels or super pixels in the third group, then the convolution $[I_{bp}(x,y) \cdot S_{A,3}(I_0, I_{bp})] \otimes S_{FF,3}(x, y)$ may be omitted from equation [18] and other similar equations provided below. Skew correction factors $Z'(\theta_p)$ may be applied to equation [18] by multiplying it with each of the amplitude functions, as was done with equation [10A]. The application of skew correction factors $Z''(*)$ to equation [18] follows a similar form to that of equation [10B], but leads to the summation of nine convolution terms.

Since the Fourier transform of two convolved functions is equal to the multiplication of their Fourier transforms, the profile $I_{os}$ from equation [18] can be generated from the Fourier transforms as follows:

$$I_{os}(x, y) = \mathfrak{I}^{-1}\{\mathfrak{I}(I_{bp}(x, y) \cdot S_{A,1}(I_0, I_{bp})) \cdot \mathfrak{I}(S_{FF,1}(x, y)) + \qquad [19]$$
$$\mathfrak{I}(I_{bp}(x, y) \cdot S_{A,2}(I_0, I_{bp})) \cdot \mathfrak{I}(S_{FF,2}(x, y)) +$$
$$\mathfrak{I}(I_{bp}(x, y) \cdot S_{A,3}(I_0, I_{bp})) \cdot \mathfrak{I}(S_{FF,3}(x, y))\}.$$

Equation [19] is typically applied on the array of super pixels rather than the array of real pixels, using the same super pixel construction processes as described above with regard to equation [11]. In this regard, an average value of $I_{bp}$ over the pixels covered by a super pixel may be used to determine which kernel instance to use for the super pixel. The Fourier transform of the form factors $\mathfrak{I}\{S_{FF,1}(x, y)\}$, $\mathfrak{I}\{S_{FF,2}(x, y)\}$, and $\mathfrak{I}\{S_{FF,3}(x, y)\}$ may be generated by using the values of the form factors at the grid locations of the super pixels; they may be generated once, and may be used for all of the projections of the scan. The results of the inverse Fourier transform from equation [19] may be computed for the grid locations of the super pixels, and the results of the inverse Fourier transform may be interpolated/extrapolated onto the real pixel array in any of the above-described manners. The Fourier transforms and inverse Fourier transform used herein may be implemented by any of the known discrete Fourier transform processes. If there are no pixels or super pixels in the third group, then the Fourier product $\mathfrak{I}(I_{mn} \cdot S_{A,3}(I_0, I_{mn})) \cdot \mathfrak{I}(S_{FF,3}(x, y))$ may be omitted from equation [19], and other similar equations provided below.

Using equation [18], the corresponding form of equation [12A] for generating an estimate of $I_{oo}(x,y)$ from $I_I(x,y)$ is as follows:

$$I_{oo}(x, y) = I_I(x, y) - \{[I_{EST}(x, y) \cdot S_{A,1}(I_0, I_{EST})] \otimes \qquad [20]$$
$$S_{FF,1}(x, y) + [I_{EST}(x, y) \cdot S_{A,2}(I_0, I_{EST})] \otimes S_{FF,2}(x, y) +$$
$$[I_{EST}(x, y) \cdot S_{A,3}(I_0, I_{EST})] \otimes S_{FF,3}(x, y)\}.$$

An iteration approach similar to equations [13]-[15] may used to generate an estimate of $I_{oo}(x,y)$. An initial estimate for $I^0_{oo}(x,y)$ may be generated for $I_{oo}(x,y)$, such as using a fraction of $I_I(x,y)$, and used for $I_{EST}(x,y)$ in equation [20]. Each pixel value of the initial estimate $I^0_{oo}(x,y)$ ($I_{EST}(x,y)$) may be compared with the intensity values $I_A$ and $I_B$ to determine which kernel instance the pixel should be assigned to, as described above. Then, each kernel instance's amplitude function $S_{A,1}(I_0,I_{EST})$, $S_{A,2}(I_0,I_{EST})$, and $S_{A,3}(I_0,I_{EST})$ is generated using the pixel values of $I^0_{oo}(x,y)$ ($I_{EST}(x,y)$) of the pixels that have been assigned to the kernel instance. Next, a first iteration estimate $I^1_{oo}(x,y)$ may be generated for $I_{oo}(x,y)$ by applying equation [20] as follows, using our previous notation $I^1_{EST}$ for the first iteration:

$$I^1_{oo}(x, y) = I_I(x, y) - \{[I^1_{EST}(x, y) \cdot S^1_{A,1}(I_0, I^1_{EST})] \otimes \qquad [21]$$
$$S_{FF,1}(x, y) + [I^1_{EST}(x, y) \cdot S^1_{A,2}(I_0, I^1_{EST})] \otimes$$
$$S_{FF,2}(x, y) + [I^1_{EST}(x, y) \cdot S^1_{A,3}(I_0, I^1_{EST})] \otimes S_{FF,3}(x, y)\}$$

where the convolution may be performed using Fourier transforms as described above with reference to equation [19]. More refined estimates of $I_{EST}(x,y)$, $S_{A,1}(I_0, I_{EST})$, $S_{A,2}(I_0, I_{EST})$, and $S_{A,3}(I_0, I_{EST})$ may then be generated from $I^1_{oo}(x,y)$, and equation [21] may be reiterated to further refine the estimate for $I_{oo}(x,y)$. During this refinement, it is possible for there to be changes in the kernel assignments for some of the pixels (or super pixels). The following iteration approach similar to equation [14] may be used for subsequent iterations k=2 to K for generating refined estimates $I^k_{oo}(x,y)$:

$$I^k_{EST}(x, y) = 0.5 * I^{k-1}_{oo}(x, y) + 0.5 * I^{k-2}_{oo}(x, y), \qquad [22A]$$

$$\text{Generate } S^k_{A,1}(I_0, I^k_{EST}), S^k_{A,2}(I_0, I^k_{EST}), \text{ and } S^k_{A,3}(I_0, I^k_{EST}), \qquad [22B]$$

$$I^k_{oo}(x, y) = I_I(x, y) - \{[I^k_{EST}(x, y) \cdot S^k_{A,1}(I_0, I^k_{EST})] \otimes \qquad [22C]$$
$$S_{FF,1}(x, y) + [I^k_{EST}(x, y) \cdot S^k_{A,2}(I_0, I^k_{EST})] \otimes S_{FF,2}(x, y) +$$
$$[I^k_{EST}(x, y) \cdot S^k_{A,3}(I_0, I^k_{EST})] \otimes S_{FF,3}(x, y)\}.$$

Equation [22A] provides some damping on the rate of change of $I^k_{EST}(x,y)$ and the amplitude functions $S_{A,1}{}^k(I_0, I^k_{EST})$, $S_{A,2}{}^k(I_0,I^k_{EST})$, and $S_{A,3}{}^k(I_0, I^k_{EST})$ between the iterations, and minimizes the chances of the function values oscillating during the iterations. An equal weighting factor of 0.5 has been used in equation [22A], but different weighting factors may be used (at least the first weighting factor should be non-zero and both weighting factors should sum to 1). Also, the kernel-instance assignment of the pixels (or super pixels) may be frozen for the latter iterations to prevent oscillations caused by switching assignments at group boundaries.

Equations [21] and [22] may be applied to the real pixel array, or to the super pixel array. In the latter case, the super pixel values for $I^k_{oo}(x,y)$ and $I_I(x,y)$ may be generated as averages in the manner described above for equations [13]-[15], and, if the Fourier transform process (equation [19]) has been used to generate the convolution terms from decimated data, the results of the inverse Fourier transform do not need to be interpolated/extrapolated during the iterations. The iterations may be continued until the change between the current and previous values of each amplitude function, as multiplied by $I^k_{EST}(x,y)$, is below a desired (e.g., set) amount for a desired (e.g., set) number of pixels or super pixels, or until the change between iteration values of $I^k_{oo}(x,y)$ and $I^{k-1}_{oo}(x,y)$ is below a desired amount for a desired number of pixels or super pixels. Additional criteria or other criteria may be used to determine when to stop the iterations, as described above for equations [13]-[15]. If the iterations have been carried out on the super pixels, then one application of equation [22C] using the real pixel array may be used to generate $I^k_{oo}(x,y)$ values over the real pixel array after the last iteration (k=K). For this, the convolution term may be generated on the super pixel array and then interpolated and extrapolated onto the real pixel array. The scattered radiation at any iteration, including the last iteration k=K, may be generated as:

$$I^k_{os}(x, y) = [I^k_{EST}(x, y) \cdot S^k_{A,1}(I_0, I^k_{EST})] \otimes \qquad [22D-1]$$
$$S_{FF,1}(x, y) + [I^k_{EST}(x, y) \cdot S^k_{A,2}(I_0, I^k_{EST})] \otimes$$
$$S_{FF,2}(x, y) + [I^k_{EST}(x, y) \cdot S^k_{A,3}(I_0, I^k_{EST})] \otimes S_{FF,3}(x, y)$$

or as:

$$I^k_{os}(x, y) = [I^k_{oo}(x, y) \cdot S^k_{A,1}(I_0, I^k_{oo})] \otimes \qquad [22D-2]$$
$$S_{FF,1}(x, y) + [I^k_{oo}(x, y) \cdot S^k_{A,2}(I_0, I^k_{oo})] \otimes$$
$$S_{FF,2}(x, y) + [I^k_{oo}(x, y) \cdot S^k_{A,3}(I_0, I^k_{oo})] \otimes S_{FF,3}(x, y).$$

Another iteration approach similar to that of equation [15] for subsequent iterations k=2 to K is as follows:

$$[I_{EST}^k(x,y) \cdot S_{A,1}^k(I_0, I_{EST}^k)] = 0.5 * [I_{oo}^{k-1}(x,y) \cdot S_{A,1}(I_0, I_{oo}^{k-1})] + \quad [23A\text{-}1]$$
$$0.5 * [I_{EST}^{k-1}(x,y) \cdot S_{A,1}^{k-1}(I_0, I_{EST}^{k-1})]$$

$$[I_{EST}^k(x,y) \cdot S_{A,2}^k(I_0, I_{EST}^k)] = 0.5 * [I_{oo}^{k-1}(x,y) \cdot S_{A,2}(I_0, I_{oo}^{k-1})] + \quad [23A\text{-}2]$$
$$0.5 * [I_{EST}^{k-1}(x,y) \cdot S_{A,2}^{k-1}(I_0, I_{EST}^{k-1})]$$

$$[I_{EST}^k(x,y) \cdot S_{A,3}^k(I_0, I_{EST}^k)] = 0.5 * [I_{oo}^{k-1}(x,y) \cdot S_{A,3}(I_0, I_{oo}^{k-1})] + \quad [23A\text{-}3]$$
$$0.5 * [I_{EST}^{k-1}(x,y) \cdot S_{A,3}^{k-1}(I_0, I_{EST}^{k-1})]$$

$$I_{oo}^k(x,y) = I_I(x,y) - \{[I_{EST}^k(x,y) \cdot S_{A,1}^k(I_0, I_{EST}^k)] \otimes \quad [23B]$$
$$S_{FF,1}(x,y) + [I_{EST}^k(x,y) \cdot S_{A,2}^k(I_0, I_{EST}^k)] \otimes$$
$$S_{FF,2}(x,y) + [I_{EST}^k(x,y) \cdot S_{A,3}^k(I_0, I_{EST}^k)] \otimes S_{FF,3}(x,y)\}$$

with $[I^1_{EST}(x,y) \cdot S_{A,1}^1(I_0, I^1_{EST})] = [I^0_{oo}(x,y) \cdot S_{A,1}(I_0, I^0_{oo})]$, $[I^1_{EST}(x,y) \cdot S_{A,2}^1(I_0, I^1_{EST})] = [I^0_{oo}(x,y) * S_{A,2}(I_0, I^0_{oo})]$, and $[I^1_{EST}(x,y) \cdot S_{A,3}^1(I_0, I^1_{EST})] = [I^0_{oo}(x,y) \cdot S_{A,3}(I_0, I^0_{oo})]$. Each of equation [23A] generates a scatter estimate for the current iteration k as a weighted average of the scatter as generated from the most recent estimate of $I_{oo}$ (which is $I^{k-1}_{oo}(x,y)$) and the scatter used in the last iteration. Like Equation [22A], equations [23A] provide some damping on the rate of change of the amplitude functions between the iterations, and minimize the chances of the function values oscillating during the iterations. An equal weighting factor of 0.5 has been used in equation [23A], but different weighting factors may be used (at least the first weighting factor should be non-zero and both weighting factors should sum to 1). If the kernel assignment of a pixel or super pixel changes during an iteration, its $I_{EST}(*) \cdot S_{A,x}(*)$ value will be averaged with zero values for subsequent iterations if $S_{A,x}(*)$ changes from a non-zero value to a zero value, and its $I_{EST}(*) \cdot S_{A,x}(*)$ value will start from zero and be averaged with non-zero value for subsequent iterations if $S_{A,x}(*)$ changes from a zero value to a non-zero value, thereby providing a smooth transition. Equations [21] and [23] may be applied to the real pixel array, or to the super pixel array. In the latter case, the super pixel values for $I^k_{oo}(x,y)$ and $I_I(x,y)$ may be generated as averages in the manner described above for equations [13]-[15], and, if the Fourier transform process (equation [19]) has been used to generate the convolution terms from decimated data, the results of the inverse Fourier transform do not need to be interpolated/extrapolated during the iterations. The above possible criteria for determining when to end the iterations of equation [22] may be used to determine when to end the iterations of equation [23]. If the iterations have been carried out on the super pixels, then one application of equation [23B] using the real pixel array may be used to generate $I^k_{oo}(x,y)$ values over the real pixel array. For this, the convolution term may be generated on the super pixel array and then interpolated and extrapolated onto the real pixel array. The scattered radiation at any iteration, including the last iteration k=K, may be generated according to equations [22D].

In equations [22C] and [23B], the convolution terms are preferably generated by the Fourier transform method, but they can be generated by a full-space convolution using equation [18] or by a full-space summation using equation [17]. These implementations, though slow, would allow use of the full skew correction factor $Z(\theta_p)$. Skew correction factors $Z'(\theta_p)$ may be applied to each of equations [21], [22C] and [23B] by multiplying it with each of the amplitude functions, as was done with equation [10A]. The application of skew correction factors $Z''(*)$ to each of equations [21], [22C] and [23B] follows a similar form to that of equation [10B], but leads to the summation of nine convolution terms, but which can be readily handled by the Fourier transform form of equation [19].

Asymmetric Point-Scatter Functions.

As indicated above, yet another set of inventions of the present application relates to a new class of asymmetric point-scatter functions that provide improved projection-correction results relative to symmetric point-scatter functions. The new class of asymmetric point-scatter functions, also called asymmetric kernels, was discovered by the inventors through experiments on slabs of material with non-uniform thicknesses. FIG. 13 shows a conventional Monte-Carlo-based experiment of directing a pencil beam of radiation at a perpendicular angle through a material slab (e.g., water, 1 g/cc density) having a uniform thickness of 300 mm (30 cm). The resulting profile of scattered radiation is shown in FIG. 15 by the curve with square indicators; it has radial symmetry about the axis of the pencil beam. In reality, objects are not rectangular, particularly human objects. FIG. 14 shows an innovative Monte-Carlo-based experiment by the inventors of directing a radiation pencil beam through a material slab (e.g., water, 1 g/cc density) having a wedge shape. The wedge has an angle of 45 degrees at its left side, and two angles of 67.5 degrees at its right side. The wedge has a symmetry axis passing through the 45-degree wedge angle, as shown in the figure. The pencil beam axis is perpendicular to the wedge's symmetry axis, is directed at point EP of the wedge, and passes through a portion of the wedge having a thickness of 300 mm (30 cm). The resulting profile of scattered radiation is shown in FIG. 15 by the curve with triangle indicators; it is asymmetric about the axis of the pencil beam. Relative to the symmetric curve, the asymmetric curve is elevated through the thinner region of the object and depressed through the thicker region of the object. This is because the scattered radiation sees less attenuation when it passes through the thinner region of the wedge, and is therefore elevated in magnitude relative to the uniform-slab case, and sees more attenuation when it passes through the thicker region of the wedge, and is therefore depressed in magnitude relative to the uniform-slab case. Thus, the scatter intensity changes with the thickness variations in the neighborhood of the pencil beam, even if the path length seen by the pencil beam itself is the same in both the wedge and uniform slab cases.

Over a range of object thicknesses, this asymmetric effect for a radiation pencil beam can be modeled by what we call an asymmetric kernel Ak(*). Ideally, the asymmetric kernel is a function of the point (x,y) where the scattered radiation terminates on device 120 and the point ($x_m, y_n$) where the pencil beam terminates on device 120, just as in the case of the symmetric kernels, and is also a function of the object thickness that the scattered radiation sees in traveling from point EP to point (x,y). In the context of the tomographic reconstruction, an object thickness $\tau(x,y)$ can be associated with each point (x,y) of imaging device 120, and can be estimated from the measured projection data according to the relation $\tau(x,y) = \ln[I_0/I_{oo}(x,y)]/\mu$, where $\mu$ is around 0.19 to 0.21 cm$^{-1}$ for water- and soft-tissue like materials (density of ~1 g/cc) irradiated by radiation with typical beam energies. However, $\tau(x,y)$ is the object thickness seen along the direct path from source 110 to the point (x,y), not the object thickness seen by the scattered radiation traveling from point EP to point (x,y). The scattered radiation to point (x,y) sees an object thickness that is between $\tau(x,y)$ and the object thickness seen by the pencil beam, the latter of which can be denoted at $\tau(x_m, y_n)$.

For the wedge shape, the inventors have found that the object thickness seen by the scattered radiation can be estimated as follows:

$$\tau\left(\frac{x-x_m}{M}+x_m, \frac{y-y_n}{M}+y_n\right), \quad [24]$$

where M is a factor of about 1.6 that is due to the difference in the lengths between the path from source 110 to point (x,y) and the path from point EP to point (x,y). Factor M is dependent upon the system configuration.

Referring to FIG. 15, we propose to multiply the scatter distribution found in the uniform slab case (the curve with square indicators) by the following asymmetric form factor that uses the form of equation [24]:

$$\mathit{Aff}(x_m, y_n, x, y) = \left\{1 + \gamma \cdot \left[\tau\left(\frac{x-x_m}{M}+x_m, \frac{y-y_n}{M}+y_n\right) - \tau(x_m, y_n)\right]\right\} \quad [25]$$

where $\gamma$ is a constant having a value of approximately $-0.256 \cdot \mu$ for the wedge object example, where $\mu$ is around 0.19 to 0.21 cm$^{-1}$ for water- and soft-tissue like materials (density of ~1 g/cc) irradiated by radiation with typical beam energies. The unity term ("1") in equation [25] models the uniform slab case, while the remaining term in equation [25] provides a variation based on object thickness that the scattered radiation sees as it travels to point (x,y) relative to the object thickness that it would see in the uniform slab case, the latter of which can be modeled by $\tau(x_m, y_n)$ since $\mathit{Aff}(x_m, y_n, x, y)$ has been constructed to be multiplied with the scatter distribution found in the uniform slab case. The resulting curve is shown as a solid line (with no line indicators) in FIG. 15. The curve is very close to the profile from the Monte Carlo simulation of the wedge object case (the curve with triangle indicators), and is an excellent fit.

A general thickness function $T_f(I_0(x,y), I_{bp}(x,y))$ may be constructed from measured empirical data; it may have a form as simple as $T_f(I_0, I_{bp}) = \ln\{I_0(x,y)/I_{bp}(x,y)\}/\mu$, where $\mu$ is around 0.19 to 0.21 cm$^{-1}$ for water- and soft-tissue like materials (density of ~1 g/cc) irradiated by radiation with typical beam energies. $T_f(*)$ may be used in place of $\tau(x,y)$ and $\tau(x_m, y_n)$ in Equation [25] with good results. If $I_0(x,y)$ is uniform or slowly varying, we may use the division property of logarithms to derive the following additional asymmetric form factor from equation [25]:

$$\mathit{Aff}^{Ibp}(x_m, y_n, x, y) = \left\{1 + (\gamma/\mu) \cdot \left[\ln(I_{bp}(x_m, y_n)) - \ln\left(I_{bp}\left(\frac{x-x_m}{M}+x_m, \frac{y-y_n}{M}+y_n\right)\right)\right]\right\} \quad [25A]$$

The use of equation [25] and the use of $T_f(*)$ in place of $\tau(x,y)$ in Equation [25] captures not only thickness variations, but also density variations in the object, which also can have asymmetric effects on the scattering. Thus, these forms are believed to be more general.

As it turns out, the factor M in equation [25] poses a challenge to using convolutions and Fourier transforms to generate the summation of the scatter kernels over the area of imaging device 120. The challenge can be readily overcome by using a value of M=1 instead of M=1.6, and adjusting the value of $\gamma$, which does not significantly degrade the fit. As another approach, it can be generally assumed that the object thickness varies in a piecewise linear manner from point (x,y) to point $(x_m, y_n)$, and equation [24] can be approximated as follows:

$$\tau\left(\frac{x-x_m}{M}+x_m, \frac{y-y_n}{M}+y_n\right) = \quad [26]$$
$$\tau\left(\frac{x}{M}+\frac{M-1}{M}\cdot x_m, \frac{y}{M}+\frac{M-1}{M}\cdot y_n\right) \approx$$
$$\frac{1}{M}\cdot \tau(x,y) + \frac{M-1}{M}\cdot \tau(x_m, y_n),$$

which can be simply viewed as a ratio mixing of the thickness values based on the ratio mixing of the coordinates in the arguments of equation [24]. Equation [26] can be formally derived as follows. For simplicity, denote the point $$\left(\frac{x-x_m}{M}+x_m, \frac{y-y_n}{M}+y_n\right)$$

as point (x',y'), and denote its thickness as $\tau(x',y')$. Points (x,y) and (x',y') and their thickness values $\tau(x,y)$ and $\tau(x',y')$ may be used to provide a first equation for the slope of the piecewise linear approximation of the thickness. Similarly, points (x,y) and $(x_m, y_n)$ and their thickness values $\tau(x,y)$ and $\tau(x_m, y_n)$ may be used to provide a second equation for the slope of the piecewise linear approximation of the thickness. The two slope equations may be equated and solved for $\tau(x',y')$. An approximation to the form factor of equation [25] follows from [26]:

$$\mathit{Aff}(x_m, y_n, x, y) \approx \left\{1 + \gamma \cdot \left[\frac{1}{M}\cdot \tau(x,y) - \frac{1}{M}\cdot \tau(x_m, y_n)\right]\right\} \quad [27]$$
$$= \left\{1 + \frac{\gamma}{M}\cdot [\tau(x,y) - \tau(x_m, y_n)]\right\},$$

which is a simple function of $\tau(x,y)$ and $\tau(x_m, y_n)$. We may also multiply Aff(*) or its approximations with the symmetric kernel form of equation [8] to obtain a curve that has excellent fit to the profile from the Monte Carlo simulation of the wedge object case (the curve with triangle indicators shown in FIG. 15). The corresponding approximation for equation [25A] is:

$$\mathit{Aff}^{Ibp}(x_m, y_n, x, y) \approx \left\{1 + \frac{\gamma}{\mu \cdot M}\cdot [\ln(I_{bp}(x_m, y_n)) - \ln(I_{bp}(x,y))]\right\} \quad [27A]$$

While the above forms of Aff(*), Aff$^{Ibp}$(*), and their approximations have been illustrated with the wedge-shaped object, they work very well for oval-shaped objects, such as human torsos and limbs. From equations [27] and [27A], the following more general asymmetric form factors can be identified as:

$$\mathit{Aff}^{G1}(x_m, y_n, x, y) = \left\{1 + \sum_{j=1}^{J} (a_j \cdot \tau^j(x,y) + b_j \cdot \tau^j(x_m, y_n))\right\} \quad [27B]$$

$$\mathit{Aff}^{G2}(x_m, y_n, x, y) = \quad [27C]$$
$$\left\{1 + \sum_{j=1}^{J} (c_j \cdot [\ln(I_{bp}(x_m, y_n))]^j + d_j \cdot [\ln(I_{bp}(x,y))]^j)\right\}$$

-continued $$Aff^{G3}(x_m, y_n, x, y) = \{1 + f_1(\tau(x, y), \tau(x_m, y_n))\} \quad [27D]$$

$$Aff^{G3}(x_m, y_n, x, y) = \{1 + f_2(I_{bp}(x, y), I_{bp}(x_m, y_n))\} \quad [27E]$$

Where j is an index, J has a value of one or more, and $a_j$, $b_j$, $c_j$ and $d_j$ are constants that can have positive, negative, or zero values, or values that vary with location (e.g., coordinates x and y), and where $f_1(*)$ and $f_2(*)$ are generalized functions that may have any form that includes their arguments. Corresponding generalized versions of equations [25] and [25A] may be obtained by replacing $\tau(x, y)$ with $$\tau\left(\frac{x - x_m}{M} + x_m, \frac{y - y_n}{M} + y_n\right),$$

and $I_{bp}(x, y)$ with $$I_{bp}\left(\frac{x - x_m}{M} + x_m, \frac{y - y_n}{M} + y_n\right).$$

With the above in mind, a general class of asymmetric kernels may have the following form:

$$Ak^G(x_m, y_n, x, y), \quad [28]$$

where $x_m$ and $y_n$ are the location coordinates of the pencil beam, where x and y are the location coordinates of the scattered radiation modeled by $Ak^G(*)$, and where $Ak^G(*)$ may include values of the object thickness determined from the values of $x_m$, $y_n$, x, and y. The above discussion of equations [24]-[27] has touched on the following sub-class of the general class:

$$Ak^{SC1}(x_m, y_n, x - x_m, y - y_n) = Sk^G(x_m, y_n, x - x_m, y - y_n) \cdot Aff^G(x_m, y_n, x, y), \quad [29]$$

where $Sk^G(x_m, y_n, x - x_m, y - y_n)$ is a general symmetric kernel form, and $Aff^G(*)$ is a general asymmetric form factor to the asymmetric form factor of equation [25]. Each of $Sk^G(*)$ and $Aff^G(*)$ may include values of the object thickness or radiation intensity values determined from the values of $x_m$, $y_n$, x, and y. A further sub-class uses an approximate asymmetric form factor that depends on the difference of $\tau(x,y)$ and $\tau(x_m, y_n)$:

$$Ak^{SC2}(x_m, y_n, x - x_m, y - y_n) = Sk^G(x_m, y_n, x - x_m, y - y_n) \cdot Aff^{Aprox}(\tau_{xy} - \tau_{bp}), \quad [30]$$

where $\tau_{xy}$ is shorthand for $\tau(x, y)$, and $\tau_{bp}$ is shorthand for $\tau(x_m, y_n)$. The symmetric kernel form of equation [8] may be combined with the approximate asymmetric form factor of equation [27] as follows:

$$Ak^A(x_m, y_n, x - x_m, y - y_n) = S_A(I_0, I_{bp}) \cdot S_{FF}(x - x_m, y - y_n) \cdot \{1 + \gamma' \cdot (\tau_{xy} - \tau_{bp})\} \quad [31]$$

where $\gamma'$ may be equal to $\gamma/M$ or be empirically determined.

For imaging devices 120 that have small dimensions relative to their distance to the object, the scatter profile $I_{os}$ from the object may be generated from any of the above asymmetric kernel forms, as represented by $Ak^X(*)$, as follows:

$$I_{os}(x, y) = \sum_{m=-M}^{+M} \sum_{n=-N}^{+N} I_{bp}(x_m, y_n) \cdot Ak^X(*). \quad [32]$$

For the asymmetric kernel form of equation [31], this may be written as:

$$I_{os}(x, y) = \sum_{m=-M}^{+M} \sum_{n=-N}^{+N} I_{bp}(x_m, y_n) \cdot \quad [33]$$
$$S_A(I_0, I_{bp}) \cdot S_{FF}(x - x_m, y - y_n) \cdot \{1 + \gamma' \cdot (\tau_{xy} - \tau_{bp})\}.$$

As equation [33] is based from equation [8A], both $I_{bp}$ and $S_A(I_0, I_{bp})$ are functions of $x_m$ and $y_n$. Equation [33] may be separated into three double summations according to the three terms 1, $\gamma' \cdot \tau_{xy}$, and $-\gamma' \cdot \tau_{bp}$ in the last quantity, which may be generated by three corresponding convolutions, as follows:

$$I_{os}(x, y) = [I_{bp}(x, y) \cdot S_A(I_0, I_{bp})] \otimes S_{FF}(x, y) +$$
$$\gamma' \cdot \tau(x, y) \cdot \{[I_{bp}(x, y) \cdot S_A(I_0, I_{bp})] \otimes S_{FF}(x, y)\} -$$
$$[\gamma' \cdot \tau(x, y) \cdot I_{bp}(x, y) \cdot S_A(I_0, I_{bp})] \otimes S_{FF}(x, y),$$

where each of $I_{bp}(x,y)$ and $S_A(I_0, I_{bp})$ are now functions of x and y, and where (x,y) replaces $(x_m, y_n)$ in accordance with the commonly used convolution operation notation ($\otimes$). The above can be simplified by combining the first two terms as follows:

$$I_{os}(x, y) = (1 + \gamma' \cdot \tau(x, y)) \cdot \{[I_{bp}(x, y) \cdot S_A(I_0, I_{bp})] \otimes S_{FF}(x, y)\} - \quad [34]$$
$$[\gamma' \cdot \tau(x, y) \cdot I_{bp}(x, y) \cdot S_A(I_0, I_{bp})] \otimes S_{FF}(x, y).$$

Equation [34] may be viewed as the addition of two convolution products; the first is the convolution of the product $[I_{bp}(x,y) \cdot S_A(I_0, I_{bp})]$ with the symmetric form factor $S_{FF}(x,y)$ post-weighted by $(1+\gamma' \cdot \tau(x,y))$, and the second is the product $[I_{bp}(x,y) \cdot S_A(I_0, I_{bp})]$ pre-weighted by $\gamma' \cdot \tau(x,y)$ and thereafter convoluted with the symmetric form factor $S_{FF}(x,y)$. The following Fourier transform formulation readily follows:

$$I_{os}(x, y) = \quad [35]$$
$$(1 + \gamma' \cdot \tau(x, y)) \cdot \Im^{-1}\{\Im(I_{bp}(x, y) \cdot S_A(I_0, I_{bp})) \cdot \Im(S_{FF}(x, y))\} -$$
$$\Im^{-1}\{\Im(\gamma' \cdot \tau(x, y) \cdot I_{bp}(x, y) \cdot S_A(I_0, I_{bp})) \cdot \Im(S_{FF}(x, y))\}$$

where $\Im\{*\}$ denote a Fourier transform operation, and $\Im^{-1}\{*\}$ denotes an inverse Fourier transform.

In equations [34] and [35], each of $I_0$, $I_{bp}$, and $S_A(I_0, I_{bp})$ is a function of coordinates x and y (instead of the pencil beam coordinates $x_m$ and $y_n$). As before, the scattered radiation profile $I_{os}(x,y)$ is relatively smooth (i.e., slowly varying) over the x,y domain, and its Fourier transform has primarily low-frequency components. Accordingly, the Fourier transforms in equation [11] can be generated from a decimated set of data (e.g., $[I_{bp}(x,y) \cdot S_A(I_0, I_{bp})]$) on a coarse grid, such as the 104 by 30 array of super pixels previously described. In practice, the summation of equation [33] and the convolutions of equation [34] are done over the finite area of the pixel array, which means that contributions from pencil beams that terminate outside of the array are not reflected in $I_{os}(x,y)$. This can affect the scatter values at the edges of the array, and the previously-described ways for compensating for it with regard to the application of the symmetric kernels may be used here. It should be said that this is not a problem if the radiation shadow of the object falls within the pixel array. In this case, there is no scattering contribution from pencil beams that terminate outside of the pixel array.

While we have used the approximation $\{1+\gamma'\cdot(\tau_{xy}-\tau_{bp})\}$ in equation [33], other approximations may be used, such as $\{1+\gamma_1\cdot(\tau_{xy}-\tau_{bp})+\gamma_2\cdot(\tau_{xy}-\tau_{bp})^2\}$ or $\{1+\gamma_3\cdot(\tau_{xy}-\tau_{bp})+\gamma_4\cdot(\tau_{xy}^2-\tau_{bp}^2)\}$. These forms, as well and may more, are contemplated by these inventions of the present application, and are covered by appropriate broad claims of the application.

Referring briefly back to the imaging chain of FIG. 4B, one use of the asymmetric kernel is to estimate the individual profiles $I_{oo}$ and $I_{os}$ from their sum $(I_{oO}+I_{os})$. As described above, it was possible to generate an estimate of the radiation profile $I_I$ at the front of the detector housing from the measured data from imaging device 120, where $I_I=(I_{oO}+I_{os})$. Equation [34] can be used to estimate the profile $I_{os}$, and we can write the following relationship:

$$I_I(x, y) = \quad [36]$$
$$I_{oO}(x, y) + (1 + \gamma' \cdot \tau(x, y)) \cdot \{[I_{bp}(x, y) \cdot S_A(I_0, I_{bp})] \otimes S_{FF}(x, y)\} -$$
$$[\gamma' \cdot \tau(x, y) \cdot I_{bp}(x, y) \cdot S_A(I_0, I_{bp})] \otimes S_{FF}(x, y).$$

In this use of the asymmetric kernel, the coordinates $x_n$, $y_n$, x, and y are known, and $I_0$ can be measured by a calibration step. However, $\tau(x,y)$ and $I_{bp}(x,y)$ are not known, with $I_{bp}(x,y)$ being the profile $I_{oo}$ that is to be estimated from the $I_I(x,y)$. In the applications of the symmetric kernels, an iterative approach was used to handle the unknown state of $I_{bp}(x,y)$. For solving equation [36], a two-level iteration approach may be used as follows. A first tomographic reconstruction is performed using uncorrected projections, or projections corrected by the application of one or more symmetric kernels, to estimate the thickness values of the object for all the projections. Then, the value of $I_{oo}(x,y)$ $(I_{bp}(x,y))$ may be iterated in equation [36], using the estimated thickness values for $\tau(x,y)$, to generate estimates of scatter for each of the projections. Corrected projections may then be generated, and a second tomographic reconstruction may be preformed to provide more true results. If desired, these steps may be reiterated one or more times to further refine the corrections (e.g., a second round of thickness estimates can be generated from the results of second tomographic reconstruction, a second round of the corrected projections can then be generated from the second round of thickness estimates, and a third tomographic reconstruction can be generated from the second round of corrected projections).

However, using the tomographic reconstructions in this manner is computationally expensive and time-consuming. As another approach, we note that the object's thickness is substantially proportional to ln $\{I_0/I_{bp}(x,y)\}$, which can be used as a proxy for the object thickness. A general thickness function $T_I(I_0, I_{bp}(x,y))$ may be constructed from measured empirical data; it may have a form as simple as $T_I(I_0, I_{bp})=\ln\{I_0/I_{bp}(x,y)\}/\mu$, where $\mu$ is around 0.19 to 0.21 cm$^{-1}$ for water- and soft-tissue like materials (density of ~1 g/cc) irradiated by radiation with typical beam energies. The use of the log-ratio of intensity values captures not only thickness variations, but also density variations in the object, which also can have asymmetric effects on the scattering. Accordingly, the use of $T_I(I_0, I_{bp})$ to provide the thickness values for $\tau(x,y)$ is currently believed to provide a more general modeling of the asymmetric effects. In addition, the use of $T_I(I_0, I_{bp})$ makes the term $\gamma'\cdot\tau(x,y)$ independent of $\mu$, therefore makes for an easier implementation. With this approach, a single level iteration approach may be constructed as follows. An initial estimate $I^0_{oo}(x,y)$ may be generated for $I_{oo}(x,y)$. The initial estimate $I^0_{oo}(x,y)$ may be a fraction of $I_I(x,y)$, such as $I_I(x,y)/2$, or the estimate for $I_{oo}(x,y)$ generated for a prior projection in the object scan. From the initial estimate $I^0_{oo}(x,y)$, an estimated initial value $I^1_{EST}(x,y)$ for $I_{bp}(x,y)$ may be generated ($I^1_{EST}(x,y)=I^0_{oo}(x,y)$), and an initial value $S_A^1(I_0,I_{EST})$ for the amplitude function $S_A(I_0,I_{bp})$ may be generated. Also, an initial value $\tau^1(x,y)$ for $\tau(x,y)$ may be estimated from the thickness function as $\tau^1(x,y)=T_I(I_0, I^1_{EST}(x,y))$. A first iteration estimate $I^1_{oo}(x,y)$ may be generated for $I_{oo}(x,y)$ by applying equation [36] as follows:

$$I^1_{oO}(x, y) = \quad [37]$$
$$I_I(x, y) - (1 + \gamma' \cdot \tau^1(x, y)) \cdot \{[I^1_{EST}(x, y) \cdot S_A(I_0, I^1_{EST})] \otimes S_{FF}(x, y)\} +$$
$$[\gamma' \cdot \tau^1(x, y) \cdot I^1_{EST}(x, y) \cdot S_A(I_0, I^1_{EST})] \otimes S_{FF}(x, y)$$

where the convolutions may be performed using Fourier transforms as described above. More refined estimates of $I_{EST}(x,y)$ and $S_A(I_0, I_{EST})$ may then be generated from $I^1_{oo}(x,y)$, and equation [37] may be reiterated to further refine the estimate for $I_{oo}(x,y)$. The following iteration approach may be used for subsequent iterations k=2 to K for generating refined estimates $I^k_{oo}(x,y)$:

$$I^k_{EST}(x, y) = 0.5 * I^{k-1}_{oO}(x, y) + 0.5 * I^{k-2}_{oO}(x, y) \quad [38A]$$
$$\tau^k(x, y) = T_I(I_0, I^k_{EST}(x, y)) \quad [38B]$$
$$I^k_{oO}(x, y) = I_I(x, y) - \quad [38C]$$
$$(1 + \gamma' \cdot \tau^k(x, y)) \cdot \{[I^k_{EST}(x, y) \cdot S_A(I_0, I^k_{EST})] \otimes S_{FF}(x, y)\} +$$
$$[\gamma' \cdot \tau^k(x, y) \cdot I^k_{EST}(x, y) \cdot S_A(I_0, I^k_{EST})] \otimes S_{FF}(x, y).$$

Equation [38A] provides some damping on the rate of change of $I^k_{EST}(x,y)$, $S_A^k(I_0,I^k_{EST})$, and $\tau^k(x,y)$ between the iterations compared to the selection of $I^k_{EST}(x,y)=I^{k-1}_{oO}(x,y)$, and minimizes the chances of the values of $I^k_{EST}(x,y)$, $S_A^k(I_0, I_{EST})$, and $\tau^k(x,y)$ oscillating during the iterations. An equal weighting factor of 0.5 has been used in equation [38A], but different weighting factors may be used (at least the first weighting factor should be non-zero and both weighting factors should sum to 1). Equations [37] and [38] may be applied to the real pixel array, or to the super pixel array. In the latter case, the super pixel values for $I^k_{oo}(x,y)$ and $I_I(x,y)$ may be generated as averages in the manner described above for the quantity $[I_{bp}(x,y)\cdot S_A(I_0,I_{bp})]$, and, if the Fourier transform process has been used to generate the convolution terms with decimated data, the results of the inverse Fourier transforms do not need to be interpolated/extrapolated. The iterations may be continued until the change between iteration values of $[I^k_{EST}(x,y)\cdot S_A^k(I_0,I^k_{EST})]$ and $[I^{k-1}_{EST}(x,y)\cdot S_A^{k-1}(I_0,I^{k-1}_{EST})]$ is below a desired (e.g., set) amount for a desired (e.g., set) number of pixels or super pixels, or until the change between iteration values of $I^k_{oo}(x,y)$ and $I^{k-1}_{oo}(x,y)$ is below a desired amount for a desired number of pixels or super pixels. Additional criteria or other criteria may be used to determine when to stop the iterations, such as monitoring an average measure of the changes over the pixels or super pixels, and setting an upper limit to the number of iterations. If the iterations have been carried out on the super pixels, then one application of equation [38C] using the real pixel array may be used to generate $I^k_{oo}(x,y)$ values over the real pixel array after the last iteration (k=K). For this, the convolution term may be generated on the super pixel array and then interpolated and extrapolated onto the real pixel array. The scattered radiation at any iteration, including the last iteration k=K, may be generated as:

$$I^k_{os}(x, y) = \qquad [38D\text{-}1]$$
$$+(1 + \gamma' \cdot \tau^k(x, y)) \cdot \{[I^k_{EST}(x, y) \cdot S_A(I_0, I^k_{EST})] \otimes S_{FF}(x, y)\} -$$
$$[\gamma' \cdot \tau^k(x, y) \cdot I^k_{EST}(x, y) \cdot S_A(I_0, I^k_{EST})] \otimes S_{FF}(x, y)$$

or as:

$$I^k_{os}(x, y) = \qquad [38D\text{-}2]$$
$$+(1 + \gamma' \cdot \tau^k(x, y)) \cdot \{[I^k_{oo}(x, y) \cdot S_A(I_0, I^k_{oo})] \otimes S_{FF}(x, y)\} -$$
$$[\gamma' \cdot \tau^k(x, y) \cdot I^k_{oo}(x, y) \cdot S_A(I_0, I^k_{oo})] \otimes S_{FF}(x, y).$$

Another exemplary iteration approach similar to equation [15] for subsequent iterations k=2 to K is as follows:

$$[I^k_{EST}(x, y) \cdot S^k_A(I_0, I^k_{EST})] = \qquad [39A]$$
$$0.5 \cdot [I^{k-1}_{oo}(x, y) \cdot S_A(I_0, I^{k-1}_{oo})] + 0.5 \cdot [I^{k-1}_{EST}(x, y) \cdot S^{k-1}_A(I_0, I^{k-1}_{EST})]$$

Generate $\tau^k(x,y)$ from prior reconstruction, or as $T_I(I_0, I^{k-1}_{oo}(x,y))$, or as $0.5 \cdot T_I(I_0, I^{k-1}_{oo}(x,y)) + 0.5 \cdot \tau^{k-1}(x,y)$ [39B]

$$I^k_{oo}(x, y) = I_I(x, y) - (1 + \gamma' \cdot \tau^k(x, y)) \cdot \qquad [39C]$$
$$\left\{ \begin{bmatrix} I^k_{EST}(x, y) \cdot \\ S_A(I_0, I^k_{EST}) \end{bmatrix} \otimes S_{FF}(x, y) \right\} + \begin{bmatrix} \gamma' \cdot \tau^k(x, y) \cdot \\ I^k_{EST}(x, y) \cdot \\ S_A(I_0, I^k_{EST}) \end{bmatrix} \otimes S_{FF}(x, y)$$

with $[I^1_{EST}(x,y) S_A^1(I_0, I^1_{EST})] = [I^0_{oo}(x,y) \cdot S_A(I_0, I^0_{oo})]$. Equation [39A] generates a scatter estimate for the current iteration k as a weighted average of the scatter as generated from the most recent estimate of $I_0$ (which is $I^{k-1}_{oo}(x,y)$) and the scatter used in the last iteration. Equation [39B] can generate $\tau^k(x,y)$ for the current iteration k as a weighted average of the thickness generated from the most recent estimate of $I_{oo}$ (which is $I^{k-1}_{oo}(x,y)$) and $\tau^{k-1}(x,y)$ used in the last iteration. Like Equation [38A], equation [39A] provides some damping, and minimizes the chances of the values oscillating during the iterations. An equal weighting factor of 0.5 has been used in equation [39A], but different weighting factors may be used (at least the first weighting factor should be non-zero and both weighting factors should sum to 1). Equations [37] and [39] may be applied to the real pixel array, or to the super pixel array. In the latter case, the super pixel values for $I^k_{oo}(x,y)$ and $I_I(x,y)$ may be generated as averages in the manner described above for the quantity $[I_{bp}(x,y) \cdot S_A(I_0, I_{bp})]$, and, if the Fourier transform process has been used to generate the convolution terms with decimated data, the results of the inverse Fourier transforms do not need to be interpolated/extrapolated. The above possible criteria for determining when to end the iterations of equation [38] may be used to determine when to end the iterations of equation [39]. If the iterations have been carried out on the super pixels, then one application of equation [39C] using the real pixel array may be used to generate $I^k_{oo}(x,y)$ values over the real pixel array. For this, the convolution term may be generated on the super pixel array and then interpolated and extrapolated onto the real pixel array. The scattered radiation at any iteration, including the last iteration k=K, may be generated using equations [38D].

In equations [37]-[39] values for $\tau(x,y)$ may be provided by the above-described thickness function $T_I(*)$, by a prior tomographic reconstruction of the object, or by an estimated shape of the object. In equations [37], [38C] and [39C], the convolutions are preferably generated by the Fourier transform method, but can be generated by a full-space convolution using equation [34], or by a full-space summation using equation [33], or by a full-space summation using equation [33] with the form of equation [25] in place of $\{1+\gamma' \cdot (\tau_{xy}-\tau_{bp})\}$. These implementations, though slow, would allow use of the full skew correction factor $Z(\theta_p)$, or in the last case avoid the piecewise approximation used in equation [26]. Skew correction factors $Z'(\theta_p)$ may be applied to each of equations [37], [38C] and [39C] by multiplying it with each of the amplitude functions, as was done with equation [10A]. The application of skew correction factors $Z''(*)$ to each of equations [37], [38C] and [39C] follows a similar form to that of equation [10B], but leads to the summation of six convolution terms, which can be readily handled by the Fourier transform form of equation [35]. This form for $I_{os}(x,y)$ is provided below:

$$I_{os}(x, y) = \qquad [40]$$
$$(1 + \gamma' \cdot \tau(x, y)) \cdot \{[\cos^3(\theta_p) \cdot I_{bp}(x, y) \cdot S_A(I_0, I_{bp})] \otimes S_{FF}(x, y)\} -$$
$$[\cos^3(\theta_p) \cdot \gamma' \cdot \tau(x, y) \cdot I_{bp}(x, y) \cdot S_A(I_0, I_{bp})] \otimes S_{FF}(x, y) -$$
$$(1 + \gamma' \cdot \tau(x, y)) \cdot \{[2 \cdot \cos^3(\theta_p) \cdot$$
$$\tan(\theta_x) \cdot I_{bp}(x, y) \cdot S_A(I_0, I_{bp})] \otimes [S_{FF}(x, y) \cdot (x/d)]\} +$$
$$[2 \cdot \cos^3(\theta_p) \cdot \tan(\theta_x) \cdot \gamma' \cdot \tau(x, y) \cdot I_{bp}(x, y) \cdot$$
$$S_A(I_0, I_{bp})] \otimes [S_{FF}(x, y) \cdot (x/d)] -$$
$$(1 + \gamma' \cdot \tau(x, y)) \cdot \{[2 \cdot \cos^3(\theta_p) \cdot \tan(\theta_y) \cdot I_{bp}(x, y) \cdot$$
$$S_A(I_0, I_{bp})] \otimes [S_{FF}(x, y) \cdot (x/d)]\} +$$
$$[2 \cdot \cos^3(\theta_p) \cdot \tan(\theta_x) \cdot \gamma' \cdot \tau(x, y) \cdot I_{bp}(x, y) \cdot$$
$$S_A(I_0, I_{bp})] \otimes [S_{FF}(x, y) \cdot (x/d)].$$

Multiple Asymmetric Kernel Forms for Different Thickness Ranges.

As indicated above, another invention set of the present application relates to constructing two or more instances of the new asymmetric form for two or more respective ranges of object thickness, and applying the instances of the new symmetric form to regions of a radiographic projection according to a measure of the object's thickness in the regions. An exemplary embodiment of the invention is illustrated with three instances $Ak_1(*)$, $Ak_2(*)$, and $Ak_3(*)$ of an asymmetric kernel that comprise the previously described kernel instances $Sk_1(*)$, $Sk_2(*)$, and $Sk_3(*)$, respectively, multiplied by an asymmetric form factor $Aff(*)$. $Sk_1(*)$, $Sk_2(*)$, and $Sk_3(*)$ were previously described with respect to FIGS. 8-10. The corresponding thickness functions $T_1(*)$, $T_2(*)$, and $T_3(*)$ of $Sk_1(*)$, $Sk_2(*)$, and $Sk_3(*)$ can be used to determine the values of primary beam radiation intensity ($I_{bp}$) that separate the thickness regions from one another. As before, it can be found from the thickness functions that an intensity value $I_A$ separates the first thickness region (0-10 cm, modeled by kernels $Sk_1(*)$ and $Ak_1(*)$) from the second thickness region (10-25 cm, modeled by kernels $Sk_2(*)$ and $Ak_2(*)$), and that an intensity value $I_B$ separates the second thickness region from the third thickness region (25 cm and above, modeled by kernels $Sk_3(*)$ and $Ak_3(*)$), with $I_A$ being greater than $I_B$. During each iteration of either of equations [38] or [39], estimated primary beam profile $I^k_{EST}(x,y)$ can be determined from either the initial value or the results of the previous iteration. Each pixel value of $I^k_{EST}(x,y)$ may be compared with $I_A$ and $I_B$ to determine which kernel should be used to generate the scattered radiation associated with the pencil beam terminating at the pixel. For pixels or super pixels having $I^k_{EST}(x,y)$ greater than $I_A$, the first asymmetric kernel instance $Ak_1(*)$ may be used. For pixels or super pixels having $I^k_{EST}(x,y)$ equal to or less than $I_A$ and greater than $I_B$, the second asymmetric kernel instance $Ak_2(*)$ may be used. For pixels or super pixels having $I^k_{EST}(x,y)$ equal to or less than $I_B$, the third asymmetric kernel instance $Ak_3(*)$ may be used.

The summation-based equation [32] for $I_{os}(x,y)$ may be expanded to include three separate double summations, one for each of the kernel instances: $Ak_1(*)$, $Ak_2(*)$, and $Ak_3(*)$. Each double summation may be only over the group of pixels covered by the kernel of the double summation. The expanded summation-based equation is as follows:

$$I_{ox}(x, y) = \sum_{Group\ 1}\sum I_{bp}(x_m, y_n) \cdot Ak_1(*) + \sum_{Group\ 2}\sum I_{bp}(x_m, y_n) \cdot Ak_2(*) + \sum_{Group\ 3}\sum I_{bp}(x_m, y_n) \cdot Ak_3(*) = \sum_{Group\ 1}\sum I_{bp}(x_m, y_n) \cdot Sk_1(x_m, y_n, x-x_m, y-y_n) \cdot Aff(x_m, y_n, x, y) + \sum_{Group\ 2}\sum I_{bp}(x_m, y_n) \cdot Sk_2(x_m, y_n, x-x_m, y-y_n) \cdot Aff(x_m, y_n, x, y) + \sum_{Group\ 3}\sum I_{bp}(x_m, y_n) \cdot Sk_3(x_m, y_n, x-x_m, y-y_n) \cdot Aff(x_m, y_n, x, y).$$ [41]

As equation [41] is based from equations [32] and [8A], both $I_{bp}$ and $S_A(I_0, I_{bp})$ are functions of $x_m$ and $y_n$. Any of the skew correction factors $Z(*)$, $Z'(*)$, or $Z''(*)$ may be applied to equation [41] by multiplying it with each of the kernel instances. To obtain the corresponding convolution form for $I_{os}(x,y)$, the asymmetric form factor may be approximated by equation [27], each symmetric kernel instance may be written as the product of its amplitude function and its form factor, e.g., $Sk_1(x-x_m, y-y_n, I_{bp}) = S_{A,1}(I_0, I_{bp}) \cdot S_{FF,1}(x,y)$, and each amplitude function may be set to a value of zero for pixels that are not covered by its kernel instance. For example, amplitude function $S_{A,1}(I_0, I_{bp})$ for $Sk_1(*)$ has zero values for the pixel locations in Groups 2 and 3, and non-zero values for the pixels in Group 1; amplitude function $S_{A,2}(I_0, I_{bp})$ for $Sk_2(*)$ has zero values for the pixel locations in Groups 1 and 3, and non-zero values for the pixels in Group 2, etc. With that format of the amplitude functions and the form of $Aff(*)$ provided by equation [25], and with the convolution solution provided by equation [34], the convolution form for an exemplary multiple kernel implementation is:

$$I_{os}(x, y) = (1+\gamma' \cdot \tau(x, y)) \cdot \{[I_{bp}(x, y) \cdot S_{A,1}(I_0, I_{bp})] \otimes S_{FF,1}(x, y)\} - [\gamma' \cdot \tau(x, y) \cdot I_{bp}(x, y) \cdot S_{A,1}(I_0, I_{bp})] \otimes S_{FF,1}(x, y) + (1+\gamma' \cdot \tau(x, y)) \cdot \{[I_{bp}(x, y) \cdot S_{A,2}(I_0, I_{bp})] \otimes S_{FF,2}(x, y)\} - [\gamma' \cdot \tau(x, y) \cdot I_{bp}(x, y) \cdot S_{A,2}(I_0, I_{bp})] \otimes S_{FF,2}(x, y) + (1+\gamma' \cdot \tau(x, y)) \cdot \{[I_{bp}(x, y) \cdot S_{A,3}(I_0, I_{bp})] \otimes S_{FF,3}(x, y)\} - [\gamma' \cdot \tau(x, y) \cdot I_{bp}(x, y) \cdot S_{A,3}(I_0, I_{bp})] \otimes S_{FF,3}(x, y),$$ [42]

where each of $I_{bp}$, $S_{A,1}(I_0, I_{bp})$, $S_{A,2}(I_0, I_{bp})$, and $S_{A,3}(I_0, I_{bp})$ are now functions of x and y for the convolution form, and where values for $\tau(x,y)$ may be provided by the above-described thickness function $T_f(*)$, by a prior tomographic reconstruction of the object, or by an estimated shape of the object. If there are no pixels or super pixels in the third group, then the last two convolution quantities may be omitted from equation [42] and other similar equations provided below. Skew correction factors $Z'(\theta_p)$ may be applied to equation [42] by multiplying it with each of the amplitude functions, as was done with equation [10A]. The application of skew correction factors $Z''(*)$ to equation [42] follows a similar form to that of equation [40], but leads to the summation of 18 convolution terms.

Since the Fourier transform of two convolved functions is equal to the multiplication of their Fourier transforms, the profile $I_{os}$ from equation [42] can be generated from the Fourier transforms as follows:

$$I_{os}(x, y) = (1+\gamma' \cdot \tau(x, y)) \cdot \mathcal{J}^{-1}\{\mathcal{J}(I_{bp}(x, y) \cdot S_{A,1}(I_0, I_{bp})) \cdot \mathcal{J}(S_{FF,1}(x, y))\} - \mathcal{J}^{-1}\{\mathcal{J}(\gamma' \cdot \tau(x, y) \cdot I_{bp}(x, y) \cdot S_{A,1}(I_0, I_{bp})) \cdot \mathcal{J}(S_{FF,1}(x, y))\} + (1+\gamma' \cdot \tau(x, y)) \cdot \mathcal{J}^{-1}\{\mathcal{J}(I_{bp}(x, y) \cdot S_{A,2}(I_0, I_{bp})) \cdot \mathcal{J}(S_{FF,2}(x, y))\} - \mathcal{J}^{-1}\{\mathcal{J}(\gamma' \cdot \tau(x, y) \cdot I_{bp}(x, y) \cdot S_{A,2}(I_0, I_{bp})) \cdot \mathcal{J}(S_{FF,2}(x, y))\} + (1+\gamma' \cdot \tau(x, y)) \cdot \mathcal{J}^{-1}\{\mathcal{J}(I_{bp}(x, y) \cdot S_{A,3}(I_0, I_{bp})) \cdot \mathcal{J}(S_{FF,3}(x, y))\} - \mathcal{J}^{-1}\{\mathcal{J}(\gamma' \cdot \tau(x, y) \cdot I_{bp}(x, y) \cdot S_{A,3}(I_0, I_{bp})) \cdot \mathcal{J}(S_{FF,3}(x, y))\}$$ [43]

which can be simplified as follows to reduce the number of inverse Fourier transforms from six to two:

$$I_{os}(x, y) = (1+\gamma' \cdot \tau(x, y)) \cdot \mathcal{J}^{-1}\{\mathcal{J}(I_{bp}(x, y) \cdot S_{A,1}(I_0, I_{bp})) \cdot \mathcal{J}(S_{FF,1}(x, y)) + \mathcal{J}(I_{bp}(x, y) \cdot S_{A,2}(I_0, I_{bp})) \cdot \mathcal{J}(S_{FF,2}(x, y)) + \mathcal{J}(I_{bp}(x, y) \cdot S_{A,3}(I_0, I_{bp})) \cdot \mathcal{J}(S_{FF,3}(x, y))\} - \mathcal{J}^{-1}\{\mathcal{J}(\gamma' \cdot \tau(x, y) \cdot I_{bp}(x, y) \cdot S_{A,1}(I_0, I_{bp})) \cdot \mathcal{J}(S_{FF,1}(x, y)) + \mathcal{J}(\gamma' \cdot \tau(x, y) \cdot I_{bp}(x, y) \cdot S_{A,2}(I_0, I_{bp})) \cdot \mathcal{J}(S_{FF,2}(x, y)) + \mathcal{J}(\gamma' \cdot \tau(x, y) \cdot I_{bp}(x, y) \cdot S_{A,3}(I_0, I_{bp})) \cdot \mathcal{J}(S_{FF,3}(x, y))\}.$$ [43A]

Equations [43] are typically applied on the array of super pixels rather than the array of real pixels, using the same super pixel construction processes as described above with regard to equations [11] and [35]. In this regard, an average value of $I_{bp}$ over the pixels covered by a super pixel may be used to determine which kernel instance to use for the super pixel. The Fourier transform of the form factors $\Im\{S_{FF,1}(x, y)\}$, $\Im\{S_{FF,2}(x, y)\}$, and $\Im\{S_{FF,3}(x, y)\}$ may be generated by using the values of the form factors at the grid locations of the super pixels; they may be generated once, and may be used for all of projections of the scan. The inverse Fourier transforms of equations [43] and the results of equations [43] may be computed for the grid locations of the super pixels, and the results of the inverse Fourier transforms may be interpolated/extrapolated onto the real pixel array in any of the above-described manners. The Fourier transforms and inverse Fourier transforms used herein may be implemented by any of the known discrete Fourier transform processes. If there are no pixels or super pixels in the third group, then the Fourier quantities for it in equations [43] may be omitted from the equation, and other similar equations provided below.

Using equation [42], the corresponding form of equation [12A] for generating an estimate of $I_{oo}(x,y)$ from $I_I(x,y)$ is as follows:

$$I_{oo}(x, y) = I_I(x, y) - \qquad [44]$$
$$\{(1 + \gamma' \cdot \tau(x, y)) \cdot \{[I_{EST}(x, y) \cdot S_{A,1}(I_0, I_{EST})] \otimes S_{FF,1}(x, y)\} -$$
$$[\gamma' \cdot \tau(x, y) \cdot I_{EST}(x, y) \cdot S_{A,1}(I_0, I_{EST})] \otimes S_{FF,1}(x, y) +$$
$$(1 + \gamma' \cdot \tau(x, y)) \cdot \{[I_{EST}(x, y) \cdot S_{A,2}(I_0, I_{EST})] \otimes$$
$$S_{FF,2}(x, y)\} - [\gamma' \cdot \tau(x, y) \cdot I_{EST}(x, y) \cdot$$
$$S_{A,2}(I_0, I_{EST})] \otimes S_{FF,2}(x, y) + (1 + \gamma' \cdot \tau(x, y)) \cdot$$
$$\{[I_{EST}(x, y) \cdot S_{A,3}(I_0, I_{EST})] \otimes S_{FF,3}(x, y)\} - [\gamma' \cdot$$
$$\tau(x, y) \cdot I_{EST}(x, y) \cdot S_{A,3}(I_0, I_{EST})] \otimes S_{FF,3}(x, y)\}.$$

An iteration approach similar to equations [38] and [39] may used to generate and estimate of $I_{oo}(x,y)$. An initial estimate for $I^0_{oo}(x,y)$ may be generated for $I^0_{oo}(x,y)$, such as using a fraction of $I_I(x,y)$. Each pixel value of the initial estimate $I^0_{oo}(x,y)$ may be compared with the intensity values $I_A$ and $I_B$ to determine which kernel instance the pixel should be assigned to, as described above. Then, each kernel instance's amplitude function $S_{A,1}(I_0,I_{EST})$, $S_{A,2}(I_0,I_{EST})$, and $S_{A,3}(I_0, I_{EST})$ is generated using the pixel values of $I^0_{oo}(x,y)$ of the pixels that have been assigned to the kernel instance. Next, a first iteration estimate $I^1_{oo}(x,y)$ may be generated for $I_{oo}(x,y)$ by applying equation [44] as follows:

$$I^1_{oo}(x, y) = I_I(x, y) - [(1 + \gamma' \cdot \tau(x, y)) \cdot \qquad [45]$$
$$\{[I^1_{EST}(x, y) \cdot S^1_{A,1}(I_0, I^1_{EST})] \otimes S_{FF,1}(x, y)\} -$$
$$[\gamma' \cdot \tau(x, y) \cdot I^1_{EST}(x, y) \cdot S^1_{A,1}(I_0, I^1_{EST})] \otimes S_{FF,1}(x, y) +$$
$$(1 + \gamma' \cdot \tau(x, y)) \cdot \{[I^1_{EST}(x, y) \cdot S^1_{A,2}(I_0, I^1_{EST})] \otimes$$
$$S_{FF,2}(x, y)\} - [\gamma' \cdot \tau(x, y) \cdot I^1_{EST}(x, y) \cdot S^1_{A,2}(I_0, I^1_{EST})] \otimes$$
$$S_{FF,2}(x, y) + (1 + \gamma' \cdot \tau(x, y)) \cdot$$
$$\{[I^1_{EST}(x, y) \cdot S^1_{A,3}(I_0, I^1_{EST})] \otimes S_{FF,3}(x, y)\} - [\gamma' \cdot \tau(x,$$
$$y) \cdot I^1_{EST}(x, y) \cdot S^1_{A,3}(I_0, I^1_{EST})] \otimes S_{FF,3}(x, y)]$$

where the convolution may be performed using Fourier transforms as described above with reference to equations [43]. More refined estimates of $I_{EST}(x,y)$, $\tau(x,y)$, $S_{A,1}(I_0, I_{EST})$, $S_{A,2}(I_0, I_{EST})$, and $S_{A,3}(I_0, I_{EST})$ may then be generated from $I^1_{oo}(x,y)$, and equation [45] may be reiterated to further refine the estimate for $I_{oo}(x,y)$. During this refinement, it is possible for there to be changes in the kernel assignments for some of the pixels (or super pixels). The following iteration approach similar to equation [14] may be used for subsequent iterations k=2 to K for generating refined estimates $I^k_{oo}(x,y)$:

$$I^k_{EST}(x, y) = 0.5 * I^{k-1}_{oo}(x, y) + 0.5 * I^{k-2}_{oo}(x, y), \qquad [46A]$$

Generate $\tau^k(x, y)$, $S^k_{A,1}(I_0, I^k_{EST})$, $S^k_{A,2}(I_0, I^k_{EST})$, and $S^k_{A,3}(I_0, I^k_{EST})$, [46B]

$$I^k_{oo}(x, y) = I_I(x, y) - [(1 + \gamma' \cdot \tau(x, y)) \cdot \qquad [46C]$$
$$\{[I^k_{EST}(x, y) \cdot S^k_{A,1}(I_0, I^k_{EST})] \otimes S_{FF,1}(x, y)\} - [\gamma' \cdot$$
$$\tau(x, y) \cdot I^k_{EST}(x, y) \cdot S^k_{A,1}(I_0, I^k_{EST})] \otimes S_{FF,1}(x, y) +$$
$$(1 + \gamma' \cdot \tau(x, y)) \cdot \{[I^k_{EST}(x, y) \cdot S^k_{A,2}(I_0, I^k_{EST})] \otimes$$
$$S_{FF,2}(x, y)\} - [\gamma' \cdot \tau(x, y) \cdot I^k_{EST}(x, y) \cdot S^k_{A,2}(I_0, I^k_{EST})] \otimes$$
$$S_{FF,2}(x, y) + (1 + \gamma' \cdot \tau(x, y)) \cdot$$
$$\{[I^k_{EST}(x, y) \cdot S^k_{A,3}(I_0, I^k_{EST})] \otimes S_{FF,3}(x, y)\} - [\gamma' \cdot$$
$$\tau(x, y) \cdot I^k_{EST}(x, y) \cdot S^k_{A,3}(I_0, I^k_{EST})] \otimes S_{FF,3}(x, y)].$$

Equation [46A] provides some damping on the rate of change of $I^k_{EST}(x,y)$, the thickness function $\tau^k(x,y)$, and the amplitude functions $S_{A,1}{}^k(I_0,I^k_{EST})$, $S_{A,2}{}^k(I_0,I^k_{EST})$, and $S_{A,3}{}^k(I_0, I^k_{EST})$ between the iterations, and minimizes the chances of the function values oscillating during the iterations. An equal weighting factor of 0.5 has been used in equation [46A], but different weighting factors may be used (at least the first weighting factor should be non-zero and both weighting factors should sum to 1). Also, the kernel-instance assignment of the pixels (or super pixels) may be frozen for the latter iterations to prevent oscillations caused by switching assignments at group boundaries.

Equations [45] and [46] may be applied to the real pixel array, or to the super pixel array. In the latter case, the super pixel values for $I^k_{oo}(x,y)$ and $I_I(x,y)$ may be generated as averages in the manner described above for equations [13]-[15], and, if the Fourier transform process (equation [43]) has been used to generate the convolution terms from decimated data, the results of the inverse Fourier transforms do not need to be interpolated/extrapolated during the iterations. The iterations may be continued until the change between the current and previous values of each amplitude function, as multiplied by $I^k_{EST}(x,y)$, is below a desired (e.g., set) amount for a desired (e.g., set) number of pixels or super pixels, or until the change between iteration values of $I^k_{oo}(x,y)$ and $I^{k-1}_{oo}(x,y)$ is below a desired amount for a desired number of pixels or super pixels. Additional criteria or other criteria may be used to determine when to stop the iterations, as described above for equations [13]-[15]. If the iterations have been carried out on the super pixels, then one application of equation [46C] using the real pixel array may be used to generate $I^k_{oo}(x,y)$ values over the real pixel array after the last iteration (k=K). For this, the convolution term may be generated on the super pixel array and then interpolated and extrapolated onto the real pixel array. The scattered radiation at any iteration, including the last iteration k=K, may be generated as:

$$I^k_{os}(x, y) = [(1 + \gamma' \cdot \tau(x, y)) \cdot \qquad [46D-1]$$
$$\{[I^k_{EST}(x, y) \cdot S^k_{A,1}(I_0, I^k_{EST})] \otimes S_{FF,1}(x, y)\} - [\gamma' \cdot \tau(x, y) \cdot$$
$$I^k_{EST}(x, y) \cdot S^k_{A,1}(I_0, I^k_{EST})] \otimes S_{FF,1}(x, y) + (1 + \gamma' \cdot \tau(x, y)) \cdot$$
$$\{[I^k_{EST}(x, y) \cdot S^k_{A,2}(I_0, I^k_{EST})] \otimes S_{FF,2}(x, y)\} - [\gamma' \cdot \tau(x, y) \cdot$$
$$I^k_{EST}(x, y) \cdot S^k_{A,2}(I_0, I^k_{EST})] \otimes S_{FF,2}(x, y) + (1 + \gamma' \cdot \tau(x, y)) \cdot$$
$$\{[I^k_{EST}(x, y) \cdot S^k_{A,3}(I_0, I^k_{EST})] \otimes S_{FF,3}(x, y)\} - [\gamma' \cdot$$
$$\tau(x, y) \cdot I^k_{EST}(x, y) \cdot S^k_{A,3}(I_0, I^k_{EST})] \otimes S_{FF,3}(x, y)]$$

or as:

$$I_{os}^k(x, y) = [(1 + \gamma' \cdot \tau(x, y)) \cdot \quad [46\text{D-}2]$$
$$\{[I_{oo}^k(x, y) \cdot S_{A,1}^k(I_0, I_{oo}^k)] \otimes S_{FF,1}(x, y)\} - [\gamma' \cdot \tau(x, y) \cdot$$
$$I_{oo}^k(x, y) \cdot S_{A,1}^k(I_0, I_{oo}^k)] \otimes S_{FF,1}(x, y) + (1 + \gamma' \cdot \tau(x, y)) \cdot$$
$$\{[I_{oo}^k(x, y) \cdot S_{A,2}^k(I_0, I_{oo}^k)] \otimes S_{FF,2}(x, y)\} - [\gamma' \cdot \tau(x, y) \cdot$$
$$I_{oo}^k(x, y) \cdot S_{A,2}^k(I_0, I_{oo}^k)] \otimes S_{FF,2}(x, y) + (1 + \gamma' \cdot \tau(x, y)) \cdot$$
$$\{[I_{oo}^k(x, y) \cdot S_{A,3}^k(I_0, I_{oo}^k)] \otimes S_{FF,3}(x, y)\} - [\gamma' \cdot$$
$$\tau(x, y) \cdot I_{oo}^k(x, y) \cdot S_{A,3}^k(I_0, I_{oo}^k)] \otimes S_{FF,3}(x, y)].$$

Another iteration approach similar to that of equation [15] for subsequent iterations k=2 to K is as follows:

$$[I_{EST}^k(x, y) \cdot S_{A,1}^k(I_0, I_{EST}^k)] = 0.5 * [I_{oo}^{k-1}(x, y) \cdot S_{A,1}(I_0, I_{oo}^{k-1})] + \quad [47\text{A-}1]$$
$$0.5 * [I_{EST}^{k-1}(x, y) \cdot S_{A,1}^{k-1}(I_0, I_{EST}^{k-1})]$$

$$[I_{EST}^k(x, y) \cdot S_{A,2}^k(I_0, I_{EST}^k)] = 0.5 * [I_{oo}^{k-1}(x, y) \cdot S_{A,2}(I_0, I_{oo}^{k-1})] + \quad [47\text{A-}2]$$
$$0.5 * [I_{EST}^{k-1}(x, y) \cdot S_{A,2}^{k-1}(I_0, I_{EST}^{k-1})]$$

$$[I_{EST}^k(x, y) \cdot S_{A,3}^k(I_0, I_{EST}^k)] = 0.5 * [I_{oo}^{k-1}(x, y) \cdot S_{A,3}(I_0, I_{oo}^{k-1})] + \quad [47\text{A-}3]$$
$$0.5 * [I_{EST}^{k-1}(x, y) \cdot S_{A,3}^{k-1}(I_0, I_{EST}^{k-1})]$$

Generate $\tau^k(x,y)$ from prior reconstruction, or as $T_f(I_0, I^{k-1}_{oo}(x,y))$, $$\text{or as } 0.5 \cdot T_f(I_0, I^{k-1}_{oo}(x,y)) + 0.5 \cdot \tau^{k-1}(x,y) \quad [47\text{B}]$$

$$I_{oo}^k(x, y) = I_I(x, y) - [(1 + \gamma' \cdot \tau(x, y)) \cdot \quad [47\text{C}]$$
$$\{[I_{EST}^k(x, y) \cdot S_{A,1}^k(I_0, I_{EST}^k)] \otimes S_{FF,1}(x, y)\} - [\gamma' \cdot \tau(x, y) \cdot$$
$$I_{EST}^k(x, y) \cdot S_{A,1}^k(I_0, I_{EST}^k)] \otimes S_{FF,1}(x, y) + (1 + \gamma' \cdot \tau(x, y)) \cdot$$
$$\{[I_{EST}^k(x, y) \cdot S_{A,2}^k(I_0, I_{EST}^k)] \otimes S_{FF,2}(x, y)\} - [\gamma' \cdot \tau(x, y) \cdot$$
$$I_{EST}^k(x, y) \cdot S_{A,2}^k(I_0, I_{EST}^k)] \otimes S_{FF,2}(x, y) + (1 + \gamma' \cdot \tau(x, y)) \cdot$$
$$\{[I_{EST}^k(x, y) \cdot S_{A,3}^k(I_0, I_{EST}^k)] \otimes S_{FF,3}(x, y)\} - [\gamma' \cdot$$
$$\tau(x, y) \cdot I_{EST}^k(x, y) \cdot S_{A,3}^k(I_0, I_{EST}^k)] \otimes S_{FF,3}(x, y)]$$

with $[I^1_{EST}(x,y)\cdot S^1_{A,1}(I_0,I^1_{EST})] = [I^0_{oo}(x,y)\cdot S_{A,1}(I_0,I^0_{oo})]$, $[I^1_{EST}(x,y)\cdot S^1_{A,2}(I_0,I^1_{EST})] = [I^0_{oo}(x,y)\cdot S_{A,2}(I_0,I^0_{oo})]$, and $[I^1_{EST}(x,y)\cdot S^1_{A,3}(I_0,I^1_{EST})] = [I^0_{oo}(x,y)\cdot S_{A,3}(I_0,I^0_{oo})]$. Like Equation [46A], equations [47A] provide some damping on the rate of change of the thickness and amplitude functions between the iterations, and minimizes the chances of the function values oscillating during the iterations. An equal weighting factor of 0.5 has been used in equation [47A], but different weighting factors may be used (at least the first weighting factor should be non-zero and both weighting factors should sum to 1). If the kernel assignment of a pixel or super pixel changes during an iteration, its $I_{EST}(*) \cdot S_{A,x}(*)$ value will be averaged with zero values for subsequent iterations if $S_{A,x}(*)$ changes from a non-zero value to a zero value, and its $I_{EST}(*)S_{A,x}(*)$ value will start from zero and be averaged with non-zero value for subsequent iterations if $S_{A,x}(*)$ changes from a zero value to a non-zero value, thereby providing a smooth transition. Equations [45]-[27] may be applied to the real pixel array, or to the super pixel array. In the latter case, the super pixel values for $I^k_{oo}(x,y)$ and $I_f(x,y)$ may be generated as averages in the manner described above for equations [13]-[15], and, if the Fourier transform process (equation [43]) has been used to generate the convolution terms from decimated data, the results of the inverse Fourier transforms do not need to be interpolated/extrapolated during the iterations. The above possible criteria for determining when to end the iterations of equation [46] may be used to determine when to end the iterations of equation [47]. If the iterations have been carried out on the super pixels, then one application of equation [47C] using the real pixel array may be used to generate $I^k_{oo}(x,y)$ values over the real pixel array. For this, the convolution term may be generated on the super pixel array and then interpolated and extrapolated onto the real pixel array. The scattered radiation at any iteration, including the last iteration k=K, may be generated using equations [46D].

In equations [45]-[47] values for $\tau(x,y)$ may be provided by the above-described thickness function $T_f(*)$, by a prior tomographic reconstruction of the object, or by an estimated shape of the object. In equations [46C] and [47C], the convolution terms are preferably generated by the Fourier transform method (equation [43]), but they can be generated by a full-space convolution using equation [42], or by a full-space summation using equation [41], or by a full-space summation using equation [41] with the form of equation [25] in place of $\{1+\gamma'\cdot(\tau_{xy}-\tau_{bp})\}$. These implementations, though slow, would allow use of the full skew correction factor $Z(\theta_p)$. Skew correction factors $Z'(\theta_p)$ may be applied to each of equations [45], [46C] and [47C] by multiplying it with each of the amplitude functions, as was done with equation [10A]. The application of skew correction factors $Z''(*)$ to each of equations [45], [46C] and [47C] follows a similar form to that of equation [40], but leads to the summation of 18 convolution terms, but which can be readily handled by the Fourier transform form of equation [43].

Edge-Effect Compensation.

Figure 16:
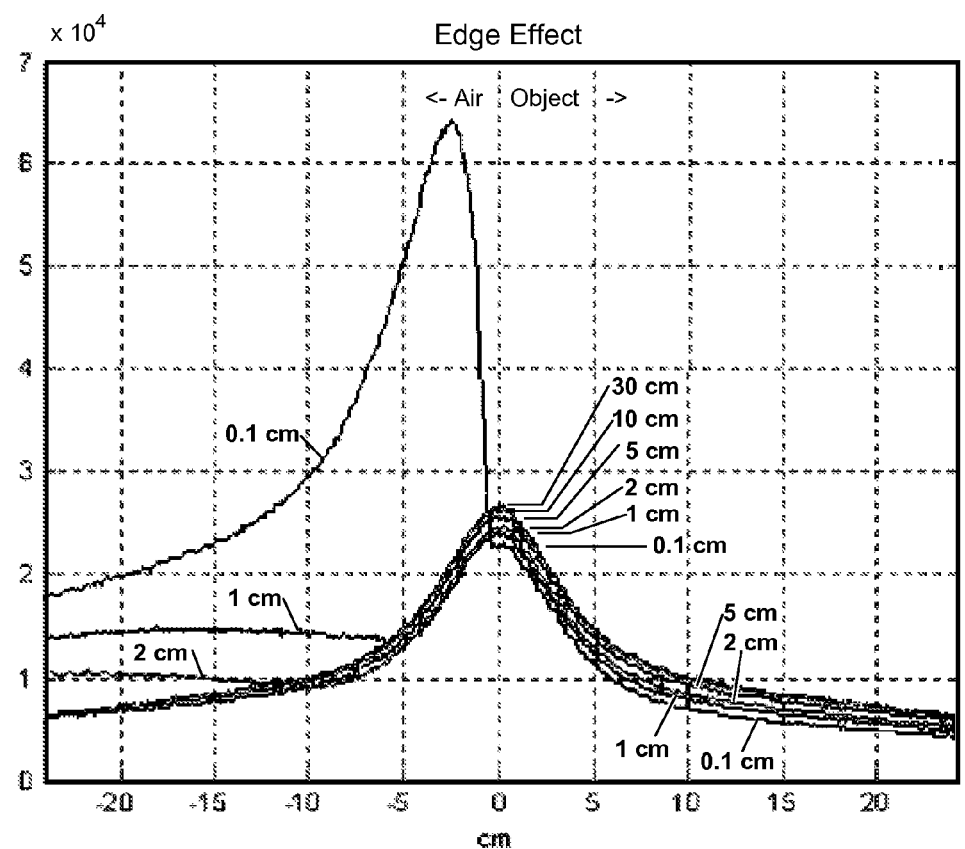
FIG. 16 illustrates innovative Monte Carlo simulations of scatter radiation with the incident radiation beam located at varying distances from an edge of a slab of material having uniform thickness according to several inventions of the present application.
Figure 17:
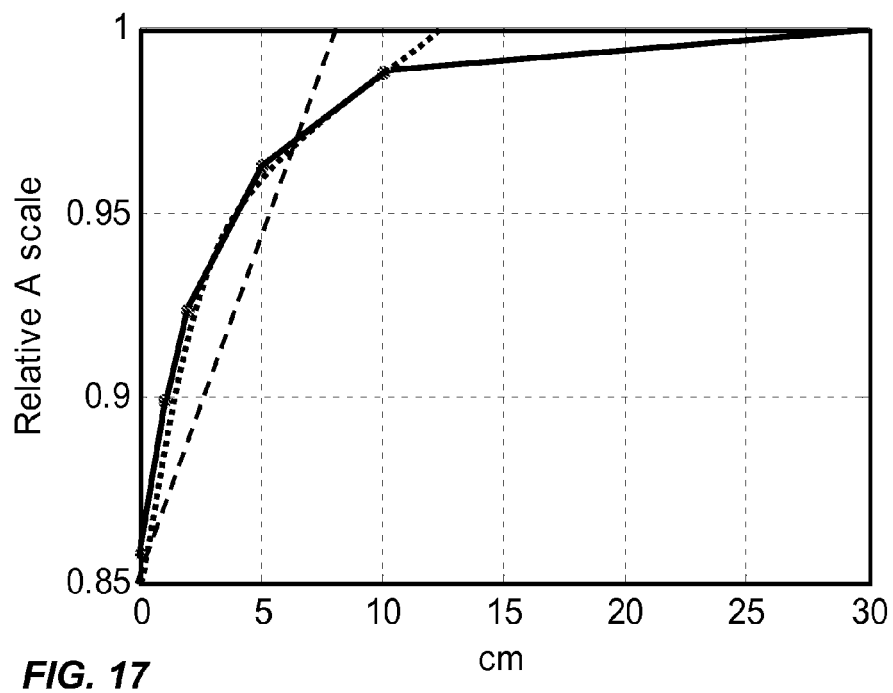
FIG. 17 illustrates the change in kernel amplitude as a function of the distance of the incident beam from the edge of a slab of material having uniform thickness according to several inventions of the present application.

Monte Carlo simulations of the kernel for a uniform-slab object show that, towards the edge of an object, higher-order scattering events are reduced due to the absence of scattering media. This reduces the amplitude of the scatter kernel at the object boundary by approximately 15%. These simulations are shown on a relative scale in FIG. 16 for various distances from the edge (0.1 cm, 1 cm, 2 cm, 5 cm, 10 cm, 30 cm), with the edge being located to the left of the peaks, and the object extending from the edge to the right of the graph. The slab has a uniform thickness of 15 cm. FIG. 17 shows the kernel amplitude change as a function of the distance of the incident beam from the edge (solid line curve). At the very edge, the kernel amplitude is reduced by 15%; while at 5 cm from the edge, the amplitude is only reduced by 4%. The amplitude change can be approximated by the straight dashed line, which starts at a value of 0.85 at the edge and reaches a value of 1 at a distance of 7 cm within the object. The amplitude change can also be approximated by the dashed polynomial line that reaches a value of 1 at a distance of 12 cm within the object.

Several approaches may be used to account for the edge effect when generating estimates of $I_{os}(x,y)$, such as by application of any of equations [9]-[12], [10A], [10B], [11A], [17]-[20], [32]-[36], [40]-[44], or when using estimates of $I_{os}(x,y)$ in the equations for the iterative solutions [13]-[15], [21]-[23], [37]-[39], and [45]-[47]. A first exemplary approach is to identify the edge of the object in the pixel array or the super pixel array, to generate a kernel modification function Mk(x,y) that spans the array and accounts for the edge effect, and to multiply the kernel by Mk(x,y) in the above equations, such as by multiplying it with the kernel's amplitude function (e.g., $S_A(*)$). The kernel modification function Mk(x,y) has a value of zero for pixels and super pixels that are outside of the radiation shadow of the object, a value of ~0.85 at the edge, values between ~0.85 and 1 inside the object near the edge, and values of 1 at the remaining interior pixels and super pixels of the object. For typical human objects, the object edges are generally parallel to the y-axis. Each pixel in the above exemplary 1024×768 pixel array measures 0.39 mm by 0.39 mm, and each of the above exemplary 9×25 or 10×26 super pixels for the exemplary array measures 3.5 mm by 9.75 mm. Thus, for a 7 cm to 12 cm span of the edge effect along a y-axis row of pixels or super pixels, the edge effect covers approximately 180 to 308 pixels, and approximately 20 to 34 super pixels.

A first exemplary method of generating the kernel modification function Mk(x,y) is as follows.

Action #1. For each pixel or super pixel, set the value of the array element Mk(x,y) corresponding to a pixel or super pixel to 1 if the value of the measured radiation profile $I_f(x,y)$ at the pixel or super pixel is below a threshold value $I_{TH}$; otherwise set the value to zero. The threshold value $I_{TH}$ may be at or slightly below the value of $I_0$. Values of $I_f(x,y)$ above $I_{TH}$ indicate the absence of the object, while values below $I_{TH}$ indicate the presence of the object.

Action #2. From the left edge of each y-axis row (−Xpix/2), move across the corresponding row of Mk(x,y) toward the right end of the row until an edge is detected by a transition from 0 to a non-zero value (e.g., 1). Replace the first element having a non-zero value with a value of 0.85 in array Mk(x,y). Then for the next 7 cm to 12 cm of the row, move to the right by one pixel or super pixel at a time, and replace the corresponding Mk(x,y) with a value that is in accordance with one of the dashed lines of FIG. 17 if the Mk(x,y) value is greater than the replaced Mk(x,y) value of the previously processed pixel or super pixel. If, during this processing, the current Mk(x,y) value is less than the Mk(x,y) value of the previously processed pixel, then stop this action as the right edge has been reached.

Action #3. From the right edge of each y-axis row (+Xpix/2), move across the corresponding row of Mk(x,y) toward the left end of the row until an edge is detected by a transition from 0 to a non-zero value (e.g., 1). Replace the first element having a non-zero value with a value of 0.85 in array Mk(x,y). Then for the next 7 cm to 12 cm of the row, move to the left by one pixel or super pixel at a time, and replace the corresponding Mk(x,y) with a value that is in accordance with one of the dashed lines of FIG. 17 if the Mk(x,y) value is greater than the replaced Mk(x,y) value of the previously-processed pixel or super pixel. If, during this processing, the current Mk(x,y) value is less than the Mk(x,y) value of the previously processed pixel, then stop this action as the processed left edge has been reached. The sequence of actions #2 and #3 may be exchanged, with action #3 being performed before action #2.

A second exemplary method of generating the kernel modification function Mk(x,y) according to the dashed straight line is as follows.

Action #1. For each pixel or super pixel, set the value of the array element Mk(x,y) corresponding to a pixel or super pixel to 1 if the value of the measured radiation profile $I_f(x,y)$ at the pixel or super pixel is below a threshold value $I_{TH}$; otherwise set the value to a value of (1-2Δ) where Δ is the relative amount of the edge effect (~0.15 for the curve shown in FIG. 17). The threshold value $I_{TH}$ may be at or slightly below the value of $I_0$. Values of $I_f(x,y)$ above $I_{TH}$ indicate the absence of the object, while values below $I_{TH}$ indicate the presence of the object.

Action #2. Convolve the Mk(x,y) values of each row with a rectangle function having an extent from −7 cm to +7 cm and a value of 1 within that extent, and a value of zero outside of that extent. (The rectangle function is also called a uniform horizontal window.) Before the convolution, a padding extension may be added to each side of each row of Mk(x,y) values; each padding extension has a length equal to the extent of the rectangle function (e.g., 14 cm), and has uniform Mk(*) values of (1-2Δ).

Action #3. Remove the padding extensions (if used), and set the values that are below (1-Δ) to zero.

The second exemplary method may be readily adapted to use, in action #2, a two-dimensional convolution of Mk(*) and a two-dimensional rectangle function over the two-dimensional domain of Mk(*) (with optional padding extension). Such a convolution may be done with Fourier transforms.

When compensating for edge effects in the content of the iterative solutions [13]-[15], [21]-[23], [37]-[39], and [45]-[47], the Mk(x,y) may be generated once per projection and used for all the iterations of the solution since the structure of the array need only depend upon the measured data $I_f(x,y)$ for the projection.

Another method of compensating for edge effects, and more generally the changes in secondary scattering events, is to modify the kernel constant "A" according to the form $$A'(x_m,y_n)=A\cdot\{1+\delta\cdot[\tau_{AVG}(x_m,y_n)-\tau(x_m,y_n)]\}, \quad [48]$$

where δ is a constant coefficient, point $(x_m,y_n)$ is the location on the pixel array where the pencil beam terminates, $\tau(x_m,y_n)$ is the object thickness seen by the pencil beam, and $\tau_{AVG}(x_m, y_n)$ is the average thickness of the object seen by a small cone of other pencil beams around the pencil beam. $A'(x_m, y_n)$ then replaces the constant A in the equations as a matrix comprising spatially variant scaling. Equation [48] is a more generalized way of accounting for effects of thickness changes for the edge effects. $\tau(x_m,y_n)$ may be provided by the previously described thickness function $T_f(I_0,I_{bp})$. $\tau_{AVG}(x_m,y_n)$ may be generated over a small group of pixels around point $(x_m,y_n)$ as follows:

$$\tau_{AVG}(x_m, y_n) = \frac{1}{4\cdot R_X\cdot R_Y}\cdot\sum_{y=y_n-R_Y}^{y=y_n+R_Y}\sum_{x=x_m-R_X}^{x=x_m+R_X}\tau(x, y) \approx \quad [49]$$

$$\frac{1}{4\cdot R_X\cdot R_Y}\cdot\sum_{y=y_n-R_Y}^{y=y_n+R_Y}\sum_{x=x_m-R_X}^{x=x_m+R_X}T_I(I_0, I_{bp}(x, y)).$$

Using the division property of logarithms, $T_f(*)$ can be written as $T_f(I_0,I_{bp})=\ln\{I_0(x_m,y_n)/I_{bp}(x_m,y_n)\}/\mu=(1/\mu)\cdot[\ln\{I_0(x_m, y_n)\}-\ln\{I_{bp}(x_m,y_n)\}]$. Generally, $I_0(x_m,y_n)$ will be uniform in the small area around a point of and edge, and averages to the same value under the approximation of equation [49], and will cancel with a similar term in equation [48] for $T_f(I_0,I_{bp})$. Equation [48] can then be approximated as:

$$A'(x_m, y_n) \approx A\cdot\{1+ \quad [50]$$
$$\delta\cdot[AVG(-(1/\mu)\cdot\ln\{I_{bp}(x_m, y_n)\})+(1/\mu)\cdot\ln\{I_{bp}(x_m, y_n)\}]\}, =$$
$$A\cdot\{1+(\delta/\mu)\cdot[\ln\{I_{bp}(x_m, y_n)\}-AVG(\ln\{I_{bp}(x_m, y_n)\})]\}$$

where AVG(*) is an averaging function. The approximation of equation [50] is simpler, but comprises the essential part of the approximation of equation [49] (both involve generating a difference between the logarithm of $I_{bp}(x,y)$ at an edge location and the average of the logarithm of $I_{bp}(x,y)$ around the edge location). Since both $\delta$ and $\mu$ are constants, they may be replaced by a single constant in equation [50].

Scatter-Anchoring.

In some cases, there may be systematic errors in the scatter estimate generated by the above inventions. For example, if the object is off-center, then, for those projections where the object is closer to the detector than is expected, the scatter model will underestimate object scatter, whereas, for projections situated 180 degrees away, the object scatter model will overestimate object scatter. Other sources of systematic error may include the presence of material other than the material (e.g., water) upon which the object scatter kernels are based.

A first approach of addressing such systematic errors is to perform a first tomographic reconstruction of the object, and then adjust the kernels during a second subsequent tomographic reconstruction. Another approach is to measure scatter at one or more edges of the detector and use the measurements to scale the scatter estimate derived from the kernel model to bring the kernel model into agreement with the measurements. This approach is referred to as "anchoring," and is described in greater detail below.

Figure 18:
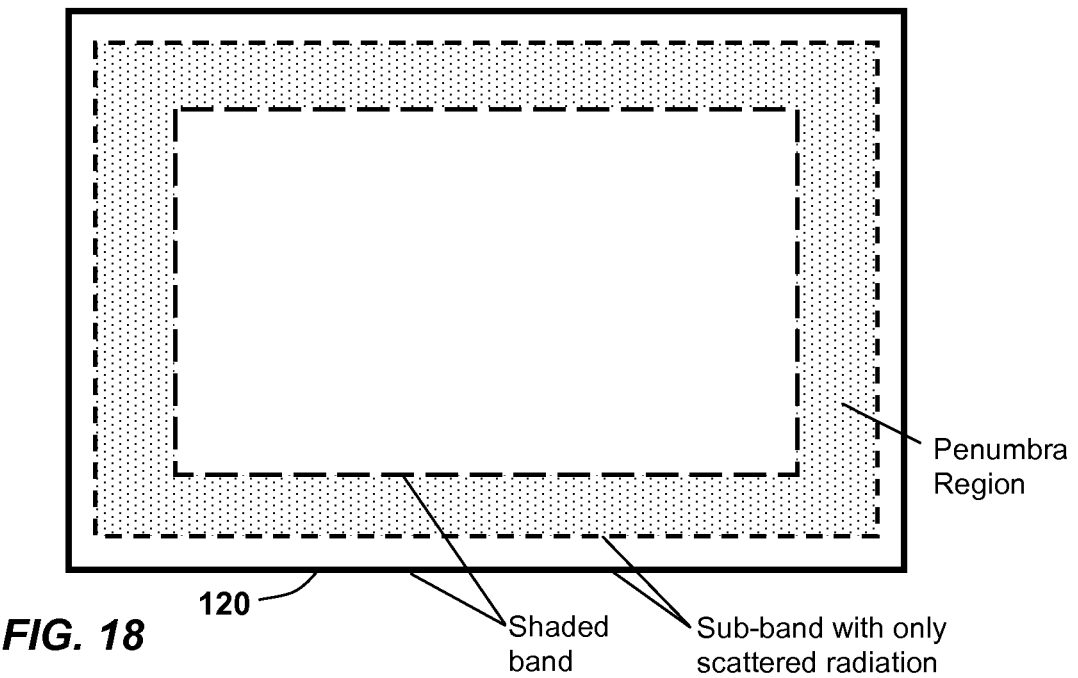
FIG. 18 illustrates a configuration where the fan blades of the system are positioned to provide shaded bands around all sides of an imaging device according to several inventions of the present application.

One approach of measuring the scatter is to shade one or more edges of the detector with collimator blades so that the direct radiation from radiation source 110 is effectively blocked in one or more bands at one or more corresponding edges of imaging device 120. This causes the non-scattered radiation $I_{oO}$ from the object to be substantially zero within the bands. One or both sets of fan blades 130-140 shown in FIGS. 2-4 may be used to provide the shading that creates these bands. The bands may be made sufficiently wide to prevent leakage of the non-scattered radiation $I_{oO}$ at a subband at the very edge, the leakage being caused by the beam penumbra of the source (source 110 is not exact a point source, and has a finite width that causes the penumbra). FIG. 18 illustrates a configuration where fan blades 130-140 are positioned to provide shaded bands around all sides of imaging device 120, each band including a penumbra region and a sub-band with only scattered radiation (no primary signal from the object). The detector values of the pixels in these sub-bands effectively measure the scattered radiation.

The estimate of the scattered radiation generated using the kernels, such as by equations [14C],[22D],[38D], and [46D], may be compared to the detector values in the sub-bands for each radiographic projection. (If desired, the scatter in the sub-bands may be corrected for any scattering caused by the detector housing; such correction has a minimal effect since the object scattering is slowly varying.) If there is a significant difference, a scaling factor may be introduced into equations [13]-[15], [21]-[23], [37]-[39], and [45]-[47] to adjust the kernel model and bring it into agreement with measurements for the projection. The scaling factor may be a global constant that is multiplied with the scatter value generated for each super pixel or real pixel, or a global constant that is added with the scatter value generated for each super pixel or real pixel (or a combination of both approaches). The global constant may be generated from a least squares fitting method that minimizes the difference between the measured scatter radiation of the sub-bands and the scattered radiation generated by the kernel model, as adjusted by the global constant, at one or more locations in the sub-bands. Least squares fitting methods are well known to the mathematics art, and one of ordinary skill in the art can make and use these inventions of the present application without undue experimentation in view of this specification, and without a detailed explanation of least squares fitting methods. While FIG. 18 illustrates this invention with the use of measured data from all four edges of the pixel array, one may use the measured data from just one, two or, three edges. In addition, a specially configured collimator may be used in place of the fan blades, where the special collimator shades one or more small regions along one or more of the edges, rather than whole edges, and the scatter anchoring is performed using one or more of these small regions. Such regions may be at the corners of the pixel array, and/or the midpoints of the edges, and/or points between.

In addition, more elaborate fitting surfaces may be used. For example, the scaling factor may be allowed to vary linearly along each edge (or collinear set of small regions), and a least squares fitting method may be used to find a slope and offset for each edge. As another approach, a second or higher order polynomial may be used to fit the scaling factor along each edge (or collinear set of small regions). Then, the scaling factor may be interpolated to the interior of the array using any conventional interpolation method. While this method has been illustrated using all four edges, it may be implemented using one, two, or three edges, or with one or more small regions provided by the specially configured collimator. As another method, the scaling factors may be estimated for several selected areas along one or more of the edges, and a mathematical plane may be fitted to these scaling factors by a least squares fitting method. The equation of the mathematical plane may then be used to generate the scaling factors for all of the pixels and super pixels of the array.

Figure 19:
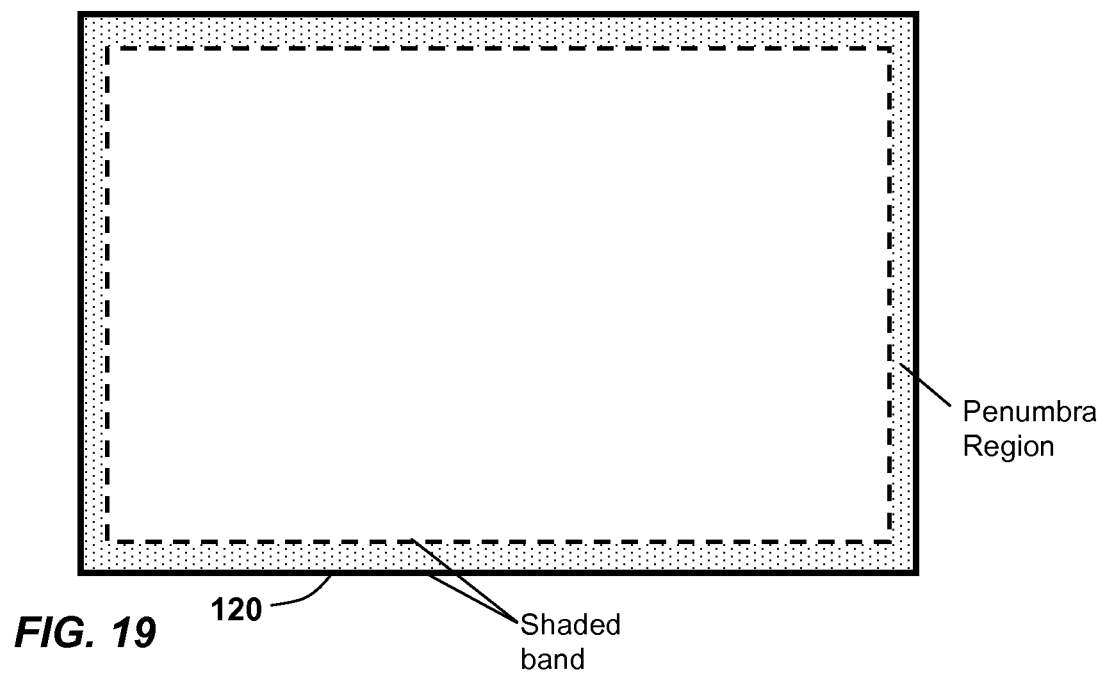
FIG. 19 illustrates a first configuration where the fan blades of the system are positioned to provide shaded bands around all sides of an imaging device according to several inventions of the present application.
Figure 20:
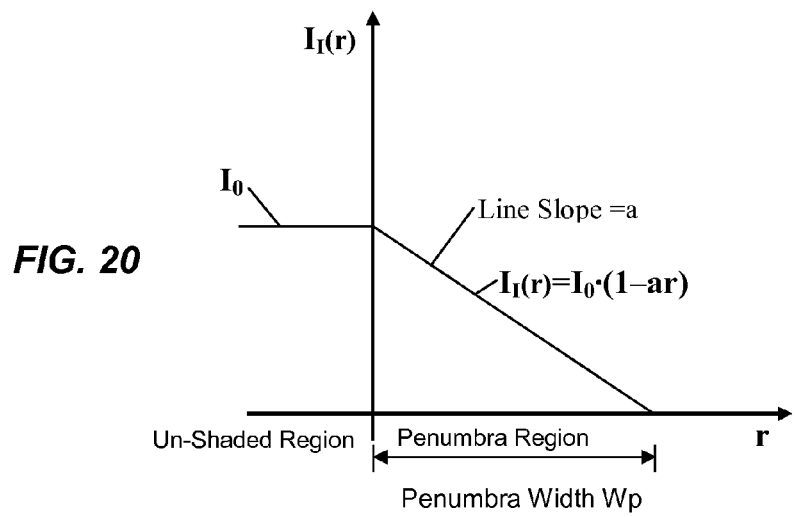
FIG. 20 illustrates a second configuration where the fan blades of the system are positioned to provide shaded bands around all sides of an imaging device according to several inventions of the present application.
Figure 21:
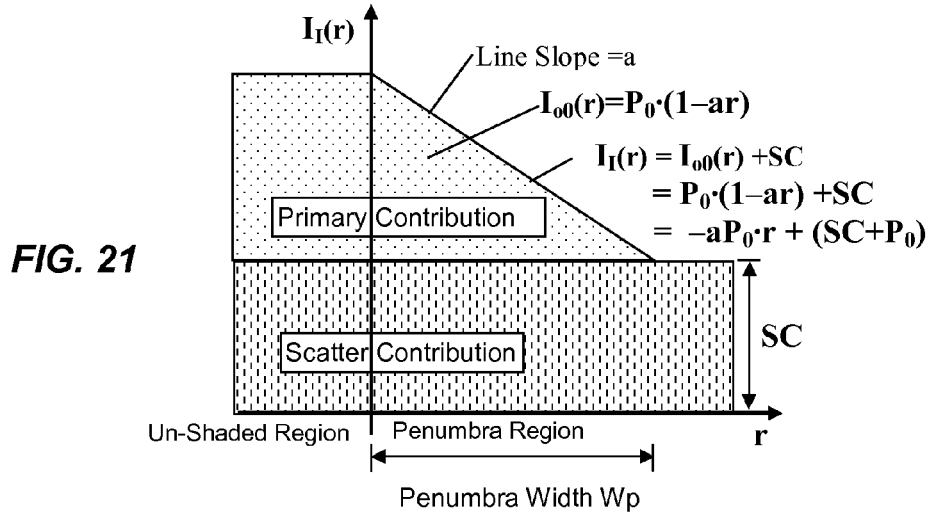
FIG. 21 illustrates the ideal radiation profile of a shaded region without an object present according to several inventions of the present application.
Figure 22:
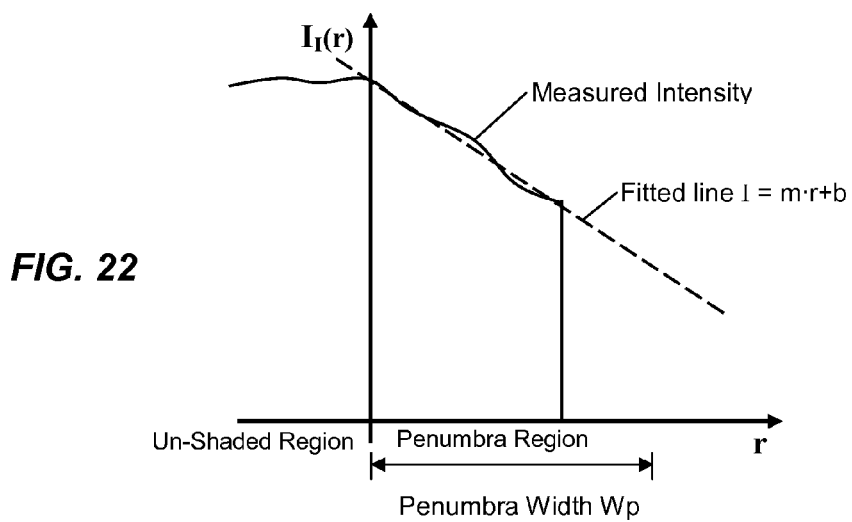
FIG. 22 illustrates a radiation profile of a shaded region with an object present and with a fitting line made in the penumbra region according to several inventions of the present application.

A disadvantage of completely shading the edges of the detector to get the sub-bands of pure scattered radiation is that the imaging field-of-view is reduced. Another approach, which addresses this disadvantage, accounts for the penumbra effect and enables less shading to be used, such as shown by FIG. 19, to generate estimates of the scaling factors. We first examine the effect of the penumbra for the case where no object is present. In FIG. 20, the radiation intensity is plotted as a distance "r" along a row or column of the pixel array, near the array edge. The penumbra effect starts at $r=0$, and ends at $r=W_p$, where $W_p$ is the width of the penumbra. In the unshaded region to the left, the radiation intensity $I_f(r)$ incident upon the detector cover is at a value of $I_0$, as expected. In the penumbra region, $I_f(r)$ decreases linearly with distance, which may be written as $I_f(r)=I_0 \cdot (1-a \cdot r)$, where "a" is a slope constant. We can assume that, when the object is present, its thickness will be substantially constant at the edge of the column or row. Under this assumption, the primary radiation from the object (e.g., $I_{oO}$)) will decrease linearly with distance r in the penumbra region with the same slope "a". FIG. 21 plots the ideal radiation intensity in the penumbra region when the object is present. It has two contributions: the primary radiation $I_{oO}$ from the object, which is assumed to decrease as $P_0 \cdot (1-a \cdot r)$, and the scatter contribution, which is assumed to be a constant SC. As shown in the figure, the radiation intensity $I_f(r)$ incident at the detector housing, which can be estimated from measurements as described above, can be written as $I_f(r)=I_{oO}(r)+SC=-a \cdot P_0 \cdot r+(SC+P_0)$ for regions of r between 0 and $W_p$. FIG. 22 shows a plot of the measured intensity at the edge of a penumbra region for a column or row or pixels. The measured radiation intensity only extends through a portion of the Penumbra Region. A linear line $I=m \cdot r+b$ may be fitted to the sloping intensity in the portion using a least squares fitting method. From FIG. 21, we see that the parameter "m" is equal to $m=-a \cdot P_0$ and the parameter "b" is equation to $(SC+P_0)$. From this, the scattered radiation at the edge can be found as $SC=b+m/a$. This approach works well when done using super pixels, where the measured data is averaged to provide representative data values for the super pixels, as described above. However, because the slope may be relatively steep, it may be desired to reduce the size of the super pixels in the direction of r, as compared to the size of the super pixels in the direction r for measuring object scatter, in order to realize a better fit of the slope. For each edge, the slope method can be applied either once to generate one SC value, or several times for several rows (or columns), up to as many as the number of pixels along that edge, to generate SC for the several rows (or columns). (Here, a row or column may be of the super pixel array or the real array.) A globally constant or variant scaling factor can then be generated as previously described above.

Using the above approach, the scattered radiation values SC can be estimated at the penumbra edges using a much smaller amount of shading. These SC values may then be interpolated over the entire array in the various ways discussed above. Also, the specially configured collimator may be used in place of the fan blades to shade one or more small regions along one or more of the edges, rather than whole edges, and the scatter anchoring may be performed using one or more of these small regions. Such regions may be at the corners of the pixel array, and/or the midpoints of the edges, and/or points between.

Additional Projection Correction Methods.

In addition to the above methods of generating corrected projections of the object ($I_{oo}(x,y)$), a corrected radiographic projection may be generated as a truncated difference between the uncorrected projection $I_f(x,y)$ and the final scatter component $I^K_{os}(x,y)$. The truncated difference may comprise generating the ratio of the scatter component $I^K_{os}(x,y)$ to the uncorrected projection $I_f(x,y)$, processing the ratio by filtering its values over the spatial domain and/or limiting its values of the ratio to a range (such 0 to 0.8), and then multiplying $I_f(x,y)$ by one minus the processed ratio. This may be expressed as:

$$I_{oo}(x,y)=I_f(x,y)\cdot\{1-\text{TRUNC}(I^K_{os}(x,y)/I_f(x,y))\}. \qquad [51]$$

Results of Scatter Estimations.

Figure 23:
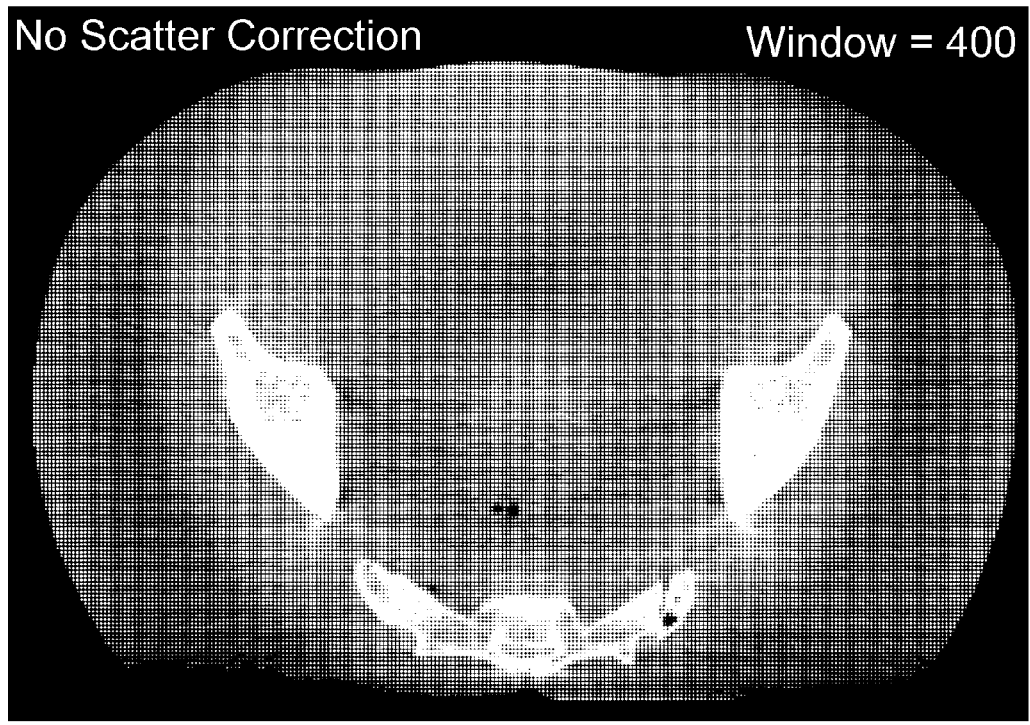
Figure 24:
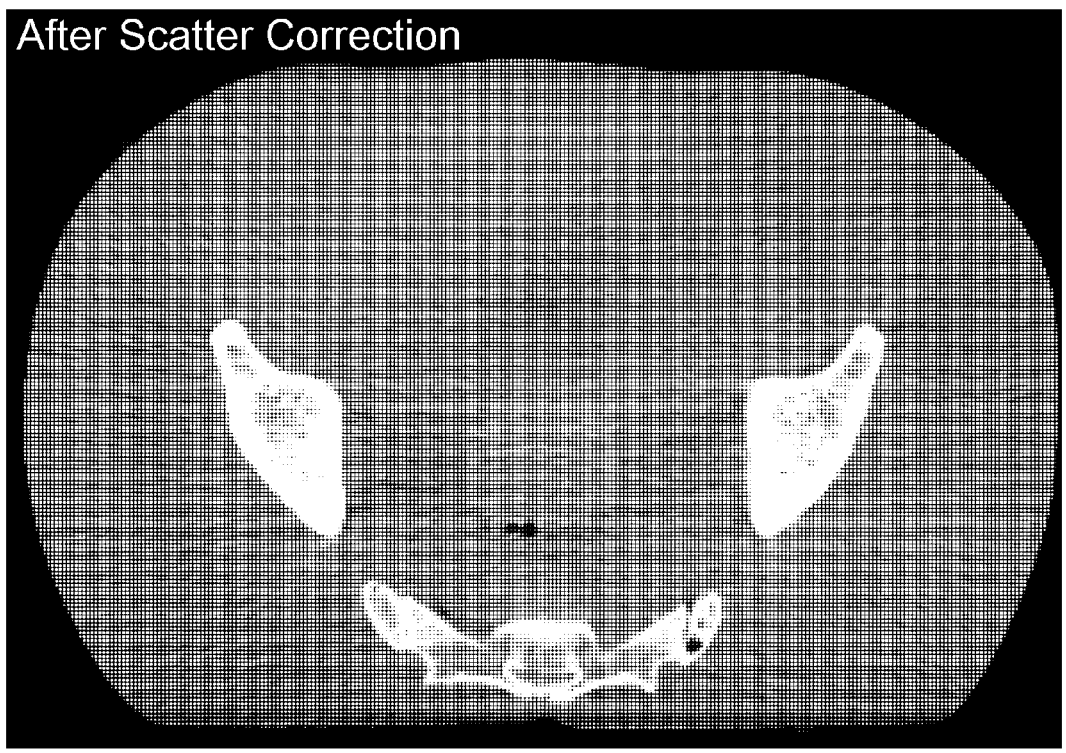

As indicated above, the estimates of scattered radiation in radiographic projections may be used to correct the projections, such as by subtracting the scatter estimates from the pixel values of the radiographic projections. The corrected projections may then be used in 3-D tomographic reconstructions of the object. We now show some results of the use of such corrections, with the scatter estimate being generated using the above-described multiple asymmetric kernels. FIG. 23 shows a cross section of a pelvic phantom from a tomographic reconstruction before correction, and FIG. 24 shows the same cross section generated from projections that have been corrected. Various scatter artifacts can be seen in FIG. 23, such as the circular-shaped halos. These artifacts are significantly reduced in the corrected cross section of FIG. 24. The range of the Hounsfield Unit (HU) uncertainty is also significantly reduced from approximately zero to −260 HU to +30 to −50 HU. FIGS. 25A-25D plot the uncorrected pixel values along a cross section of four different radiographic projects taken of an object at four different angles, 90-degrees apart from one another. Also shown in FIGS. 25A-25D is a measured value of scattered radiation and the estimated values of scattered radiation provided by an exemplary embodiment of the asymmetric multi-kernel inventions of the present application. As can be seen in the figures, the estimated scatter matches the measured scattered very well.

System and Computer Program Product Embodiments.

Each of the above-described methods may be implemented by computer program products that direct a computer system to perform the actions of the methods. Each such computer program product may comprise sets of instructions embodied on a tangible computer-readable medium that direct the processor of a computer system to perform the corresponding actions. Examples of such computer-readable mediums are the instruction memory shown for controller 160 in FIGS. 2A and 2B. The instructions may be in executable computer code (such as C, C++), human-readable code (such as MatLab Code), and the like. Other types of tangible computer-readable media include floppy disks, removable hard disks, optical storage media such as CD-ROMS, DVDs and bar codes, semiconductor memories such as flash memories, read-only-memories (ROMS), battery-backed volatile memories, networked storage devices, and the like. Given the above-detailed description of the various method embodiments of the inventions of the present application, it is within the skill of one of ordinary skill in the tomography art to implement each of the method embodiments disclosed herein in a computer program product without undue experimentation. Such computer program product may be run on processor 160 shown in FIGS. 2A and 2B, or on separate processors that are not coupled to Cone-beam Computer Tomography Systems.

Exemplary system inventions of the present application may comprise radiation source 110, imaging device 120, and controller 160, in combination with various computer program product inventions and/or methods of the present application.

Any recitation of "a", "an", and "the" is intended to mean one or more unless specifically indicated to the contrary.

The terms and expressions which have been employed herein are used as terms of description and not of limitation, and there is no intention in the use of such terms and expressions of excluding equivalents of the features shown and described, it being recognized that various modifications are possible within the scope of the invention claimed.

Moreover, one or more features of one or more embodiments of the invention may be combined with one or more features of other embodiments of the invention without departing from the scope of the invention.

While the present invention has been particularly described with respect to the illustrated embodiments, it will be appreciated that various alterations, modifications, adaptations, and equivalent arrangements may be made based on the present disclosure, and are intended to be within the scope of the invention and the appended claim.

What is claimed is:

1. A method of estimating scattered radiation in a radiographic projection of an object, the radiographic projection generated by an imaging device irradiated by a radiation source spaced therefrom to provide a space for the object, the imaging device measuring incident radiation at a plurality of pixels at corresponding locations, the radiographic projection comprising a plurality of radiation values corresponding to a plurality of pixel locations of the imaging device, each radiation value comprising a primary radiation amount representative of the radiation reaching the corresponding pixel along a direct path from the radiation source and a scattered radiation amount representative of other radiation reaching the corresponding pixel, the method comprising:

obtaining an estimate of a radiation amount associated with a first location of the radiographic projection, the radiation amount comprising one of a radiation amount emitted by the radiation source or the primary radiation amount at the first location;

generating an estimate of scattered radiation at a plurality of locations of the radiographic projection using the estimate of the radiation amount at the first location and a kernel that generates a value representative of scattered radiation for a location of the radiographic projection in relation to the distance between that location and the first location, the kernel having a form that is asymmetric about the location of the first pixel location, wherein the two-dimensional array of the imaging device comprises a flat surface, and wherein generating an estimate of scattered radiation further uses a skew correction factor to at least partially correct for skewing of data values due to the projection of the scattered radiation onto a flat surface, wherein the skew correction factor for a second location of the plurality of locations includes:

a first term including a first distance along a first dimension x between the first location and the second location, the first distance multiplied by a first angle term including a first angle of a direct path from the radiation source to the first location, the first angle resulting from a projection of the direct path onto a first plane including the first dimension x;

a second term including a second distance along a second dimension y between the first location and the second location, the second distance multiplied by a second angle term including a second angle of the direct path from the radiation source to the second location, the second angle resulting from a projection of the direct path onto a second plane including the second dimension y; and storing the estimate of the scattered radiation in a computer-readable medium.

2. The method of claim 1 further comprising obtaining a plurality of estimates of the object's thickness along a plurality of direct paths from the radiation source to a corresponding plurality of locations of the imaging device and the radiographic projection; and wherein the form of the kernel varies about the first location of the radiographic projection in relation to the estimates of the object thickness about the first location.

3. The method of claim 1 wherein the value of the kernel at a location is related to a difference between the estimate of object thickness at the location and the estimate of object thickness at the first location.

4. The method of claim 1 wherein the form of the kernel varies about the first location of the radiographic projection in relation to estimates of the primary radiation amount about the first location.

5. The method of claim 4 wherein the value of the kernel at a location is related to a difference between a logarithm of the primary radiation amount at the location and a logarithm of the primary radiation amount at the first location.

6. The method of claim 1 wherein the kernel comprises an amplitude factor and an asymmetric form factor that is a function of at least one a set of estimates of the object thickness, and wherein the kernel further comprises a symmetric form factor, and wherein the asymmetric form factor comprises a component that is mathematically equivalent to $\{1+f_1(\tau_{xy}, \tau_{hp})\}$, where $\tau_{xy}$ is an estimate of the object's thickness along a direct path from the radiation source to a location of the radiographic projection for which scattered radiation is being estimated or at a location between there and the first location, and $\tau_{hp}$ is an estimate of the object's thickness along a direct path from the radiation source to the first location of the radiographic projection, and where $f_1(*)$ is a function of at least $\tau_{xy}$ and $\tau_{hp}$.

7. The method of claim 1 wherein the kernel comprises an amplitude factor and an asymmetric form factor that is a function of a set of estimates of the primary radiation in the radiographic projection, and wherein the kernel further comprises a symmetric form factor, and wherein the asymmetric form factor comprises a component that is mathematically equivalent to $\{1+f_2(I_{bp,LI}, I_{bp})\}$, $I_{bp,LI}$ is an estimate of the primary radiation amount at the first location, and $I_{bp}$ is an estimate of the primary radiation amount at a location of the radiographic projection for which scattered radiation is being estimated or at a location between there and the first location, and where $f_2(*)$ is a function of at least $I_{bp,LI}$ and $I_{bp}$.

8. The method of claim 1, wherein the first distance varies from positive to negative depending on whether the second location has a smaller or larger value for the x-coordinate.

9. The method of claim 1, wherein the skew correction factor comprises a third term that includes a third angle, the third angle being between the first path and a projection axis from the radiation source to a center of the flat surface.

10. A method of estimating scattered radiation in a radiographic projection of an object, the radiographic projection generated by an imaging device irradiated by a radiation source spaced therefrom to provide a space for the object, the imaging device measuring incident radiation at a plurality of pixels at corresponding locations, the radiographic projection comprising a plurality of radiation values corresponding to a plurality of pixel locations of the imaging device, each radiation value comprising a primary radiation amount representative of the radiation reaching the corresponding pixel along a direct path from the radiation source and a scattered radiation amount representative of other radiation reaching the corresponding pixel, the method comprising:

obtaining an estimate of a radiation amount associated with a first location of the radiographic projection, the radiation amount comprising one of a radiation amount emitted by the radiation source or the primary radiation amount at the first location;

generating an estimate of scattered radiation at a plurality of locations of the radiographic projection using the estimate of the radiation amount at the first location and a kernel that generates a value representative of scattered radiation for a location of the radiographic projection in relation to the distance between that location and the first location, the kernel having a form that is asymmetric about the location of the first pixel location, wherein the kernel comprises an amplitude factor and an asymmetric form factor that is a function of at least one a set of estimates of the object thickness and a set of estimates of the primary radiation in the radiographic projection, wherein the asymmetric form factor for a second location of the plurality of locations includes:

a first term corresponding to a first thickness of the object along the direct path to the first location, and a second term corresponding to a second thickness of the object along a scattered path to the second location, the scattered path being from a point EP that the direct path reaches the object to the second location; and storing the estimate of the scattered radiation in a computer-readable medium.

11. The method of claim 10 further comprising obtaining a plurality of estimates of the object's thickness along a plurality of direct paths from the radiation source to a corresponding plurality of locations of the imaging device and the radiographic projection for areas along and around the at least one edge, and wherein adjusting the values of the amplitude factor in areas around the at least one edge comprises adjusting at least one such value for a location in relation to the difference between the average object thickness around the location and the object thickness at the location.

12. The method of claim 10 wherein the radiation amounts for the locations of the radiographic projection comprise the primary radiation amounts $I_{bp}(x,y)$ at the locations, and wherein adjusting the values of the amplitude factor in areas around the at least one edge comprises adjusting at least one such value for a location in relation to the difference between a logarithm of $I_{bp}(x,y)$ at the location and the average of the logarithm of $I_{bp}(x,y)$ around the location.

13. The method of claim 10, wherein the amplitude factor varies with location on the radiographic projection, wherein generating the estimate of scattered radiation further comprises finding at least one edge of the object in the radiographic projection and adjusting the values of the amplitude factor in areas around the at least one edge.

14. The method of claim 10, further comprising:
estimating a thickness of the object at a plurality of points of the radiographic projection, wherein the second thickness is determined by:
determining a third location whose X,Y coordinates are offset from the first location by an amount proportional to a difference between the second location and the first location.

15. The method of claim 14, wherein the third location is the second location.

16. The method of claim 14, wherein the kernel has a form that is asymmetric about the corresponding location.

17. The method of claim 14, wherein generating a reference estimate includes:
identifying a decrease in the primary radiation amount at corresponding locations in the at least one partially shared area; and
determining the reference estimate based on the decrease.

18. The method of claim 17, wherein determining the reference estimate based on the decrease includes:
fitting the decrease in primary radiation amounts to a linear function having a slope m; and
computing the reference estimate using the primary radiation amount at a first corresponding location, the slope m, and a known slope a corresponding to a decrease that is independent of the primary radiation amount at the first corresponding location.

19. A method of estimating scattered radiation in a radiographic projection of an object, the radiographic projection generated by an imaging device irradiated by a radiation source spaced therefrom to provide a space for the object, the imaging device measuring incident radiation at a plurality of pixels at corresponding locations, the radiographic projection comprising a plurality of radiation values corresponding to a plurality of pixel locations of the imaging device, each radiation value comprising a primary radiation amount representative of the radiation reaching the corresponding pixel along a direct path from the radiation source and a scattered radiation amount representative of other radiation reaching the corresponding pixel, the method comprising:
obtaining a plurality of estimates of radiation amounts at a plurality of corresponding locations of the radiographic projection, each radiation amount comprising one of a radiation amount emitted by the radiation source or the primary radiation amount at the corresponding location, wherein the radiographic projection comprises at least one area that was partially shaded from source radiation by a second object, the shading reducing the primary radiation amount in radiation values in the at least one area but not substantially reducing the scattered radiation amount in the radiation values, the at least one area being between a first region that was less shaded and a second region that is more shaded than the at least one area;
generating an estimate of scattered radiation at a plurality of locations of the radiographic projection using the obtained estimates of the radiation amount and a kernel that generates a value representative of scattered radiation for a location of the radiographic projection in relation to the distance between that location and a corresponding location;
generating a reference estimate of at least one scattered radiation amount in the at least one partially shaded area;
adjusting the estimate of scattered radiation using the reference estimate; and
storing the estimate of the scattered radiation in a computer-readable medium.

20. The method of claim 19 further comprising obtaining a plurality of estimates of the object's thickness along a plurality of direct paths from the radiation source to a corresponding plurality of locations of the imaging device and the radiographic projection; and
wherein the form of the kernel varies about the first location of the radiographic projection in relation to the estimates of the object thickness about the first location.

21. The method of claim 19 wherein the form of the kernel varies about the first location of the radiographic projection in relation to estimates of the primary radiation amount about the first location.

22. A method of estimating scattered radiation in a radiographic projection of an object, the radiographic projection generated by an imaging device irradiated by a radiation source spaced therefrom to provide a space for the object, the imaging device measuring incident radiation at a plurality of pixels at corresponding locations, the radiographic projection comprising a plurality of radiation values corresponding to a plurality of pixel locations of the imaging device, each radiation value comprising a primary radiation amount representative of the radiation reaching the corresponding pixel along a direct path from the radiation source and a scattered radiation amount representative of other radiation reaching the corresponding pixel, the method comprising:
correcting the radiation values of the radiographic projection for scattered radiation caused by a housing of an imaging device;
obtaining an estimate of a radiation amount associated with a first location of the radiographic projection, the radiation amount comprising one of a radiation amount emitted by the radiation source or the primary radiation amount at the first location;
generating an estimate of scattered radiation at a plurality of locations of the radiographic projection using the estimate of the radiation amount at the first location and a kernel that generates a value representative of scattered radiation for a location of the radiographic projection in relation to the distance between that location and the first location, the kernel having a form that is asymmetric about the location of the first pixel location; and
storing the estimate of the scattered radiation in a computer-readable medium.

23. The method of claim 22 further comprising obtaining a plurality of estimates of the object's thickness along a plurality of direct paths from the radiation source to a corresponding plurality of locations of the imaging device and the radiographic projection; and
wherein the form of the kernel varies about the first location of the radiographic projection in relation to the estimates of the object thickness about the first location.

24. The method of claim 22 wherein the value of the kernel at a location is related to a difference between the estimate of object thickness at the location and the estimate of object thickness at the first location.

25. The method of claim 22 wherein the form of the kernel varies about the first location of the radiographic projection in relation to estimates of the primary radiation amount about the first location.

26. The method of claim 25 wherein the value of the kernel at a location is related to a difference between a logarithm of the primary radiation amount at the location and a logarithm of the primary radiation amount at the first location.

27. A method of estimating scattered radiation in a radiographic projection of an object, the radiographic projection generated by an imaging device irradiated by a radiation source spaced therefrom to provide a space for the object, the imaging device measuring incident radiation at a plurality of pixels at corresponding locations, the radiographic projection comprising a plurality of radiation values corresponding to a plurality of pixel locations of the imaging device, each radiation value comprising a primary radiation amount representative of the radiation reaching the corresponding pixel along a direct path from the radiation source and a scattered radiation amount representative of other radiation reaching the corresponding pixel, the method comprising:

obtaining estimates of the primary radiation amounts at a plurality of corresponding locations of the radiographic projection;

generating an estimate of scattered radiation at a plurality of locations of the radiographic projection based upon the estimates of the primary radiation amounts at the plurality of corresponding locations of the radiographic projection, an amplitude factor $S_A(*)$, and a symmetric form factor $S_{FF}(x,y)$, wherein generating the estimate of scattered radiation comprises: generating a first quantity representative of a convolution of the symmetric form factor $S_{FF}(x,y)$ and estimates of the primary radiation amounts scaled by the amplitude factor $S_A(*)$, multiplying the first quantity by a first function of the estimates of radiation amounts, and generating a second quantity representative of the symmetric form factor $S_{FF}(x,y)$ convolved with estimates of the primary radiation amounts that has been scaled by the amplitude factor $S_A(*)$ and multiplied by a second function of the estimates of the primary radiation amounts; and storing the estimate of the scattered radiation in a computer-readable medium.

28. The method of claim 27, wherein the first function comprises unity plus a scaled representation of the plurality of logarithms of the estimates of the primary radiation amounts, and wherein the second function comprises a scaled representation of the plurality of logarithms of the estimates of the primary radiation amounts.

29. The method claim 27, wherein the first and second quantities are generated using at least one of the following: a Fourier transform of the symmetric form factor $S_{FF}(x,y)$, a Fourier transform of the set of estimates of the primary radiation amounts scaled by the amplitude factor $S_A(*)$, a Fourier transform of a set of estimates of the primary radiation amounts that has been scaled by the amplitude factor $S_A(*)$ and multiplied by the second function of the estimates of the primary radiation amounts.

\* \* \* \* \*